(12) United States Patent
Asano

(10) Patent No.: US 8,290,155 B2
(45) Date of Patent: Oct. 16, 2012

(54) INFORMATION PROCESSING APPARATUS, INFORMATION RECORDING MEDIUM, INFORMATION PROCESSING METHOD AND COMPUTER PROGRAM

(75) Inventor: Tomoyuki Asano, Kanagawa (JP)

(73) Assignee: Sony Corporation, Tokyo (JP)

( * ) Notice: Subject to any disclaimer, the term of this patent is extended or adjusted under 35 U.S.C. 154(b) by 1755 days.

(21) Appl. No.: 10/939,035

(22) Filed: Sep. 10, 2004

(65) Prior Publication Data

US 2005/0105737 A1   May 19, 2005

(30) Foreign Application Priority Data

Sep. 11, 2003  (JP) ................................ 2003-319590

(51) Int. Cl.
*G06F 21/00* (2006.01)
(52) U.S. Cl. ........................ 380/45; 713/165; 713/167
(58) Field of Classification Search .................... 380/45; 713/165–167; 726/26–27
See application file for complete search history.

(56) References Cited

U.S. PATENT DOCUMENTS

2003/0076958 A1* 4/2003 Ishiguro et al. ............... 380/277

FOREIGN PATENT DOCUMENTS

| JP | 2001-352322 | 12/2001 |
|---|---|---|
| JP | 2003-169048 | 6/2003 |
| WO | WO 02/060118 | 8/2002 |

OTHER PUBLICATIONS

D. Naor et al.; "Revocation and Tracing Schemes for Stateless Receivers"; Advances in Cryptology—Crypto 2001; Lecture Notes in Computer Science 2139; Springer; pp. 41-62; 2001.

* cited by examiner

*Primary Examiner* — Benjamin Lanier
(74) *Attorney, Agent, or Firm* — Finnegan, Henderson, Farabow, Garrett & Dunner, L.L.P.

(57) ABSTRACT

A configuration is adopted for including in key specifying information, being the configuration data of a key specifying code, subset division identifying information (partition bit) indicating whether or not cryptograms to which subset keys corresponding to divided subsets obtained by division of a dividable subset into a plurality of subsets are applied are included in a cryptogram block. With such a configuration, a cryptogram to which a subset key corresponding to a divided subset is applied can be generated and transmitted to an information processing apparatus. The information processing apparatus accepting the cryptogram and the key specifying code judges whether or not the accepted cryptogram is one to which the subset key corresponding to the divided subset is applied. Then, the information processing apparatus can select the cryptogram that is a target of decoding on the basis of the key specifying code.

36 Claims, 25 Drawing Sheets

CRYPTOGRAM BLOCK =
E(NK$_2$, K$_C$), E(NK$_6$, K$_C$), E(NK$_{15}$, K$_C$)

Fig.11

| VALUE OF ddd AND e AT NODE i, AND CRYPTOGRAM USED AT THAT TIME | |
|---|---|
| ddd, e | CRYPTOGRAM |
| 000, 0 | NONE |
| 100, 0 | $E(SK_{i,100}, K_C)$ |
| 010, 0 | $E(SK_{i,010}, K_C)$ |
| 001, 0 | $E(SK_{i,001}, K_C)$ |
| 110, 0 | $E(SK_{i,110}, K_C)$ |
| 110, 1 | $E(SK_{i,100}, K_C), E(SK_{i,010}, K_C)$ |
| 101, 0 | $E(SK_{i,101}, K_C)$ |
| 101, 1 | $E(SK_{i,100}, K_C), E(SK_{i,001}, K_C)$ |
| 011, 0 | $E(SK_{i,011}, K_C)$ |
| 011, 1 | $E(SK_{i,010}, K_C), E(SK_{i,001}, K_C)$ |
| 111, 0 | $E(SK_{i,111}, K_C)$ |
| 111, 1 | $E(SK_{i,100}, K_C), E(SK_{i,010}, K_C), E(SK_{i,001}, K_C)$ |

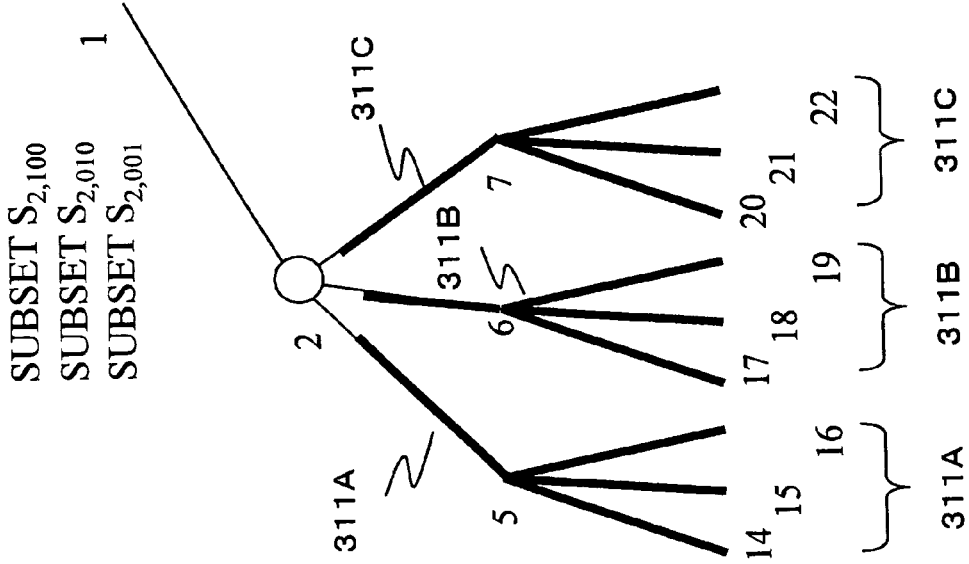
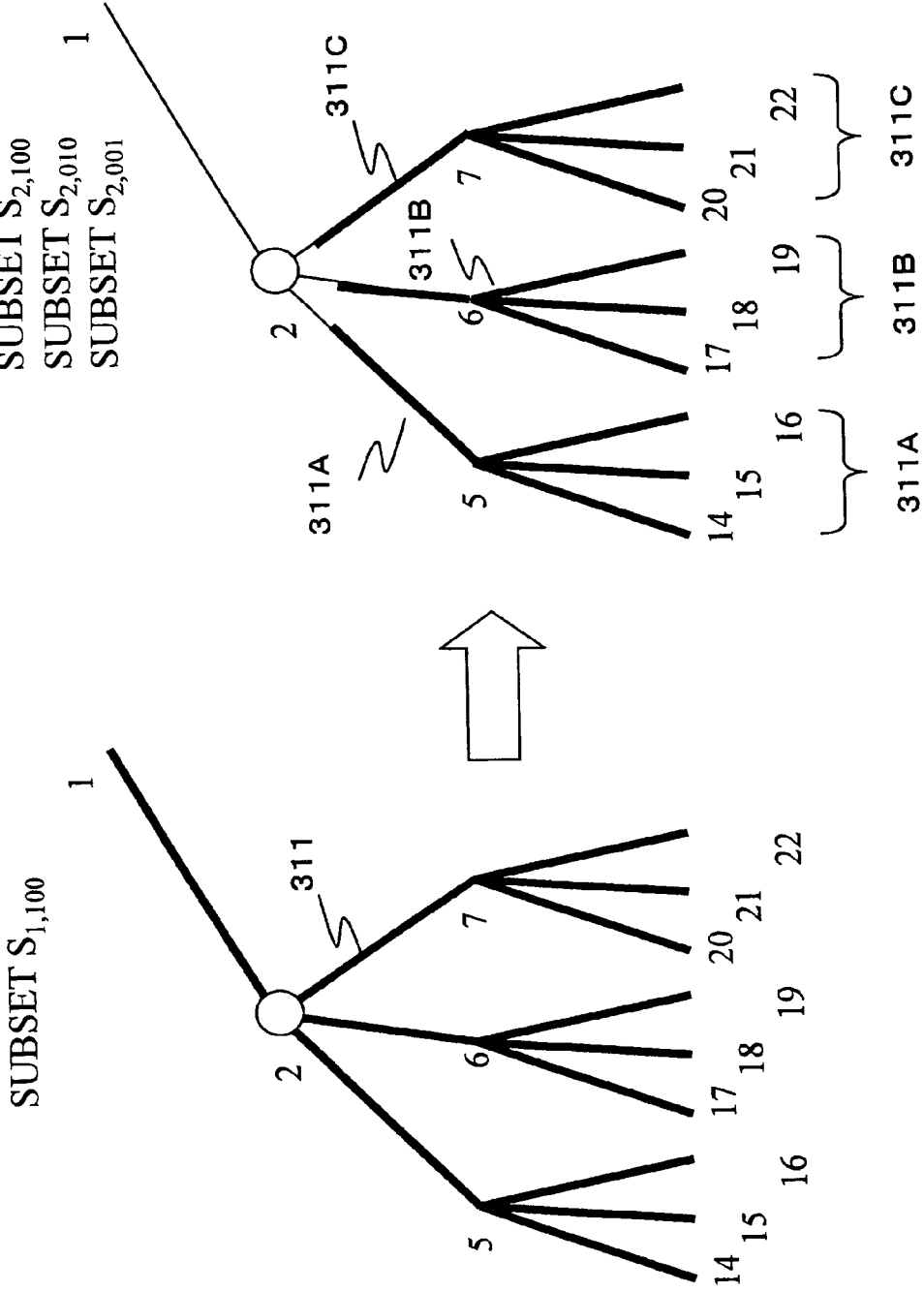

Fig.16

| VALUE OF ddd, e AND ff AT NODE i, AND CRYPTOGRAM USED AT THAT TIME | |
|---|---|
| ddd, e, ff | CRYPTOGRAM |
| (1) 000, 0, 00 | NONE |
| (2) 100, 0, 00 | $E(SK_{i,100}, K_C)$ |
| (3) 010, 0, 00 | $E(SK_{i,010}, K_C)$ |
| (4) 001, 0, 00 | $E(SK_{i,001}, K_C)$ |
| (5) 110, 0, 00 | $E(SK_{i,110}, K_C)$ |
| (6) 110, 1, 00 | $E(SK_{i,100}, K_C), E(SK_{i,010}, K_C)$ |
| (7) 101, 0, 00 | $E(SK_{i,101}, K_C)$ |
| (8) 101, 1, 00 | $E(SK_{i,100}, K_C), E(SK_{i,001}, K_C)$ |
| (9) 011, 0, 00 | $E(SK_{i,011}, K_C)$ |
| (10) 011, 1, 00 | $E(SK_{i,010}, K_C), E(SK_{i,001}, K_C)$ |
| (11) 111, 0, 00 | $E(SK_{i,111}, K_C)$ |
| (12) 111, 1, 00 | $E(SK_{i,100}, K_C), E(SK_{i,010}, K_C), E(SK_{i,001}, K_C)$ |
| (13) 111, 1, 01 | $E(SK_{i,100}, K_C), E(SK_{i,011}, K_C)$ |
| (14) 111, 1, 10 | $E(SK_{i,101}, K_C), E(SK_{i,010}, K_C)$ |
| (15) 111, 1, 11 | $E(SK_{i,110}, K_C), E(SK_{i,001}, K_C)$ |

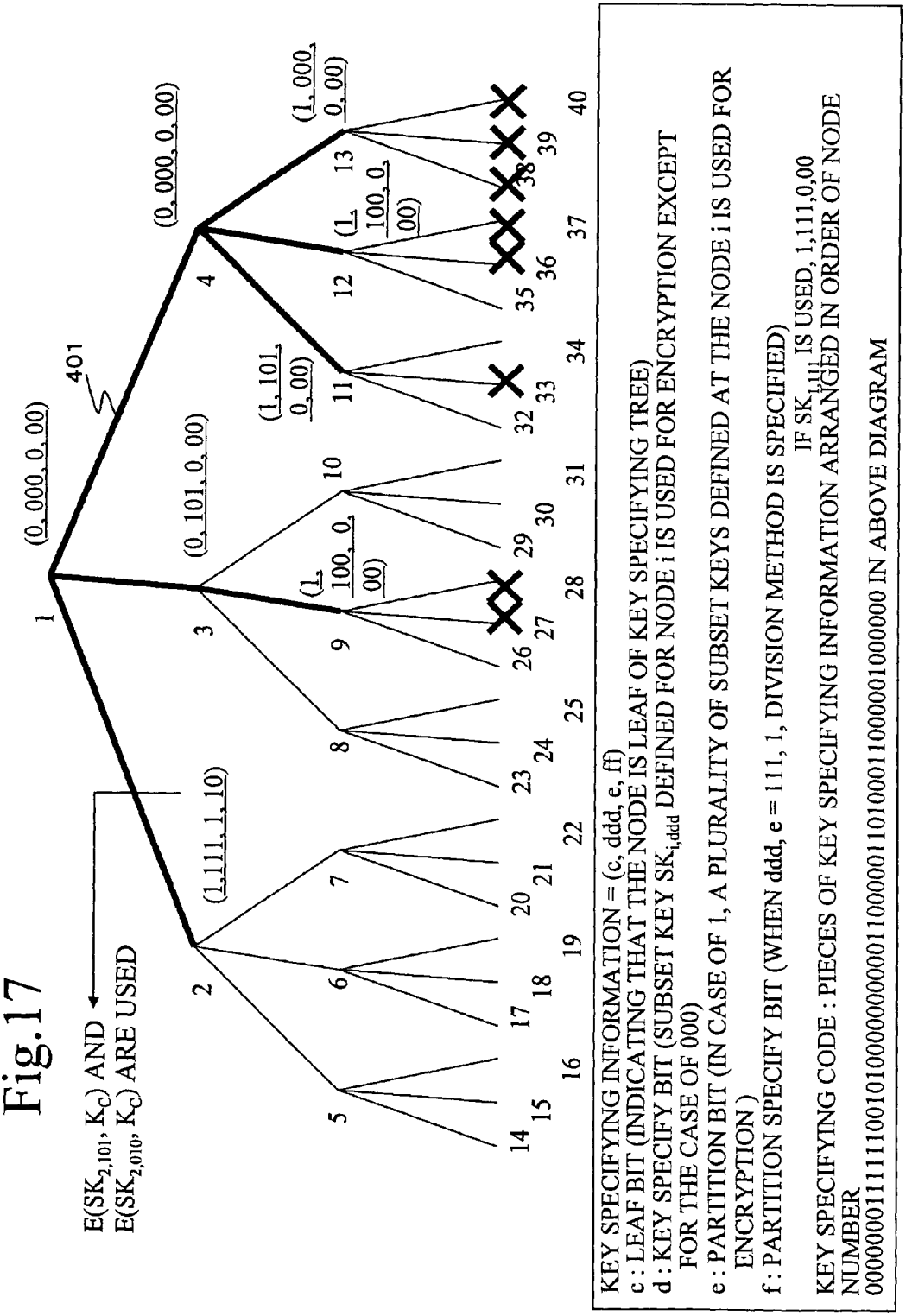

Fig.18A

VALUE OF ddd AND e AT NODE i, AND CRYPTOGRAM USED AT THAT TIME

| | ddd, e, ff | CRYPTOGRAM |
|---|---|---|
| (1) | 000, 0, 00 | NONE |
| (2) | 100, 0, 00 | $E(SK_{i,100}, K_C)$ |
| (3) | 010, 0, 00 | $E(SK_{i,010}, K_C)$ |
| (4) | 001, 0, 00 | $E(SK_{i,001}, K_C)$ |
| (5) | 110, 0, 00 | $E(SK_{i,110}, K_C)$ |
| (6) | 110, 1, 00 | $E(SK_{i,100}, K_C)$, $E(SK_{i,010}, K_C)$ |
| (7) | 101, 0, 00 | $E(SK_{i,101}, K_C)$ |
| (8) | 101, 1, 00 | $E(SK_{i,100}, K_C)$, $E(SK_{i,001}, K_C)$ |
| (9) | 011, 0, 00 | $E(SK_{i,011}, K_C)$ |
| (10) | 011, 1, 00 | $E(SK_{i,010}, K_C)$, $E(SK_{i,001}, K_C)$ |
| (11) | 111, 0, 00 | $E(SK_{i,111}, K_C)$ |
| (12) | 111, 1, 00 | $E(SK_{i,100}, K_C)$, $E(SK_{i,010}, K_C)$, $E(SK_{i,001}, K_C)$ |
| (13) | 111, 1, 01 | $E(SK_{i,100}, K_C)$, $E(SK_{i,011}, K_C)$ |
| (14) | 111, 1, 10 | $E(SK_{i,101}, K_C)$, $E(SK_{i,010}, K_C)$ |
| (15) | 111, 1, 11 | $E(SK_{i,110}, K_C)$, $E(SK_{i,001}, K_C)$ |

| gggg | hhhh |
|---|---|
| 0000 | 0000 |
| 1000 | 1000 |
| 0100 | 0100 |
| 0010 | 0010 |
| 1100 | 1101 |
| 1101 | 1100 |
| 1010 | 1011 |
| 1011 | 1010 |
| 0110 | 0111 |
| 0111 | 0110 |
| 1110 | 1110 |
| 1111 | 1111 |
| 1001 | 1001 |
| 0101 | 0101 |
| 0011 | 0011 |

Fig.18B

WEIGHT AND NUMBER OF CRYPTOGRAM OF hhhh

| WEIGHT | CRYPTOGRAM |
|---|---|
| 0 | 0 |
| 1 | 1 |
| 2 | 2 |
| 3 | 1 |
| 4 | 3 |

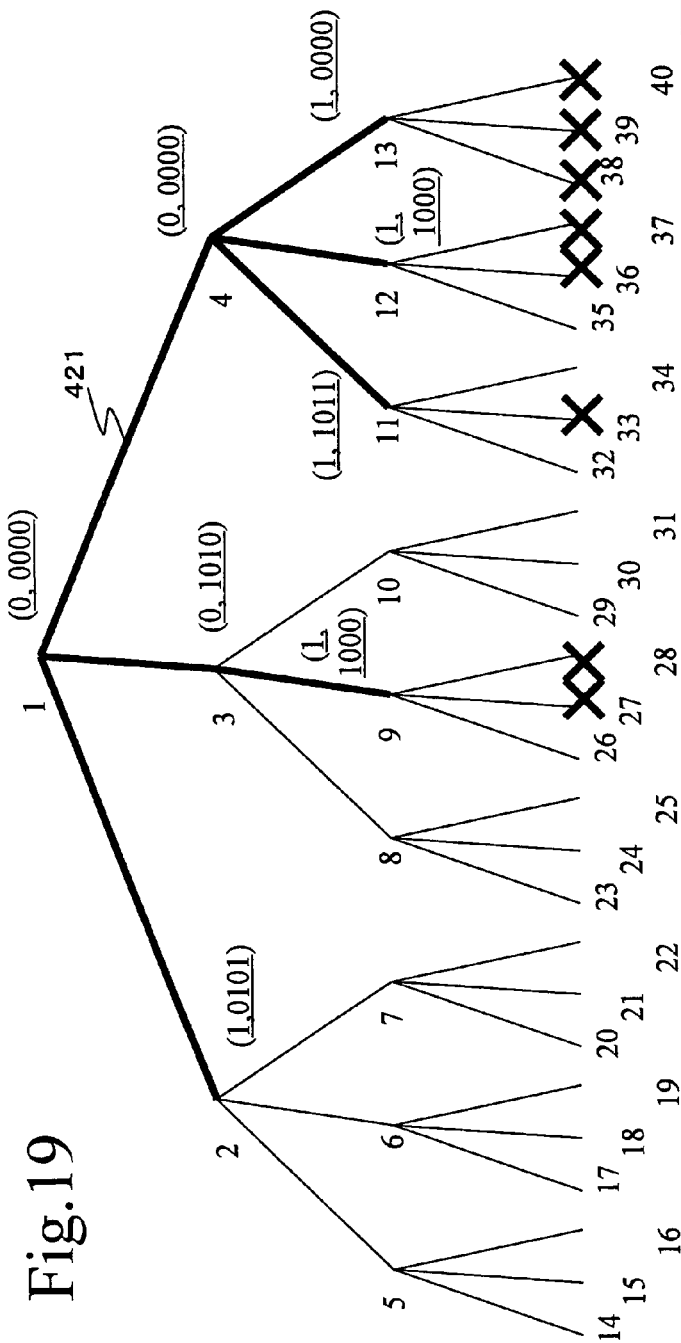

INFORMATION PROCESSING APPARATUS, INFORMATION RECORDING MEDIUM, INFORMATION PROCESSING METHOD AND COMPUTER PROGRAM

CROSS REFERENCES TO RELATED APPLICATIONS

The present invention claims priority to its priority document No. 2003-319590 filed in the Japanese Patent Office on Sep. 11, 2003, the entire contents of which being incorporated by reference herein.

BACKGROUND OF THE INVENTION

1. Field of the Invention

The present invention relates to an information processing apparatus, an information recording medium, an information processing method and a computer program. More particularly, the present invention relates to an information processing apparatus, an information recording medium, an information processing method and a computer program, all enabling information delivery setting various subsets in an information delivering configuration to which a tree structure is applied, namely setting various types of subsets defining a set of information processing apparatuses as user devices, and all enabling the selection of a cryptogram such that the information processing apparatus can efficiently decode themselves by the apparatuses.

2. Description of the Related Art

Recently, various kinds of software data such as audio data of music and the like, image data of movies and the like, game programs and various application programs (hereinafter these are referred to as contents) have been circulated through networks such as the Internet, or through various information processing apparatus such as information recording media including compact discs (CD's), digital versatile disks (DVD's), mini disks (MD's). These circulating contents are reproduced and used by a reproducing apparatus such as a personal computer (PC), a CD player, a DVD player and an MD player, which are owned by users, or game equipment.

The rights of distribution or the like of many contents such as music data and image data are generally held by their creators or their distributors. Consequently, at the time of the distribution of these contents, a configuration for setting certain restricted access is generally adopted, that is to say, only the authorized users are permitted to use the contents for preventing unauthorized duplication or the like.

In particular, in recent years, recording devices and storage media for recording information digitally have been being popularized. By means of such digital recording devices and storage media, for example, it is possible to repeat recording and reproducing without deteriorating images and sounds, and problems of the distribution of fraudulently copied contents through the Internet, and of the unauthorized copying of recording media such as a compact disc-recordable (CD-R) are generated.

As a method for preventing such unauthorized use of contents, there is a system in which a key for decoding contents or encrypted contents is enciphered to be distributed for enabling only the specific authorized users or the authorized devices to decode the distributed data. For example, a configuration adopting a hierarchical tree structure being an embodiment of a broadcast encryption method is known.

Encryption data supplying processing of encryption keys and the like using a hierarchical tree structure is described by referring to the attached drawings.

A hierarchical tree structure shown in FIG. 1 uses a binary tree. The undermost layer of the binary tree is called as a leaf, and each of portions including an apex, each branch portion and the leaf is called as a node. Incidentally, the apex is called as a root or a root node. In the binary tree hierarchical tree structure shown in FIG. 1, the leaves are denoted by 8-15, and the nodes are denoted by 1-15, and further the root is denoted by 1.

Information processing apparatus such as a reproducer and a receiver as content utilization equipment are assigned to the leaves 8-15 in the binary tree hierarchical tree structure one by one.

Moreover, a node key is assigned to each of the nodes (including the leaves) 1-15 of the tree one by one. The node keys assigned to the leaves 8-15 are sometimes called as leaf keys.

Node keys assigned to the nodes existing on a path from a leaf to the root are severally given to the information processing apparatus corresponding to the leaf. In the configuration of FIG. 1, there are eight information processing apparatus assigned to the leaves 8-15 severally, and a node key is assigned from the node 1-15. Four node keys assigned to the nodes 1, 2, 4 and 8 are given to an information processing apparatus 101 corresponding to the leaf 8. Moreover, four node keys assigned to the nodes 1, 3, 6 and 12 are given to an information processing apparatus 102 corresponding to the leaf 12. Each information processing apparatus safely takes custody of these node keys.

A method for transmitting the information which only a selected information processing apparatus can obtain by means of the setting including the distribution processing of the node keys is described by referring to FIG. 2. For example, a configuration is supposed. In the configuration, a content such as specific music and image data enciphered to be an encrypted content is circulated in a state obtainable by everybody by means of a broadcast distribution or a recording medium such as a DVD storing the content, and a key (content key Kc) for decoding the encrypted content is provided only to a specific user, i.e. a user or an information processing apparatus having an authorized right of using the content.

It is supposed that an information processing apparatus assigned to the leaf 14 shown in FIG. 2 is excluded (revoked) as an unauthorized apparatus, and that the other information processing apparatus are authorized information processing apparatus. In this case, a cryptogram by which the information processing apparatus assigned to the leaf 14 cannot obtain the content key Kc, but by which the other information processing apparatus can obtain the content key Kc, is generated, and the cryptogram is distributed through a network or by means of a recording medium storing the cryptogram.

In this case, the content key may be enciphered to be transmitted by the use of the node keys owned jointly by as much information processing apparatus as possible among the node keys other than the ones (denoted by mark x in FIG. 2) owned by the information processing apparatus to be revoked (excluded), namely the node keys located at the upper par of the tree.

In the example shown in FIG. 2, the node keys at the nodes 2, 6 and 15 are used for the enciphering of the content key Kc to generate a set of cryptograms to be provided. Namely, cryptograms of $E(NK_2, Kc)$, $E(NK_6, Kc)$ and $E(NK_{15}, Kc)$ are generated, and are provided by being distributed through a network or being stored in a recording medium. $E(A, B)$ denotes data B enciphered by a key A. Moreover, $NK_n$ denotes a nth node key shown in the drawing. Consequently, the above formulae indicate a set of three cryptograms including the encryption data $E(NK_2, Kc)$ produced by the encryption of the content key Kc by means of a node key $NK_2$, the encryption data $E(NK_6, Kc)$ produced by the encryption of the content key Kc by means of a node key $NK_6$, and the encryption data $E(NK_{15}, Kc)$ produced by the encryption of the content key Kc by means of a node key $NK_{15}$.

If the three cryptograms are produced to be transmitted to all of the information processing apparatus through, for example, a broadcast communication path, the information processing apparatus (ones corresponding to the leaves 8-13 and 15 shown in FIG. 2) other than the information processing apparatus of a revoke object can decode any one of the cryptograms by means of a node key owned by itself to obtain the content key Kc. However, the information processing apparatus corresponding to the revoked (excluded) leaf 14 does not hold any of the three node keys NK2, $NK_6$ and $NK_{15}$ applied to the three cryptograms. Consequently, even if the information processing apparatus receives the cryptograms, the apparatus cannot perform the decoding processing of the cryptograms, and the apparatus cannot obtain the content key Kc.

Now, in the above-mentioned processing, the three cryptograms $E(NK_2, Kc)$, $E(NK_6, Kc)$ and $E(NK_{15}, Kc)$ are provided to each of the information processing apparatus, and each of the information processing apparatus which are not revoked needs to examine which cryptogram the information processing apparatus can decode, and to select the decodable cryptogram for perform decoding processing. Three cryptograms are set in the above example, but actually the number of the information processing apparatus is a huge number, and the number of the cryptograms provided to the information processing apparatus is also a huge one. Consequently, the processing of sequentially repeated execution of the decoding processing from the head of the cryptogram is a severe burden.

Namely, there is proposed a configuration for providing to each information processing apparatus a key specifying code allowing each information processing apparatus to know a cryptogram which the apparatus should select at the time of the provision of the cryptograms together with the cryptograms. The details of configuration are described in, for example, Japanese Unexamined Publication No. 2001-352322.

FIG. 3 is referred to while the configuration for providing a key specifying code to each information processing apparatus together with cryptograms is described. As shown in FIG. 3, node keys used for encryption are expressed by means of a tree structure, and the structure is coded for producing a key specifying code. Then, the produced key specifying code is transmitted in broadcast transmission together with a cryptogram block. An information processing apparatus accepts the key specifying code and analyzes the accepted key specifying code. Thereby, the information processing apparatus knows that the apparatus should decode which cryptogram by using which node key, and consequently the apparatus can efficiently perform the decoding processing.

The key specifying code is described. FIG. 3 shows an example of the transmission of three cryptograms $E(NK_2, Kc)$, $E(NK_6, Kc)$ and $E(NK_{15}, Kc)$ with an information processing apparatus corresponding to the leaf 14 as a revoke (exclusion) apparatus similarly to the case of FIG. 2.

First, in FIG. 3, a partial tree shown by a wide line is a tree having all of nodes 121, 122 and 123, to which node keys used for encryption are assigned, as leaves, and having a root 120 of the original tree structure as a root. The partial tree is called as a key specifying tree.

For expressing the structure of a key specifying tree by means of data, information indicating the extension of a branch from each node toward the left side thereof or a right side thereof is set.

A piece of two-bit information (key specifying information) being any one of "00", "01", "10" and "11" is used for the expression of the structure at each node. Namely, if a first bit (on the left side) of a piece of key specifying information attached to a certain node is "1", the first bit indicates the extension of a branch toward the left side of the node (the existence of a child node on the left side of the key specifying tree). If the first bit is "0", the first bit indicates no-extension of any branches toward the left side of the node (the nonexistence of any child nodes on the left side). The end (on the right side) of the key specifying information similarly indicates the information of the branch on the right side.

Namely, if the key specifying information bits at a certain node are "11", the bits indicate that branches extend from the node toward both sides thereof. If the bits are "01", the bits indicate the extension of a branch only toward the left side. If the bits are "10", the bits indicate the extension of a branch toward the right side. Moreover, the bits of "00" indicate that no branches extend and the node is a leaf of the key specifying tree.

Namely, the existence of branches of a key specifying tree on the left side and on the right side of each node is indicated by a piece of two-bit information. The key specifying information bits are set as follows by setting "1" in case of existence of a branch and "0" in case of nonexistence:

Existence of Branches on Both Sides: "11"
Existence of Branch only on Left Side: "10"
Existence of Branch only on Right Side: "01"
Nonexistence of Branches on Both Sides: "00".

A key specifying code is set by arranging the key specifying information bits from upper layers of a key specifying tree in order and from the left side to the right side in the same layer in order. In case of the configuration shown in FIG. 3, because the key specifying tree includes the nodes of Nos. 1, 2, 3, 6, 7 and 15, the data arranging the key specifying information bits of each of the nodes 1, 2, 3, 6, 7 and 15 in order, i.e. "110011000100", is set as the key specifying code.

The above-mentioned example is an example of a binary tree configuration. However, the setting of a similar key specifying code is performed also in case of a multi-way tree configuration such as an a-way tree having an arbitrary number of sub trees (a) such as a three-way tree.

A three-way tree configuration is shown in FIG. 4 as an example of the configuration of an a-way tree. An information processing apparatus as a content using apparatus such as a receiver, a reproducer and a PC is assigned to a leaf of the three-way tree one by one. The example shown in FIG. 4 is an example having the number of sub trees a=3 and the number of the total information processing apparatus N=27.

Each information processing apparatus is denoted as $u_j$ by means of the number j of a leaf to which the information processing apparatus is assigned, where j=14, 15, . . . 40. Moreover, the following $2^a-2$ subsets are defined to each internal node (a node other than a leaf) k of the tree: $S_{k,b1b2...ba}$, where $b_i \in \{0, 1\}$, $$\sum_{i=1}^{a} bi \neq 0 \text{ and } \sum_{i=1}^{a} bi \neq a.$$

In the following, $b_1 b_2 \ldots b_a$ is referred to as B for simplifying description.

In an example of a=3, $2^a-2=6$, and six subsets of $S_{k,\,100}$, $S_{k,\,010}$, $S_{k,\,001}$, $S_{k,\,110}$, $S_{k,\,101}$ and $S_{k,\,001}$ are defined to each internal node k. Moreover, a subset $S_{1,\,111}$ is defined only to a root (node 1).

Each subset $S_{k,b1b2b3}$ is a set having components of information processing apparatus being the descendants of an ith child node from the left end of the child nodes of the node k. For example, in the example of FIG. 4, if two subsets among seven subsets $S_{1,\,111}$, $S_{1,\,100}$, $S_{1,\,010}$, $S_{1,\,001}$, $S_{1,\,110}$, $S_{1,\,101}$ and $S_{1,\,001}$ defined at a node 1 are exemplified, they are:

$S_{1,\,111}=\{u_{14}, u_{15}, \ldots u_{40}\}$
$S_{1,\,100}=\{u_{14}, u_{15}, \ldots u_{22}\}$ Namely, $S_{1,\,111}$ is a set including all leaves. $S_{1,\,100}$ is a set including the leaves belonging to the branch at the left end of the root node.

Moreover, if one subset among six subsets $S_{5,\,100}$, $S_{5,\,010}$, $S_{5,\,001}$, $S_{5,\,110}$, $S_{5,\,101}$ and $S_{5,\,001}$ defined for a node 5 is exemplified, the subset is $S_{5,\,101}=\{u_{14}, u_{16}\}$. Namely, $S_{5,\,101}$ is a set including the leaves belonging to the branches on the left end and the right end of the node 5.

A subset key "$SK_{k,B}$" is assigned to each subset $S_{k,B}$ one by one. Each information processing apparatus is given a subset key of the subset to which the apparatus belongs, and secretly takes custody of the given subset key.

For example, in the example of FIG. 4, because the information processing apparatus $u_{14}$ belongs 10 subsets of $S_{1,\,100}$, $S_{1,\,110}$, $S_{1,\,101}$, $S_{1,\,111}$, $S_{2,\,100}$, $S_{2,\,110}$, $S_{2,\,101}$, $S_{5,\,100}$, $S_{5,\,110}$ and $S_{5,\,101}$, the information processing apparatus $u_{14}$ is given their subset keys.

Namely, the information processing apparatus $u_{14}$ securely stores ten subset keys $SK_{1,\,100}$, $SK_{1,\,110}$, $SK_{1,\,101}$, $SK_{1,\,111}$, $SK_{2,\,100}$, $SK_{2,\,110}$, $SK_{2,\,101}$, $SK_{5,\,100}$, $SK_{5,\,110}$ and $SK_{5,\,101}$ corresponding to ten subsets $S_{1,\,100}$, $S_{1,\,110}$, $S_{1,\,101}$, $S_{1,\,111}$, $S_{2,\,100}$, $S_{2,\,110}$, $S_{2,\,101}$, $S_{5,\,100}$, $S_{5,\,110}$ and $S_{5,\,101}$, respectively.

FIG. 5 is referred to for a description of the information obtainable only by the information processing apparatus selected by, e.g. a content manager or the like, or, for example, a method for providing a content key, after the setting including the distribution of the subset keys to the information processing apparatus.

Now, it is supposed that information processing apparatus $u_{27}$, $u_{28}$, $u_{33}$, $u_{36}$, $u_{37}$, $u_{38}$, $u_{39}$ and $u_{40}$ (expressed by mark x in FIG. 5) are revoked among information processing apparatus $u_{14}$-$u_{40}$, and that information (for example, the content key Kc) is transmitted to the information processing apparatus other than the revoked information processing apparatus. In this case, if all of the branches from the leaves to which the revoked information processing apparatus are assigned to the root are deleted, one or more respectively isolated partial trees (shown by wide lines in the drawing) remain. A subset defined at the root of a partial tree corresponds to each partial tree, and a content key is enciphered by using a subset key corresponding to the subset. A cryptogram block is then configured, and the broadcast transmission of the cryptogram block is performed.

The partial trees having the configuration of FIG. 5 are, as shown in the drawing, five partial trees 131, 132, 133, 134 and 135, and the roots of these five partial trees are nodes (1, 3, 9, 11 and 12). Namely, in the example of FIG. 5, a transmitter as a provider of a content key generates a cryptogram block by applying a subset key corresponding to a subset corresponding to each partial tree defined at the root of each of these partial trees.

Namely, in the example of FIG. 5, the transmitter as the provider of the content key transmits five cryptograms of $E(SK_{1,\,100}, Kc)$, $E(SK_{3,\,101}, Kc)$, $E(SK_{9,\,100}, Kc)$, $E(SK_{11,\,101}, Kc)$ and $E(SK_{12,\,100}, Kc)$ arranged in the order of the numbers of nodes as the cryptogram block. Only the information processing apparatus holding any one of the subset keys applied to the encryption of the five cryptogram, namely $SK_{1,\,100}$, $SK_{3,\,101}$, $SK_{9,\,100}$, $SK_{11,\,101}$ and $SK_{12,\,100}$, can decode the cryptogram to obtain the content key Kc.

In the example shown in FIG. 5, each of the information processing apparatus belonging to the five partial trees 131, 132, 133, 134 and 135 holds any one of the subset keys $SK_{1,\,100}$, $SK_{3,\,101}$, $SK_{9,\,100}$, $SK_{11,\,101}$ and $SK_{12,\,100}$, and can obtain the content key Kc consequently.

Accordingly, the following hold.

(1) the information processing apparatus $u_{14}$-$u_{22}$ belonging to the partial tree 131 include a subset key $SK_{1,\,100}$, and can decode the cryptogram $E(SK_{1,\,100}, Kc)$ to obtain the content key Kc.

(2) The information processing apparatus $u_{23}$-$u_{25}$ and $u_{29}$-$u_{31}$ belonging to the partial tree 132 includes the subset key $SK_{3,\,101}$, and the information processing apparatus $u_{23}$-$u_{25}$ and $u_{29}$-$u_{31}$ can decode the cryptogram $E(SK_{3,\,101}, Kc)$ to obtain the content key Kc.

(3) The information processing apparatus $u_{26}$ belonging to the partial tree 133 includes the subset key $SK_{9,\,100}$, and can decode the cryptogram $E(SK_{9,\,100}, Kc)$ to obtain the content key Kc.

(4) The information processing apparatus $u_{32}$ and $u_{34}$ belonging to the partial tree 134 includes the subset key $SK_{11,\,101}$, and can decode the cryptogram $E(SK_{11,\,101}, Kc)$ to obtain the content key Kc.

(5) The information processing apparatus $u_{35}$ belonging to the partial tree 135 includes the subset key $SK_{12,\,100}$, and can decode the cryptogram $E(SK_{12,\,100}, Kc)$ to obtain the content key Kc.

On the other hand, the revoked information processing apparatus $u_{27}$, $u_{28}$, $u_{33}$, $u_{36}$, $u_{37}$, $u_{38}$, $u_{39}$ and $u_{40}$ (shown by the mark x in FIG. 5) do not have any one of the subset keys $SK_{1,\,100}$, $SK_{3,\,101}$, $SK_{9,\,100}$, $SK_{11,\,101}$ and $SK_{12,\,100}$, and cannot obtain the content key Kc.

Now, also in the above-mentioned processing, the non-revoked information processing apparatus need to know which cryptogram the apparatus should decode. Then, the non-revoked information processing apparatus produce a key specifying code similar to the above-mentioned binary tree configuration, and performs the broadcast transmission of the produced key specifying code together with a cryptogram block. An information processing apparatus receives the key specifying code and analyzes the code, and thereby can know which cryptogram the apparatus should decode by using which node key to perform decoding processing.

A key specifying code in a three-way tree configuration is described by referring to FIG. 6. In FIG. 6, the tree expressed by wide lines is a key specifying tree. The tree connects all of the nodes (1, 3, 9, 11 and 12) defining subsets corresponding to the subset keys used for encryption, and setting the root (1) of the original tree structure as a root. Then, the tree forms a key specifying tree.

The structure of the key specifying tree is expressed by key specifying information having six bits totally from the root. The key specifying information includes three bit information (child bits) per node indicating the existence of a branch extending to an i-th child from the left side, and three bit information (key specifying bits) indicating the kind of a subset key defined at the node if the subset key is used for encryption.

Each of the first three bits (child bits) of the key specifying information attached to a certain node indicates the extension of a branch toward a child node corresponding to the position of the bit from the node (the existence of the child node corresponding to the key specifying tree) if the bit is "1", and indicates no extension of any branches toward the child node (the inexistence of any corresponding child nodes) if the bit is "0".

For example:
if the information of a certain node is "111", branches extend toward all child nodes;
if the information is "100", a branch extends only toward the child node on the leftmost side;
if the information is "110", branches extend toward the child nodes on the left most side and at the center; and
if the information is "000", no branches extend, and the information indicates that the node is a leaf of the key specifying tree.

Moreover, the three bits (key specifying bits) at the end of the key specifying information indicate which subset keys corresponding to which subsets among ones defined for the node are used for the production of cryptograms in the above-mentioned cryptogram block.

Namely, if the key specifying bit information of a certain node k is "100", the cryptogram block includes a cryptogram to which the subset key $SK_{k, 100}$ is applied. If the information is "110", the cryptogram block includes a cryptogram to which the subset key $SK_{k, 110}$ is applied. If the information is "000", the information indicates that the cryptogram block does not use any subset keys corresponding to the subsets defined for the node.

As shown in FIG. 6, arranging six-bit pieces of key specifying information attached to each node of the key specifying tree in the order of the numbers of the nodes produces the key specifying code.

In the configuration of FIG. 6, because the key specifying tree includes the node numbered to be 1, 3, 4, 9, 11 and 12, the data made by arranging the key specifying information bits of the respective nodes in order, "011100010101110000000100000101000100", is set as the key specifying code.

However, such a key specifying code has a fault such that the configuration bit becomes long. In the above-mentioned configuration, because the key specifying tree includes the six nodes numbered as 1, 3, 4, 9, 11 and 12, and has a piece of six-bit information to each node, then the key specifying code has 6×6=36 bits. As the number of leaves increases and the configuration of the key specifying tree becomes more complex, the key specifying code needs further much number of bits.

Namely, a configuration for reducing the amount of information of the key specifying code has bee proposed. Referring to FIG. 7, the configuration is described. The processing shown in FIG. 7 replaces the child bit of three bits of the first half in the above-mentioned six-bit key specifying code with a leaf bit c of one bit.

In each of the nodes (1, 3, 4, 9, 11, 12 and 13) in the key specifying tree shown in FIG. 7, the one-bit leaf bit c is set in place of the three-bit child bit.

If a leaf bit is "1", the leaf bit indicates that it is a leaf of the key specifying tree.

If a leaf bit is "0", the leaf bit indicates that it is a node other than any leaves.

In the example shown in FIG. 7, the leaf nodes in the key specifying tree are nodes (9, 11, 12 and 13), and the leaf bits of these nodes are set to be "1". The leaf bits of the other nodes, or the nodes (1, 3 and 4), are set to be "0".

If the leaf bit c=1, the node is a leaf of a partial tree, and no branches of the key specifying tree extend from the node. Moreover, if the leaf bit c=0, the node is not any leaves of a partial tree, and branches of the key specifying tree extend from the node. If branches extend is judged on the basis of the key specifying bit information of the three bits in the latter half. Namely, a branch extends toward a child node corresponding to a bit set as d=0 in the key specifying bit information "d, d, d".

Under a supposition such that a leaf bit=c, and that key specifying bits=ddd, for example if the key specifying information of a certain node k is c, ddd=0, 001, the key specifying information indicates that branches extend from the node k to the child nodes on the left side and the center, and that a subset key $SK_{k, 001}$ is applied for encryption. If c, ddd=0, 110, the key-specifying information indicates that a branch extends from the node k to a child node on the right side, and that a subset key $SK_{k, 110}$ is applied for encryption. If the leaf bit c=1, the key specifying information indicates that no branches extend from the node k. The meaning of the subset key to be applied for encryption is the same, and the key specifying information indicates that a subset key $SK_{k, ddd}$ is applied for encryption.

The example shown in FIG. 7 is supposed such that the information processing apparatus $u_{27}$, $u_{28}$, $u_{33}$, $u_{36}$, $u_{37}$, $U_{38}$, $u_{39}$ and $u_{40}$ (expressed by x mark in FIG. 7) are revoked among the information processing apparatus $u_{14}$-$u_{40}$, and that information (for example, a content key Kc) is transmitted to the other information processing apparatus.

In this case, as shown in FIG. 7, the key specifying tree coupling the nodes to which some subsets are defined, or the nodes 1, 3, 9, 11 and 12, with the node which is not any intermediate nodes of the other similar partial trees among the nodes each being a root having the partial trees the leaves belonging to which are all revoked, namely the node 13, is set, and the leaf bit=c and the key specifying bit=ddd are set to each of the nodes (1, 3, 4, 9, 11, 12 and 13) constituting the set key specifying tree as follows.

node 1: (0, 100)
node 3: (0, 101)
node 4: (0,000)
node 9: (1, 100)
node 11: (1, 101)
node 12: (1, 100)
node 13: (1, 000)

As a result, the key specifying code is formed to be a value arranging the respective bits in order, or "0100010100001100110111001000", which is 28 bit information.

By applying the leaf bits in such a way, the key specifying code, which has the amount of information of 36 bits in the example of applying 3 bit child bits thereto as described above with reference to FIG. 6, can be reduced up to 28 bits.

Incidentally, if there are no information processing apparatus to be revoked, a cryptogram using a subset key $SK_{1, 111}$ which is held by all of the information processing apparatus is provided. The state may be expressed by setting the key specifying information of the root to be 1, 111.

Now, an attack to the broadcast encryption system is considered. For example, the following situation may be brought about. Namely, an attacker performs the reverse engineering of a certain information processing apparatus to extract subset keys included in the information processing apparatus, and furthermore the attacker produces a duplication of the information processing apparatus to use the extracted subset key in the duplicated information processing apparatus. It is a matter of course that the duplicated information processing apparatus is an information processing apparatus produced by a pirated edition trader or the like as one out of license, and there is the possibility of performing an unauthorized copy, the re-distribution of a reproduced content to the Internet, and the like, which any licensed apparatus do not perform. Next, a situation in which the duplicated information processing apparatus is dealt in a black market is considered. Moreover, a situation in which the attacker produces receiving software using the subset key and distributes the receiving software through the Internet is conceivable.

If a user can obtain a duplicated information processing apparatus, the user can specify the subset key used in the duplicated information processing apparatus by using reverse engineering or a method described in D. Naor, M. Naor and J. Lotspiech, "Revocation and Tracing Schemes for Stateless Receivers", Advances in Cryptology-Crypto 2001, Lecture Notes in Computer Science 2139, Springer, pp. 41-62, 2001.

Here, if a subset key to a subset including only one leaf is used in a duplicated information processing apparatus, there is only one authorized information processing apparatus having the subset key. Consequently, it is sufficient to revoke the information processing apparatus after that.

However, if a duplicated information processing apparatus does not have such a subset key, and if the duplicated information processing apparatus stores only the subset key (for example, the subset key for the subset defined to an upper node of a tree) corresponding to the subset having a plurality of leaves as components to perform the processing of applying the subset key, then the subset key is one commonly stored in a plurality of information processing apparatus corresponding to a plurality of leaves. Consequently, it is impossible to specify which information processing apparatus the subset key is stolen from.

For example, in the example of FIG. 7, namely in the state in which the information processing apparatus $u_{27}$, $u_{28}$, $u_{33}$, $u_{36}$, $u_{37}$, $u_{38}$, $u_{39}$ and $u_{40}$ (denoted by the x mark in FIG. 7) are revoked among the information processing apparatus $u_{14}$-$u_{40}$, the following situation is supposed. Namely, an attacker performed the reverse engineering of any one of the information processing apparatus $u_{23}$, $u_{24}$, $u_{25}$, $u_{29}$, $u_{30}$ and $u_{31}$, which are not revoked at that time, and the subset key attached to the information processing apparatus was exposed. Then, the attacker produced a duplicated information processing apparatus using only the subset key $SK_{3,\ 101}$ corresponding to the subset $S_{3,\ 101}$ defined at the node 3 among them.

In this case, because the subset key $SK_{3,\ 101}$ corresponding to the subset $S_{3,\ 101}$ defined at the node 3 is the subset key commonly stored by any of the information processing apparatus $u_{23}$, $u_{24}$, $u_{25}$, $u_{29}$, $u_{30}$ and $u_{31}$, a problem of the impossibility of specifying which information processing apparatus attacked, that is to say which information processing apparatus was used in an unauthorized way, is generated. Consequently, there is a problem in which revoke processing specifying a fraudulent information processing apparatus cannot perform.

SUMMARY OF THE INVENTION

It is desirable to provide an information processing apparatus, an information recording medium, an information processing method and/or a computer program, all capable of the specification of an information processing apparatus corresponding to a leaf as an efficient revoke object in the case where various attacks by an attacker is performed in a cryptogram transmitting configuration to which an information delivery system using a tree structure is applied.

To put it more concretely, it is desirable to provide an information processing apparatus, an information recording medium, an information processing method and/or a computer program, all capable of providing a cryptogram in which various subsets are set by adding new information as the configuration information of key specifying code, and all capable of efficiently selecting a decodable cryptogram by means of a subset key held by the apparatus and so forth itself on the basis of a key specifying code including key specifying information according to the present invention in an information processing apparatus as a user device for accepting a cryptogram.

The present invention is made in view of such a situation.

According to a first aspect of the present invention, there is provided an information processing apparatus for executing cryptogram generating processing. The apparatus has a configuration for executing processing of generating a cryptogram block and a key specifying code, which are providing information to an information processing apparatus, the cryptogram block including cryptograms that can be obtained by decoding processing based on a key stored only in a selected information processing apparatus extracted as a target of providing the cryptograms from a plurality of information processing apparatus corresponding to leaves of lowest rank nodes of a multi-way tree configuration, the key specifying code being encryption key information applied to the cryptograms included in the cryptogram block, and wherein the key specifying code includes key specifying information to each configuration node of a key specifying tree having the selected information processing apparatus as a leaf, and the key specifying information has a configuration including subset division identifying information indicating whether or not the cryptograms, to which subset keys corresponding to divided subsets obtained by division of a dividable subset into a plurality of subsets are applied, are included in the cryptogram block, the dividable subset being defined as a set of specific leaves in the configuration nodes of the key specifying tree.

Moreover, in an embodiment of the information processing apparatus according to the present invention, the key specifying information takes a configuration including a leaf bit indicating whether or not a configuration node of the key specifying tree corresponds to a leaf, a key specifying bit indicating whether or not a cryptogram, to which a subset key corresponding to a subset defined for the node is applied, is included in the cryptogram block, and a partition bit that serves as the subset division identifying information indicating whether or not the cryptograms, to which the subset keys corresponding to the divided subsets obtained by the division of the dividable subset defined at the node into the plurality of subsets, are included in the cryptogram block.

Moreover, in an embodiment of the information processing apparatus of the present invention, the multi-way tree takes a three-way tree configuration, and the subset division identifying information is one-bit information set correspondingly to the configuration node of the key specifying tree. Further, in a configuration of the embodiment, a value 0 or 1 of the subset division identifying bit information indicates whether the cryptograms, to which the subset keys corresponding to the divided subsets obtained by the division of the dividable subset defined at the node into the plurality of subsets, are included in the cryptogram block, or whether a cryptogram to which a subset key corresponding to the dividable subset is applied is included in the cryptogram block.

Moreover, in an embodiment of the information processing apparatus of the present invention, the key specifying information takes a configuration further including division method specifying information indicating a division mode of the divided subset.

Moreover, an embodiment of the information processing apparatus of the present invention is configured such that the multi-way tree has a three-way tree configuration, and that the division method specifying information is two-bit information correspondingly set to the configuration nodes of the key specifying tree. The division method specifying information is set to be a piece of information, as a division mode of branches a, b and c set to the nodes, indicating which division mode of ab and c, ac and b, a and bc, or, a and b and c the information is, based on bit information 00-11 that serves as the division method specifying information.

Moreover, in an embodiment of the information processing apparatus of the present invention, the key specifying information is information configured to be coded data capable of identifying a combination of: a key specifying bit (a), a partition bit (b), and a division method specifying information bit (c), wherein the key specifying bit (a) indicates whether or not a cryptogram, to which a subset key corresponding to a subset defined at a configuration node of the key specifying tree is applied, is included in the cryptogram block, and the partition bit (b) is subset division identifying information indicating whether or not a cryptogram, to which a subset key corresponding to a divided subset produced by dividing a dividable subset defined at the configuration node into a plurality of divided subsets is applied, is included in the cryptogram block, and the division method specifying information bit (c) indicates a division mode of the divided subset.

Moreover, in an embodiment of the information processing apparatus of the present invention, the multi-way tree has a three-way tree configuration, and the key specifying information includes total of six bits including three bit of key specifying bits, one bit of a partition bit, and two bits of division method specifying information bits, and the coded data is information produced by configuring the combination of the key specifying bit, the partition bit and the division method specifying information bit to be identifiable four-bit coded data.

Moreover, in an embodiment of the information processing apparatus of the present invention, the key specifying information is five-bit information including one bit of a leaf bit indicating whether or not a configuration node of the key specifying tree corresponds to a leaf, and four bits of the coded data capable of identifying the combination of the key specifying bit, the partition bit and the division method specifying information bit.

Moreover, in an embodiment of the information processing apparatus of the present invention, the coded data corresponding to key specifying information unnecessary to identify the division mode of a divided subset includes a bit configuration common to the combination of the key specifying bit and the partition bit.

Moreover, in an embodiment of the information processing apparatus of the present invention, the coded data is configured to set the number of cryptograms included in the cryptogram block as identifiable bit information.

Moreover, in an embodiment of the information processing apparatus of the present invention, the information processing apparatus is configured to execute processing of generating, as providing information to the information processing apparatus, the cryptogram block, the key specifying code and key specifying information encoding method identifying information capable of identifying an encoding method of the key specifying information included in the key specifying code.

Moreover, according to a second aspect of the present invention, there is provided an information processing apparatus for executing cryptogram decoding processing, the apparatus configured to input a cryptogram block and a key specifying code, the cryptogram block including cryptograms obtainable by decoding processing based on a key stored in a selected information processing apparatus extracted as a target of providing the cryptogram from a plurality of information processing apparatus corresponding to leaves as lowest rank nodes of a multi-way tree configuration, the key specifying code being as encryption key information applied to the cryptogram constituting the cryptogram block;

wherein the apparatus is configured to:

obtain key specifying information for each configuration node of a key specifying tree having the selected information processing apparatus as a leaf from the key specifying code;

obtain from the key specifying information subset division identifying information indicating whether or not a cryptogram, to which a subset key corresponding to a divided subset produced by dividing a dividable subset defined as a set of specific leaves into a plurality of subsets is applied, is included in the cryptogram block; and execute processing of selecting a cryptogram as a target of decoding processing from the cryptograms included in the cryptogram block on the basis of the obtained information.

Moreover, in an embodiment of the information processing apparatus of the present invention, the key specifying information takes a configuration including a leaf bit indicating whether or not a configuration node of the key specifying tree corresponds to a leaf, a key specifying bit indicating whether or not a cryptogram, to which a subset key corresponding to a subset defined for the node is applied, is included in the cryptogram block, and a partition bit that serves as the subset division identifying information indicating whether or not the cryptograms, to which the subset keys corresponding to the divided subsets obtained by the division of the dividable subset defined at the node into the plurality of subsets, are included in the cryptogram block, wherein processing of selecting a cryptogram that is a target of decoding processing from the cryptograms included in the cryptogram block is executed on the basis of the leaf bit, the key specifying bit and the partition bit.

Moreover, in an embodiment of the information processing apparatus of the present invention, the multi-way tree takes a three-way tree configuration, and the subset division identifying information is one-bit information set correspondingly to the configuration node of the key specifying tree, and the information processing apparatus takes a configuration judging whether the cryptograms, to which the subset keys corresponding to the divided subsets produced by dividing the dividable subset defined for the node into a plurality of divided subsets, are included in the cryptogram block, or whether a cryptogram to which a subset key corresponding to the dividable subset is included, on the basis of a value 0 or 1 of the subset division identifying information.

Furthermore, in an embodiment of the information processing apparatus of the present invention, the information processing apparatus is configured to include a table mapping information modes of the key specifying information to cryptogram modes corresponding to the respective modes, and to execute the processing of selecting a cryptogram as a target of decoding processing from the cryptograms included in the cryptogram block on the basis of the table and the obtained information.

Moreover, in an embodiment of the information processing apparatus of the present invention, the key specifying information takes a configuration further including division method specifying information indicating a division mode of the divided subset, wherein the information processing apparatus judges the division mode of a divided subset on the basis of the division method specifying information, and executes the processing of selecting the cryptogram as the object of decoding processing from the cryptograms included in the cryptogram block on the basis of the judged information.

Moreover, in an embodiment of the information processing apparatus of the present invention, the multi-way tree has a three-way tree configuration, the division method specifying information is two-bit information set correspondingly to a configuration node of the key specifying tree configuration node, and the information processing apparatus is configured to execute processing for identifying which division mode of ab and c, ac and b, a and bc, or a, b and c, the division modes of branches a, b and c set at the node are, based on bit information 00-11 that serves as the division method specifying information.

Moreover, in an embodiment of the information processing apparatus of the present invention, the key specifying information is information generated by configuring a combination of: a key specifying bit (a), a partition bit (b), and a division method specifying information bit (c) as identifiable coded data, wherein the key specifying bit (a) indicates whether or not a cryptogram, to which a subset key corresponding to a subset defined at a configuration node of the key specifying tree is applied, is included in the cryptogram block, and the partition bit (b) is subset division identifying information indicating whether or not a cryptogram, to which a subset key corresponding to a divided subset produced by dividing a dividable subset defined at the configuration node into a plurality of divided subsets is applied, is included in the cryptogram block, and the division method specifying information bit (c) indicates a division mode of the divided subset, and the information processing apparatus executes processing of selecting a cryptogram that is a target of decoding processing from the cryptograms included in the cryptogram block on the basis of the coded data.

Furthermore, in an embodiment of the information processing apparatus of the present invention, the information processing apparatus is configured to include a table that maps data modes of the coded data to cryptogram modes corresponding to the respective modes, and to execute the processing of selecting a cryptogram as a target of decoding processing from the cryptograms included in the cryptogram block on the basis of the table and the coded information.

Moreover, in an embodiment of the information processing apparatus of the present invention, the multi-way tree has a three-way tree configuration, and the key specifying information includes coded data based on a total of six bits of three bit of key specifying bits, one bit of a partition bit, and two bits of division method specifying information bits, and the coded data is four-bit coded data identifiable a combination of the key specifying bit, the partition bit and the division method specifying information bit, and the information processing apparatus executes processing of selecting a cryptogram that is a target of decoding processing from the cryptograms included in the cryptogram block on the basis of the four-bit coded data.

Moreover, in an embodiment of the information processing apparatus of the present invention, the information processing apparatus is configured to;
 input the cryptogram block, the key specifying code and key specifying information encoding method identifying information made to be capable of identifying an encoding method of key specifying information included in the key specifying code;
 identify the encoding method of the key specifying code on the basis of the key specifying information encoding method identifying information; and
 execute processing of selecting a cryptogram as a target of decoding processing from the cryptograms included in the cryptogram block by parsing the key specifying code on the basis of an identification result.

Moreover, according to a third aspect of the present invention, there is provided an information recording medium, storing a cryptogram block including obtainable cryptograms by decoding processing based on a key stored only in a selected information processing apparatus extracted as a target of providing the cryptograms from a plurality of information processing apparatus corresponding to leaves as lowest rank nodes of a multi-way tree configuration, and a key specifying code that serves as encryption key information applied to the cryptograms constituting the cryptogram block, wherein the key specifying code includes key specifying information to each configuration node of a key specifying tree having the selected information processing apparatus as a leaf, and the key specifying information takes a configuration including subset division identifying information indicating whether or not the cryptograms, to which subset keys corresponding to divided subsets obtained by division of a dividable subset into a plurality of subsets are applied, are included in the cryptogram block, the dividable subset defined as a set of specific leaves in the configuration nodes of the key specifying tree.

Moreover, in an embodiment of the information recording medium of the present invention, the key specifying information takes a configuration including a leaf bit indicating whether or not a configuration node of the key specifying tree corresponds to a leaf, a key specifying bit indicating whether or not a cryptogram, to which a subset key corresponding to a subset defined for the node is applied, is included in the cryptogram block, and a partition bit that serves as the subset division identifying information indicating whether or not the cryptograms, to which the subset keys corresponding to the divided subsets obtained by the division of the dividable subset defined at the node into the plurality of subsets, are included in the cryptogram block.

Moreover, in an embodiment of the information recording medium of the present invention, the multi-way tree takes a three-way tree configuration, and the subset division identifying information is one-bit information set correspondingly to the configuration node of the key specifying tree, and the information recording medium is configured to indicate by a value 0 or 1 of the subset division identifying bit information whether the cryptograms, to which the subset keys corresponding to the divided subsets obtained by the division of the dividable subset defined at the node into the plurality of subsets, are included in the cryptogram block, or whether a cryptogram to which a subset key corresponding to the dividable subset is applied is included in the cryptogram block.

Moreover, in an embodiment of the information recording medium of the present invention, the key specifying information takes a configuration further including division method specifying information indicating a division mode of the divided subset.

Moreover, an embodiment of the information recording medium of the present invention is configured such that the multi-way tree has a three-way tree configuration, and that the division method specifying information is two-bit information correspondingly set to the configuration nodes of the key specifying tree and further is set to be a piece of information indicating which division mode of ab and c, ac and b, a and bc, or a and b and c, the division modes of branches a, b and c set at the node are, based on bit information 00-11 that serves as the division method specifying information.

Moreover, in an embodiment of the information recording medium of the present invention, the key specifying information is coded data capable of identifying a combination of: a key specifying bit (a), a partition bit (b), and a division method specifying information bit (c) as identifiable coded data, wherein the key specifying bit (a) indicates whether or not a cryptogram, to which a subset key corresponding to a subset defined at a configuration node of the key specifying tree is applied, is included in the cryptogram block, and the partition bit (b) is subset division identifying information indicating whether or not a cryptogram, to which a subset key corresponding to a divided subset produced by dividing a dividable subset defined at the configuration node into a plurality of divided subsets is applied, is included in the cryptogram block, and the division method specifying information bit (c) indicates a division mode of the divided subset.

Moreover, in an embodiment of the information recording medium of the present invention, the multi-way tree has a three-way tree configuration, and the key specifying information includes a total of six bits of three bit of key specifying bits, one bit of a partition bit, and two bits of division method specifying information bits, and the coded data is coded data capable of identifying the combination of the key specifying bit, the partition bit and the division method specifying information.

Moreover, in an embodiment of the information recording medium of the present invention, the key specifying information is five-bit information including one bit of a leaf bit indicating whether or not a configuration node of the key specifying tree corresponds to a leaf, and four bits of the coded data capable of identifying the combination of the key specifying bit, the partition bit and the division method specifying information bit.

Moreover, in an embodiment of the information recording medium of the present invention, the coded data corresponding to key specifying information unnecessary to identify the division mode of a divided subset includes a bit configuration common to the combination of the key specifying bit and the partition bit.

Moreover, in an embodiment of the information recording medium of the present invention, the coded data is bit information capable of identifying the number of the cryptograms included in the cryptogram block.

Moreover, in an embodiment of the information recording medium of the present invention, the information recording medium is configured to store the cryptogram block, the key specifying code and key specifying information encoding method identifying information capable of identifying an encoding method of the key specifying information included in the key specifying code.

Moreover, according to a fourth aspect of the present invention, there is provided an information processing method for executing cryptogram generating processing, the method including the steps of:
generating a cryptogram block including obtainable cryptograms by decoding processing based on a key stored only in a selected information processing apparatus extracted as a target of providing the cryptograms from a plurality of information processing apparatus corresponding to leaves as lowest rank nodes of a multi-way tree configuration; and
generating a key specifying code that serves as encryption key information applied to the cryptograms constituting the cryptogram block,
wherein the step of generating a key specifying code includes a step of setting subset division identifying information as key specifying information at each configuration node of a key specifying tree having the selected information processing apparatus as leaves, the subset division identifying information indicating whether or not the cryptograms, to which subset keys corresponding to divided subsets obtained by division of a dividable subset into a plurality of subsets are applied, are included in the cryptogram block, the dividable subset defined as a set of specific leaves in the configuration nodes of the key specifying tree.

Moreover, in an embodiment of the information processing method of the present invention, the step of generating a key specifying code includes a step of setting as the key specifying information a leaf bit indicating whether or not a configuration node of the key specifying tree corresponds to a leaf, a key specifying bit indicating whether or not a cryptogram, to which a subset key corresponding to a subset defined for the node is applied, is included in the cryptogram block, and a partition bit that serves as the subset division identifying information indicating whether or not the cryptograms, to which the subset keys corresponding to the divided subsets obtained by the division of the dividable subset defined at the node into the plurality of subsets, are included in the cryptogram block.

Moreover, in an embodiment of the information processing method of the present invention, the multi-way tree takes a three-way tree configuration, and the step of generating a key specifying code sets the subset division identifying information set to the key specifying information as one-bit information set correspondingly to the configuration node of the key specifying tree, and set as an information bit indicating by a value 0 or 1 of the subset division identifying bit information whether the cryptograms, to which the subset keys corresponding to the divided subsets obtained by the division of the dividable subset defined at the node into the plurality of subsets, are included in the cryptogram block, or whether a cryptogram to which a subset key corresponding to the dividable subset is applied is included in the cryptogram block.

Moreover, in an embodiment of the information processing method of the present invention, the step of generating a key specifying code further includes a step of setting division method specifying information indicating a division mode of the divided subset as the key specifying information.

Moreover, in an embodiment of the information processing method of the present invention, the multi-way tree has a three-way tree configuration, and the step of generating a key specifying code sets as the division method specifying information set to the key specifying information two-bit information correspondingly set to the configuration nodes of the key specifying tree, and sets as information indicating which division mode of ab and c, ac and b, a and bc, or a and b and c, as a division mode of branches a, b and c set to the nodes the information is, based on bit information 00-11 that serves as the division method specifying information.

Moreover, in an embodiment of the information processing method of the present invention, the step of generating a key specifying code includes a process of generating as the key specifying information coded data capable of identifying a combination of: a key specifying bit (a), a partition bit (b), and a division method specifying information bit (c), wherein the key specifying bit (a) indicates whether or not a cryptogram, to which a subset key corresponding to a subset defined at a configuration node of the key specifying tree is applied, is included in the cryptogram block, and the partition bit (b) is subset division identifying information indicating whether or not a cryptogram, to which a subset key corresponding to a divided subset produced by dividing a dividable subset defined at the configuration node into a plurality of divided subsets is applied, is included in the cryptogram block, and the division method specifying information bit (c) indicates a division mode of the divided subset.

Moreover, in an embodiment of the information processing method of the present invention, the multi-way tree has a three-way tree configuration, and the step of generating a key specifying code includes a step of generating the key specifying information includes a total of six bits of three bit of key specifying bits, one bit of a partition bit, and two bits of division method specifying information bits, and the coded data as four-bit coded data capable of identifying the combination of the key specifying bit, the partition bit and the division method specifying information bit.

Moreover, in an embodiment of the information processing method of the present invention, the step of generating a key specifying code includes a step of generating five-bit information including one bit of a leaf bit indicating whether or not a configuration node of the key specifying tree corresponds to a leaf, and four bits of the coded data capable of identifying the combination of the key specifying bit, the partition bit and the division method specifying information bit.

Moreover, in an embodiment of the information processing method of the present invention, at the step of generating a key specifying code, the coded data corresponding to key specifying information unnecessary to identify the division mode of a divided subset is set as a bit configuration common to the combination of the key specifying bit and the partition bit.

Moreover, in an embodiment of the information processing method of the present invention, at the step of generating a key specifying code, the coded data is set as bit information capable of identifying the number of cryptograms included in the cryptogram block.

Moreover, in an embodiment of the information processing method of the present invention, the information processing method includes a step of generating, as providing information to the information processing apparatus, key specifying information encoding method identifying information capable of identifying the cryptogram block, the key specifying code and an encoding method of the key specifying information included in the key specifying code.

Moreover, according to a fifth aspect of the present invention, there is provided an information processing method for executing cryptogram decoding processing, the method including the steps of:
inputting a cryptogram block including cryptograms obtainable by decoding processing based on a key stored in a selected information processing apparatus extracted as a target of providing the cryptogram from a plurality of information processing apparatus corresponding to leaves as lowest rank nodes of a multi-way tree configuration, and a key specifying code that serves as encryption key information applied to the cryptogram constituting the cryptogram block;
parsing a key specifying code by obtaining key specifying information to each configuration node of a key specifying tree having the selected information processing apparatus as a leaf from the key specifying code, and by obtaining from the key specifying information subset division identifying information indicating whether or not a cryptogram, to which a subset key corresponding to a divided subset produced by dividing a dividable subset defined as a set of specific leaves into a plurality of subsets is applied, is included in the cryptogram block; and
executing processing of selecting a cryptogram as a target of decoding processing from the cryptograms included in the cryptogram block on the basis of the obtained information obtained at the step of parsing a key specifying code.

Moreover, in an embodiment of the information processing method of the present invention, the key specifying information includes a leaf bit indicating whether or not a configuration node of the key specifying tree corresponds to a leaf, a key specifying bit indicating whether or not a cryptogram, to which a subset key corresponding to a subset defined for the node is applied, is included in the cryptogram block, and a partition bit that serves as the subset division identifying information indicating whether or not the cryptograms, to which the subset keys corresponding to the divided subsets obtained by the division of the dividable subset defined at the node into the plurality of subsets, are included in the cryptogram block, and the step of parsing a key specifying code is a step of executing processing of obtaining information necessary for selecting a cryptogram that is a target of decoding processing from the cryptograms included in the cryptogram block is executed on the basis of the leaf bit, the key specifying bit and the partition bit.

Moreover, in an embodiment of the information processing method of the present invention, the multi-way tree takes a three-way tree configuration, and the subset division identifying information is one-bit information set correspondingly to the configuration node of the key specifying tree, and the step of parsing a key specifying code includes a step of judging whether the cryptograms, to which the subset keys corresponding to the divided subsets produced by dividing the dividable subset defined for the node into a plurality of divided subsets, are included in the cryptogram block, or whether a cryptogram to which a subset key corresponding to the dividable subset is included on the basis of a value 0 or 1 of the subset division identifying information.

Furthermore, in an embodiment of the information processing method of the present invention, the step of parsing a key specifying code includes a step of executing processing of obtaining information necessary for selecting a cryptogram that is a target of decoding processing from the cryptograms included in the cryptogram block on the basis of a table mapping information modes of the key specifying information to cryptogram modes corresponding to the respective modes.

Moreover, in an embodiment of the information processing method of the present invention, the key specifying information further includes division method specifying information indicating a division mode of the divided subset, and the step of parsing a key specifying code includes a step of judging the division mode of a divided subset on the basis of the division method specifying information, and executing processing of obtaining information necessary for selecting a cryptogram that is a target of decoding processing from the cryptograms included in the cryptogram block on the basis of the judged information.

Moreover, in an embodiment of the information processing method of the present invention, the multi-way tree has a three-way tree configuration, and the division method specifying information is two-bit information set correspondingly to a configuration node of the key specifying tree configuration node, and furthermore the step of parsing a key specifying code includes a step of executing processing of identifying which division mode of ab and c, ac and b, a and bc, or a, b and c the division modes of branches a, b and c set at the node are, based on bit information 00-11 that serves as the division method specifying information.

Moreover, in an embodiment of the information processing method of the present invention, the key specifying information is information generated by configuring a combination of: a key specifying bit (a), a partition bit (b), and a division method specifying information bit (c) as identifiable coded data, wherein the key specifying bit (a) indicates whether or not a cryptogram, to which a subset key corresponding to a subset defined at a configuration node of the key specifying tree is applied, is included in the cryptogram block, and the partition bit (b) is subset division identifying information indicating whether or not a cryptogram, to which a subset key corresponding to a divided subset produced by dividing a dividable subset defined at the configuration node into a plurality of divided subsets is applied, is included in the cryptogram block, and the division method specifying information bit (c) indicates a division mode of the divided subset, and the step of parsing a key specifying code includes a step of executing processing of obtaining information necessary for selecting a cryptogram that is a target of decoding processing from the cryptograms included in the cryptogram block on the basis of the coded data.

Furthermore, in an embodiment of the information processing method of the present invention, the step of parsing a key specifying code includes a step of executing processing of obtaining information necessary for selecting a cryptogram as a target of decoding processing from the cryptograms included in the cryptogram block on the basis of a table mapping a data mode of the coded data to a cryptogram mode corresponding to each mode.

Moreover, in an embodiment of the information processing method of the present invention, the multi-way tree has a three-way tree configuration, and the key specifying information includes coded data based on a total of six bits of three bit of key specifying bits, one bit of a partition bit, and two bits of division method specifying information bits, and the coded data is four-bit coded data identifiable a combination of the key specifying bit, the partition bit and the division method specifying information bit, and the step of parsing a key specifying code includes a step of executing processing of selecting a cryptogram that is a target of decoding processing from the cryptograms included in the cryptogram block on the basis of the four-bit coded data.

Moreover, in an embodiment of the information processing method of the present invention, the information processing method further including a step of inputting key specifying information encoding method identifying information made to be capable of identifying an encoding method of key specifying information included in the key specifying code; and
  a step of identifying the encoding method of the key specifying code on the basis of the key specifying information encoding method identifying information to execute parsing of the key specifying code on the basis of an identification result.

Moreover, according to a sixth aspect of the present invention, there is provided a computer program for executing cryptogram generating processing, the program including:
  a generating step of a cryptogram block including obtainable cryptograms by decoding processing based on a key stored only in a selected information processing apparatus extracted as a target of providing the cryptograms from a plurality of information processing apparatus corresponding to leaves as lowest rank nodes of a multi-way tree configuration; and
  a generating step of a key specifying code that serves as encryption key information applied to the cryptograms constituting the cryptogram block,
  wherein the generating step of a key specifying code includes a step of setting subset division identifying information as key specifying information at each configuration node of a key specifying tree having the selected information processing apparatus as leaves, the subset division identifying information indicating whether or not the cryptograms, to which subset keys corresponding to divided subsets obtained by division of a dividable subset into a plurality of subsets are applied, are included in the cryptogram block, the dividable subset defined as a set of specific leaves in the configuration nodes of the key specifying tree.

Moreover, according to a seventh aspect of the present invention, there is provided a computer program for executing cryptogram decoding processing, the method including:
  a inputting step of a cryptogram block including cryptograms obtainable by decoding processing based on a key stored in a selected information processing apparatus extracted as a target of providing the cryptogram from a plurality of information processing apparatus corresponding to leaves as lowest rank nodes of a multi-way tree configuration, and a key specifying code that serves as encryption key information applied to the cryptogram constituting the cryptogram block;
  a parsing step of a key specifying code by obtaining key specifying information to each configuration node of a key specifying tree having the selected information processing apparatus as a leaf from the key specifying code, and by obtaining from the key specifying information subset division identifying information indicating whether or not a cryptogram, to which a subset key corresponding to a divided subset produced by dividing a dividable subset defined as a set of specific leaves into a plurality of subsets is applied, is included in the cryptogram block; and
  an executing step of processing of selecting a cryptogram as a target of decoding processing from the cryptograms included in the cryptogram block on the basis of the obtained information obtained at the step of parsing a key specifying code.

The computer program according to the embodiments of the present invention is a computer program capable of being provided to, for example, a computer system capable of executing various program codes by means of storage media providing the program in a formula readable by a computer and a communication medium such as recording media including CD, FD and MO, and a network. By providing such a program in the form readable by a computer, processing in accordance with a program can be executed on a computer system.

The other objects, features and advantages of the present invention will be clear by more minute description based on the embodiments of the present invention, which will be described later, and the attached drawings. Incidentally, a system in the present specification indicates a logical set configuration of a plurality of apparatus, and is not limited to ones in which the apparatus of each configuration is in the same housing.

According to the configuration of the embodiments of the present invention, the following configuration is adopted. By the configuration, a cryptogram block including cryptograms obtainable by decoding processing based on a key stored only in a selected information processing apparatus extracted as a target of providing the cryptograms from a plurality of information processing apparatus corresponding leaves as lowest rank nodes of a multi-way tree configuration is generated as providing information to the information processing apparatus, and key specifying information at each key specifying tree node, the key specifying information being configuration data of a key specifying code, includes subset division identifying information (partition bit) indicating whether or not the cryptograms, to which subset keys corresponding to divided subsets obtained by division of a dividable subset into a plurality of subsets are applied and in which the dividable subset is defined as a set of specific leaves, are including in the cryptogram block. Consequently, it becomes possible to generate a cryptogram to which the subset key corresponding to a divided subset is applied to transmit the generated cryptogram to an information processing apparatus. On the side of an information processing apparatus accepting the cryptogram and the key specifying code, the apparatus can judge whether or not the accepted cryptogram is the one to which the subset key corresponding to the divided subset is applied, and can select the cryptogram that is a target of decoding by the apparatus itself on the basis of the key specifying code.

According to the configuration of the embodiments of the present invention, because the cryptograms setting various divided subsets can be provided in a cryptogram transmitting configuration to which an information delivery system using a tree structure is applied, the information processing apparatus corresponding to a leaf as an revoke object can be efficiently specified when various attacks by an attacker are performed.

Moreover, according to the configuration of the embodiments of the present invention, because the configuration is one setting a partition specifying bit indicating a division mode even in a subset having a plurality of division modes, the setting of an arbitrary division mode such as various combinations of two branches and one branch in a three-way tree configuration, and the setting of a divided subset at each of the three branches. An information processing apparatus for performing the selection of a cryptogram from a cryptogram block and decoding processing can select a cryptogram being a decoding object by parsing a partition specifying bit included in key specifying information included in a key specifying code.

Moreover, according to a configuration of encoding bit information of a key specifying bit, a partition bit and a partition specifying bit in the configuration of the present invention, the amount of information of the key specifying code can be reduced.

BRIEF DESCRIPTION OF THE DRAWINGS

The above and other objects, features and advantages of the present invention will become more apparent from the following description of the presently preferred exemplary embodiment of the invention taken in conjunction with the accompanying drawing, in which:

FIG. 11 is a view showing a correspondence table showing a correspondence between values capable of meeting a combination (ddd, e) of key specifying bits (ddd) and a partition bit (e) at an arbitrary node i and cryptograms included in a cryptogram block at that time in the configuration according to Embodiment 1;

FIG. 13 is a view for illustrating processing of re-setting by dividing a partial tree into a plurality of partial trees;

FIG. 16 is a view showing patterns of key specifying bits ddd, a partition bit e and partition specifying bits ff in key specifying information set at a node i constituting a key specifying tree in Embodiment 2;

FIG. 17 is a view showing an example of setting key specifying information having seven-bit configuration of key specifying information (c, ddd, e, ff) according to Embodiment 2 to each configuration node of the key specifying tree;

FIG. 18 is a view for illustrating an example of setting a five-bit value of (ddd, e, ff) as an encoded four-bit value (gggg) or (hhhh);

FIG. 19 is a view showing the configurations of key specifying information set at each node of a key specifying tree in case of adopting a five-bit configuration of (c, gggg), and a key specifying code at that time;

DETAILED DESCRIPTION OF THE EMBODIMENTS

Below, details of an information processing apparatus, an information recording medium, an information processing method and a computer program of the present invention are described with reference to the accompanying drawings.

Embodiment 1

As described in the Background section, a cryptogram is set as obtainable information only by a specific information processing apparatus by means of a multi-way tree configuration. A key specifying code indicating which cryptogram each information processing apparatus should select is transmitted together with cryptograms. Thereby, an information processing apparatus receiving the cryptograms selects a cryptogram decodable by the own apparatus on the basis of the key specifying code, and then the apparatus can efficiently decode the cryptograms.

As described above, the key specifying code includes configuration information of a key specifying tree and the information indicating which node key is applied. The multi-way tree configuration described by referring to FIG. 7 above is configured to reduce the amount of information of a key specifying code by applying leaf bits.

Figure 1:
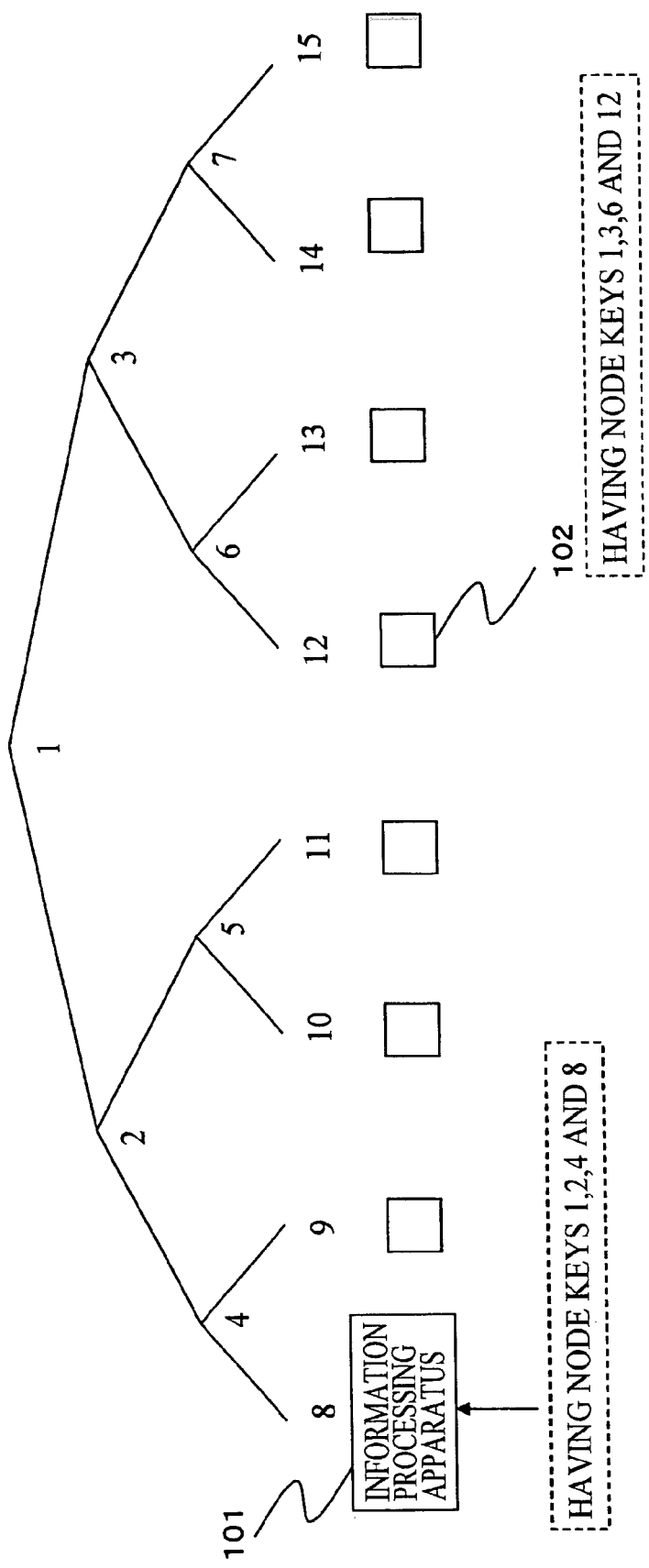
FIG. 1 is a view for illustrating a binary tree hierarchical tree structure.
Figure 2:
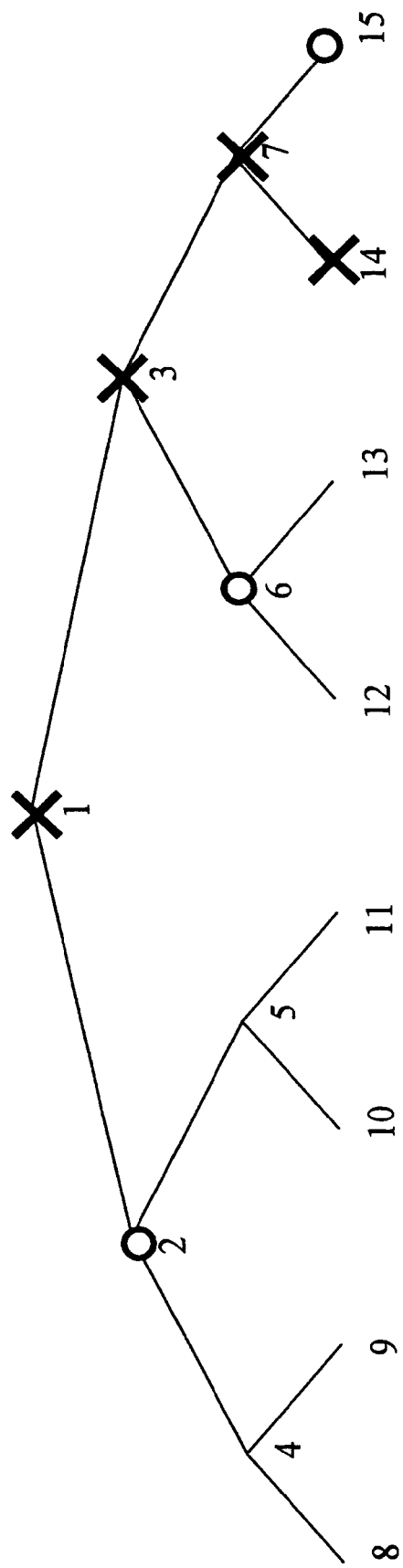
FIG. 2 is a view for illustrating a method by which the information obtainable only by selected information processing apparatus is transmitted in a binary tree hierarchical tree structure.
Figure 3:
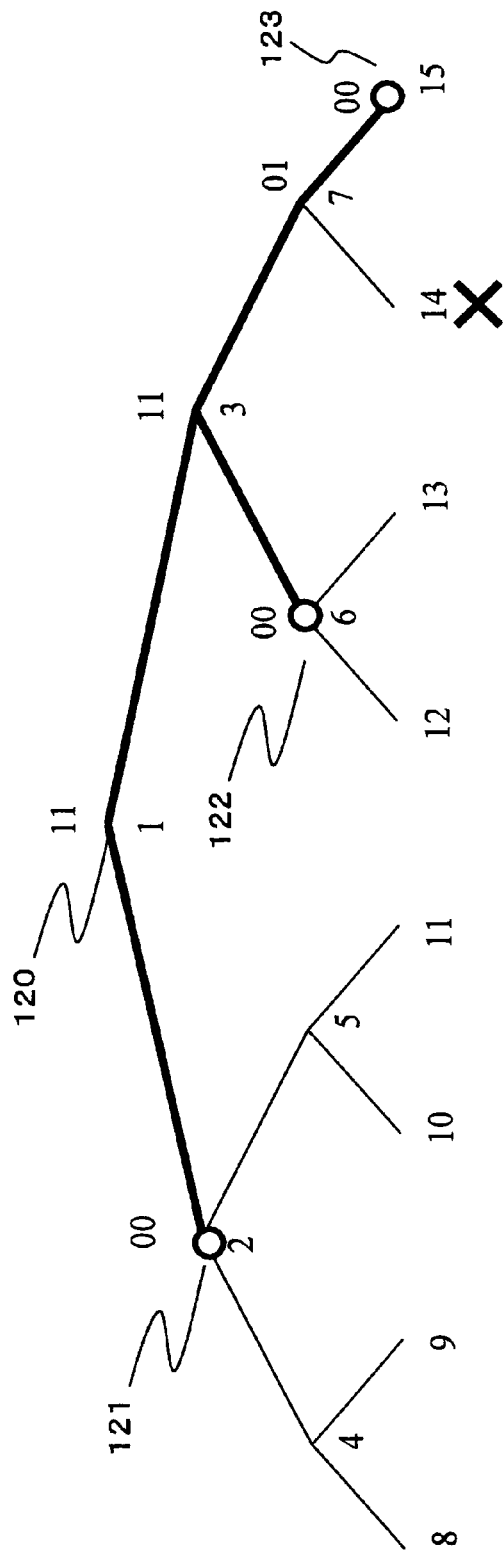
FIG. 3 is a view for illustrating a configuration for providing each information processing apparatus key specifying code together with cryptograms.
Figure 4:
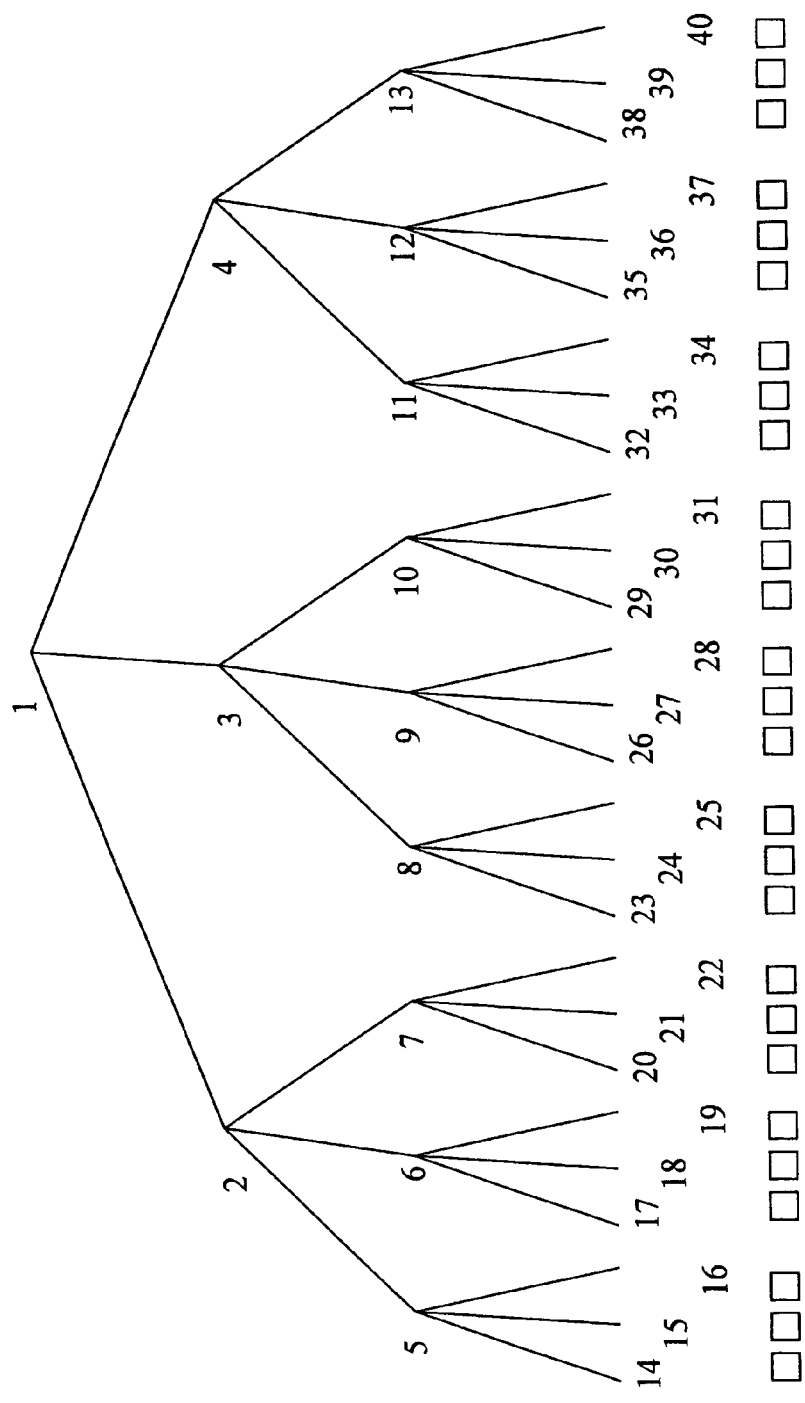
FIG. 4 is a view showing a three-way tree configuration as a configuration example of an a-way tree.
Figure 5:
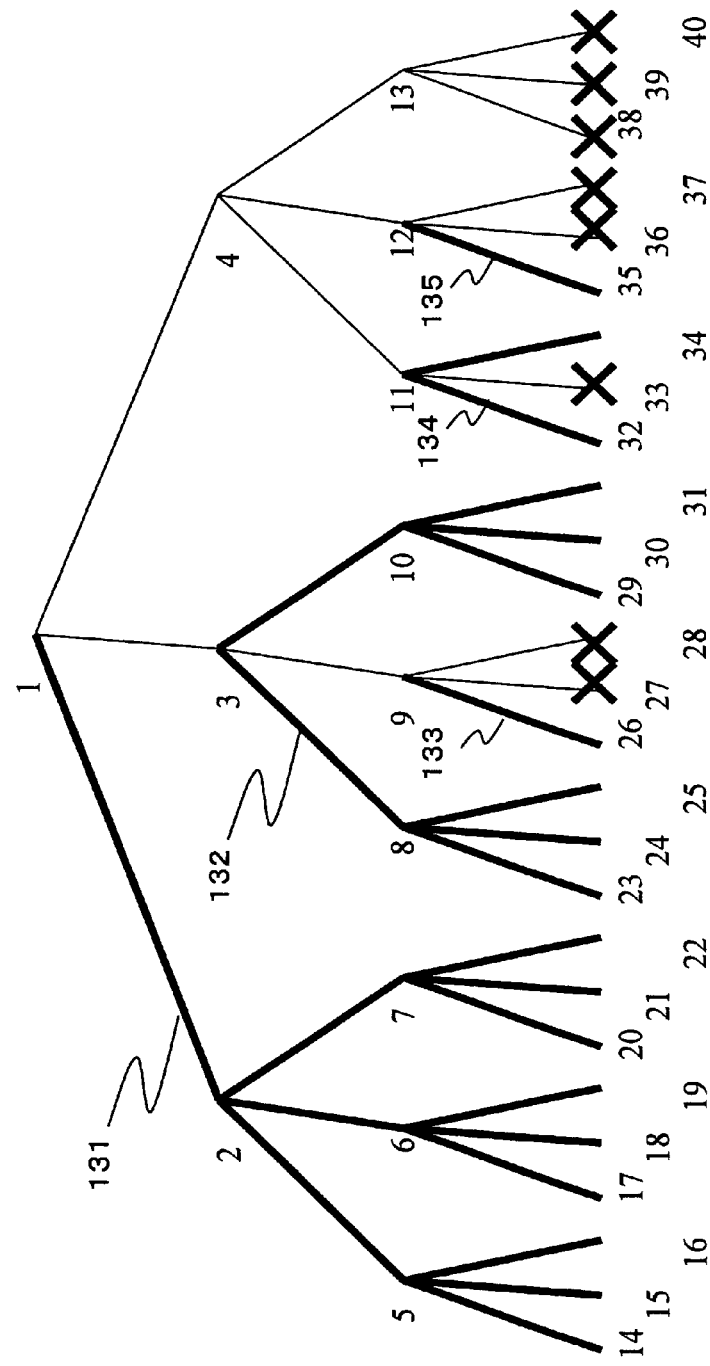
FIG. 5 is a view for illustrating a method for providing the information such as a content key obtainable by information processing apparatus selected by, for example, a content manager or the like in a three-way tree configuration.
Figure 6:
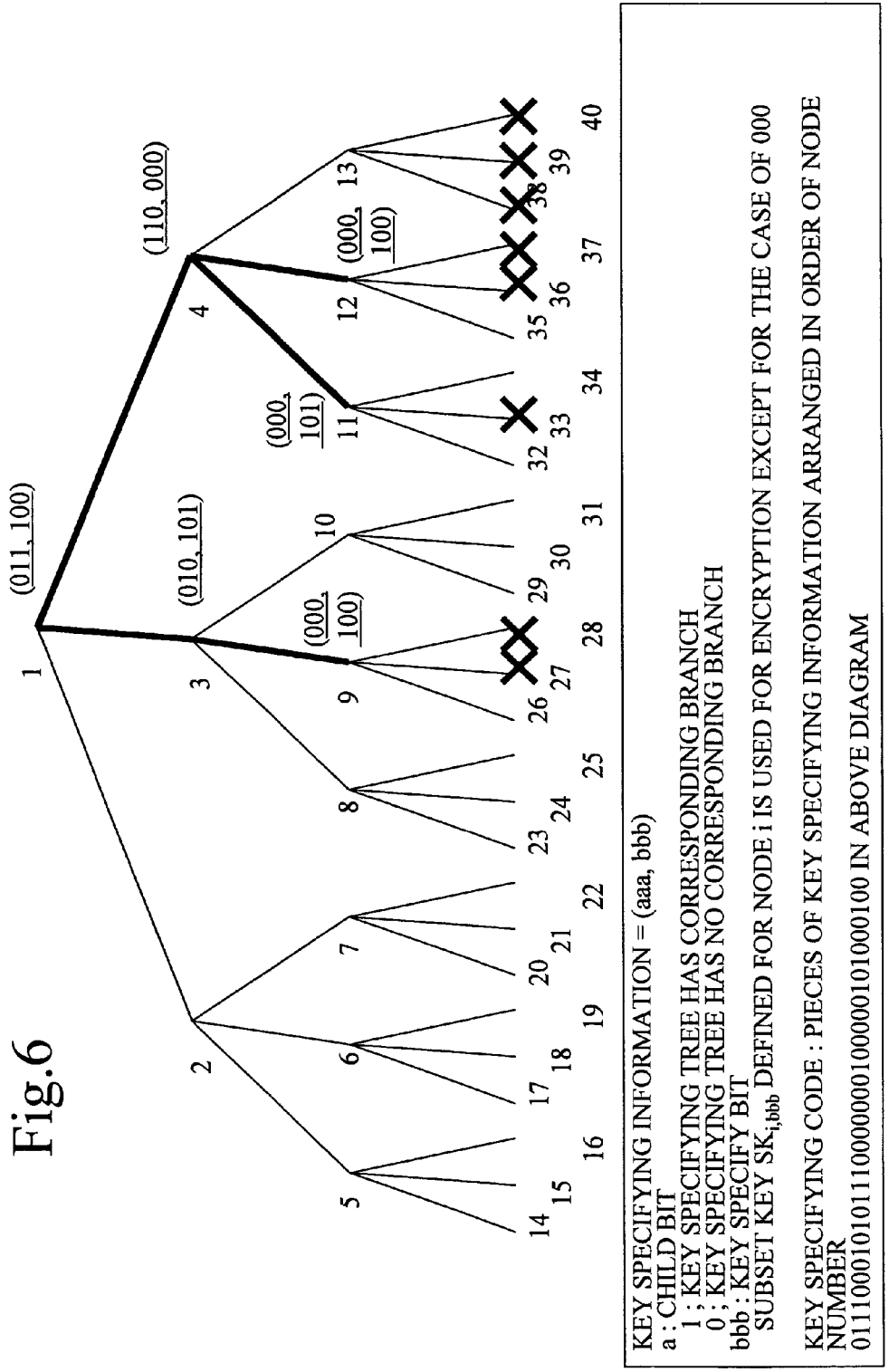
FIG. 6 is a view for illustrating a key specifying code in a three-way tree configuration.
Figure 7:
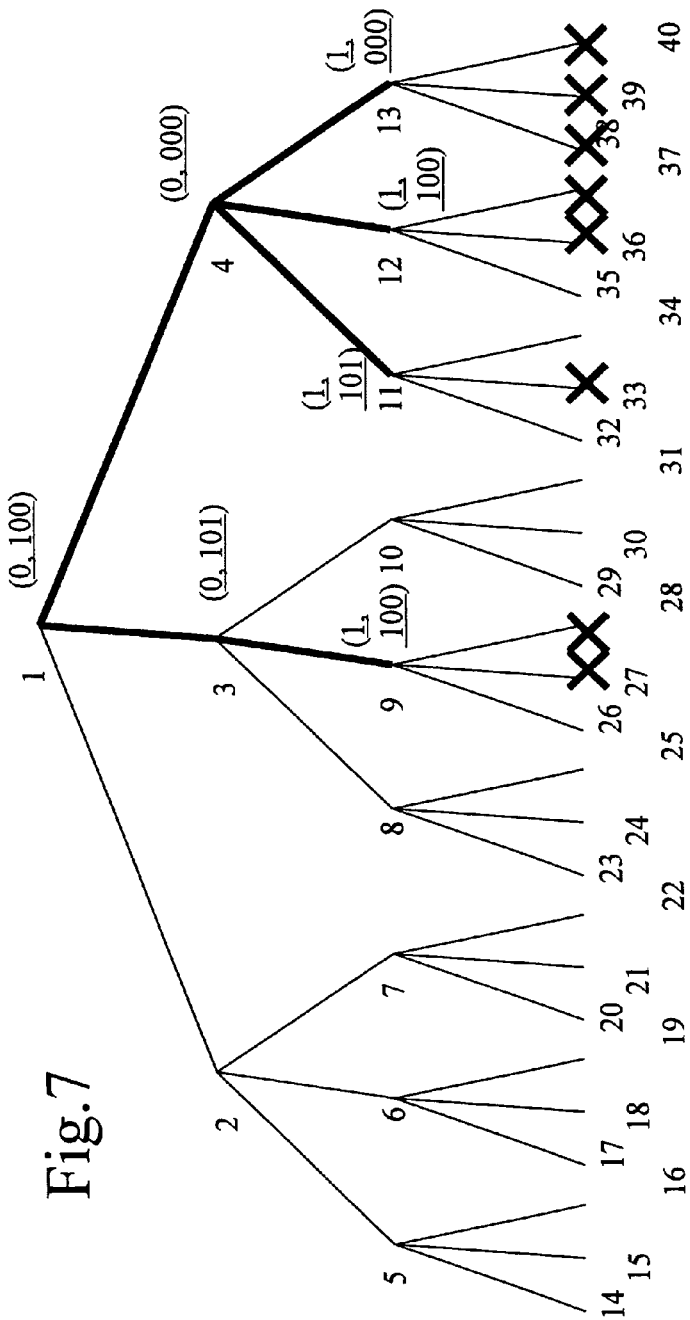
FIG. 7 is a view for illustrating a configuration for reducing the amount of information of a key specifying code by leaf bits.

In the configuration shown in FIG. 7, the following situation is supposed. Namely, in the state in which the information processing apparatus $u_{27}$, $u_{28}$, $u_{33}$, $u_{36}$, $u_{37}$, $u_{38}$, $U_{39}$ and $u_{40}$ (expressed by x mark in FIG. 7) have been revoked among the information processing apparatus $u_{14}$-$u_{40}$, any one of the information processing apparatus $u_{23}$, $u_{24}$, $u_{25}$, $u_{29}$, $u_{30}$ and $u_{31}$, which are not revoked at that time, may be reverse-engineered by an attacker, and the subset key owned by the information processing apparatus would be exposed. Then, the attacker could copy the subset key commonly stored in the information processing apparatus $u_{23}$, $u_{24}$, $u_{25}$, $u_{29}$, $u_{30}$ and $u_{31}$, namely the subset key $SK_{3,\,101}$ corresponding to the subset $S_{3,\,101}$, defined at the node 3, to many apparatus, and may produce many unauthorized apparatus.

In such a case, even if a system administrator obtains an unauthorized apparatus to elucidate that the subset key used in an unauthorized way is the subset key $SK_{3,\,101}$, the subset key $SK_{3,\,101}$ is one commonly stored in all of the information processing apparatus $u_{23}$, $u_{24}$, $u_{25}$, $u_{29}$, $u_{30}$ and $u_{31}$, and cannot consequently specify which one was used in an unauthorized way among the information processing apparatus $u_{23}$, $u_{24}$, $u_{25}$, $u_{29}$, $u_{30}$ and $u_{31}$.

As a result, it is impossible to revoke (exclude) one of the information processing apparatus $u_{23}$, $u_{24}$, $u_{25}$, $u_{29}$, $u_{30}$ and $u_{31}$ selectively. If the provision of the cryptograms using the subset key $SK_{3,\,101}$ is stopped, all of the information processing apparatus $u_{23}$, $u_{24}$, $u_{25}$, $u_{29}$, $u_{30}$ and $u_{31}$ are collectively revoked (excluded), and a problem such that the authorized apparatus are also excluded.

Figure 8:
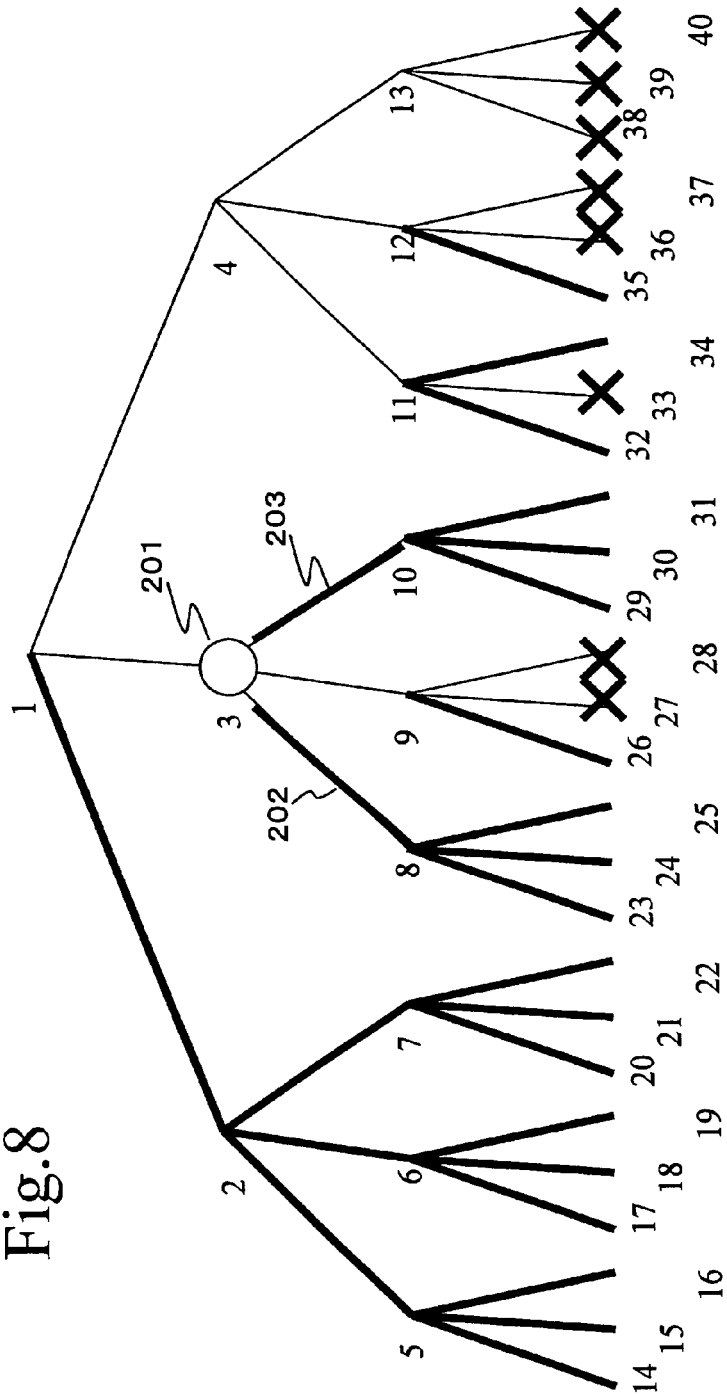
FIG. 8 is a view for illustrating a dividing configuration of a subset.

In such a case, the application of the subset key $SK_{3,\,101}$ corresponding to the subset $S_{3,\,101}$ defined at a node 3 (201) in a partial tree shown in FIG. 8 should be stopped, and the subset key $SK_{3,\,100}$ corresponding to a subset $S_{3,\,100}$ and the subset key $SK_{3,\,001}$ corresponding to a subset $S_{3,\,001}$, both of the subsets $S_{3,\,100}$ and $S_{3,\,001}$ defined at the node 3 (201) should be used. As a result, the above-mentioned unauthorized apparatus storing only the subset key $SK_{3,\,101}$ cannot decode any cryptograms, and the content utilization by an unauthorized apparatus can be prohibited.

Figure 9:
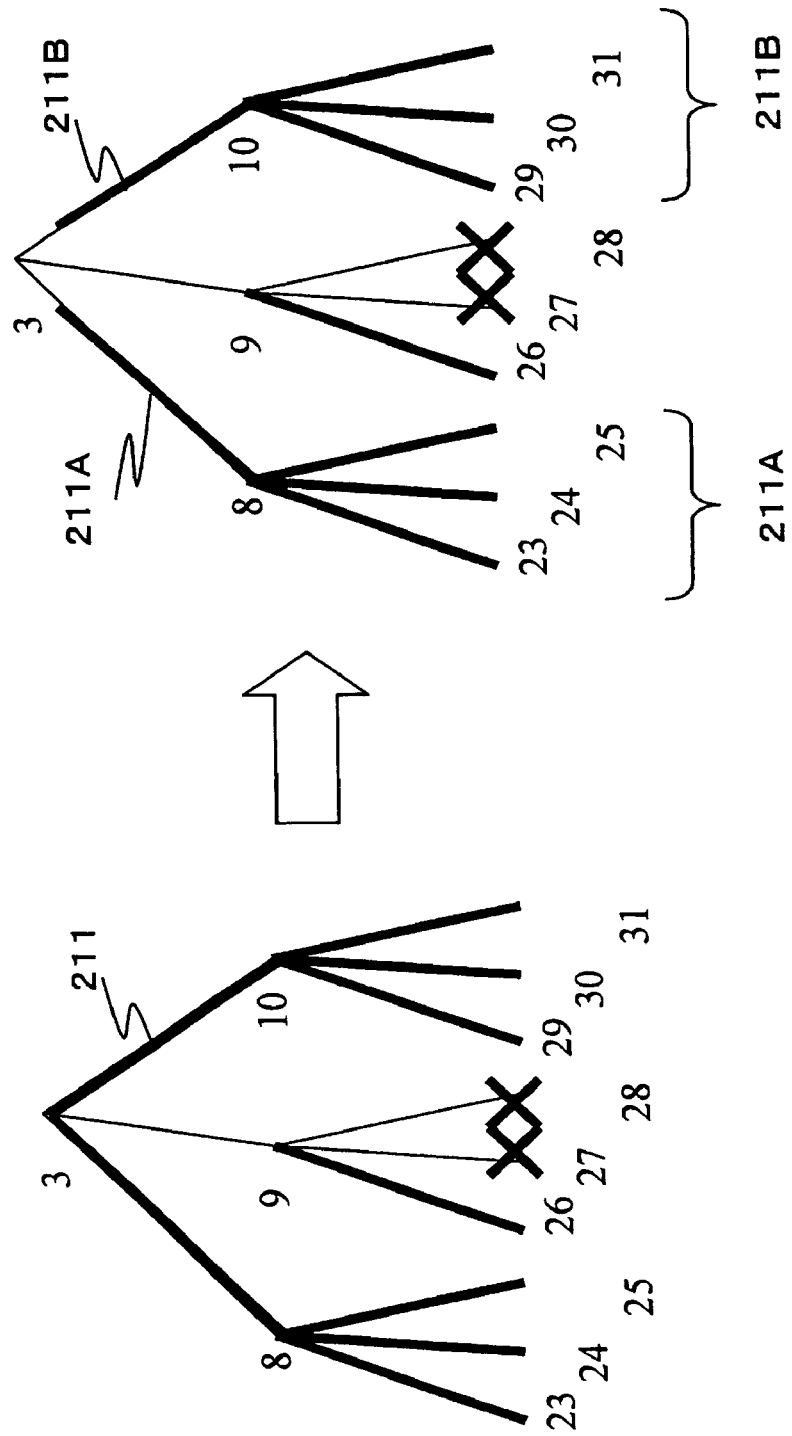
FIG. 9 is a view for illustrating a dividing configuration of a subset.

Namely, as shown in FIG. 9, a partial tree is re-set and divided as a plurality of partial trees. A partial tree 211 shown in FIG. 9(1) is a partial tree defined by the subset $S_{3,\,101}$. In case of a cryptogram applying the corresponding subset key $SK_{3,\,101}$, i.e. in the case where $E(SK_{3,\,101}, Kc)$ is set, the cryptogram applying the subset key $SK_{3,\,101}$ commonly owned by all of the information processing apparatus $u_{23}$, $u_{24}$, $u_{25}$, $u_{29}$, $u_{30}$ and $u_{31}$ belonging to the subset $S_{3,\,101}$ is a commonly decodable cryptogram.

The partial tree is divided into partial trees 211A and 211B shown in FIG. 9(2). The partial tree 211A is a partial tree defined by the subset $S_{3,\,100}$, and the partial tree 211B is a partial tree defined by the subset $S_{3,\,001}$. Each of the partial trees 211A and 211B constitutes a cryptogram applying the corresponding subset keys $SK_{3,\,100}$ and $SK_{3,\,001}$, respectively. Namely, $E(SK_{3,\,100}, Kc)$ and $E(SK_{3,\,001}, Kc)$ are set. The information processing apparatus $u_{23}$, $u_{24}$ and $u_{25}$ belonging to the subset $S_{3,\,100}$ needs to select and decode the cryptogram $E(SK_{3,\,100}, Kc)$, and to obtain a content key. The information processing apparatus $u_{29}$, $u_{30}$ and $u_{3}$, belonging to the subset $S_{3,\,001}$ needs to select and decode the cryptogram $E(SK_{3,\,001}, Kc)$, and to obtain a content key.

As described above, a cryptogram block to be provided to the information processing apparatus is changed from the following (1) to (2).

(1) cryptogram block=$E(SK_{1,\,100}, Kc)$, $E(SK_{3,\,101} Kc)$, $E(SK_{9,\,100}, Kc)$, $E(SK_{11,\,101}, Kc)$, $E(SK_{12,\,100}, Kc)$ (2) cryptogram block=$E(SK_{1,\,100}, Kc)$, $E(SK_{3,\,100}, Kc)$, $E(SK_{3,\,001}, Kc)$, $E(SK_{9,\,100}, Kc)$, $E(SK_{11,\,101}, Kc)$, $E(SK_{12,\,100}, Kc)$ By such processing, an unauthorized apparatus storing only the subset key $SK_{3,\,10}$, cannot decode any cryptograms, and consequently the unauthorized utilization of contents by the unauthorized apparatus storing only the subset key $SK_{3,\,101}$ can be prohibited.

An attacker could produce an unauthorized apparatus storing the subset key $SK_{3,\,100}$ corresponding to the subset $S_{3,\,100}$ obtained from any one of the information processing apparatus $u_{23}$, $u_{24}$, $u_{25}$, $u_{29}$, $u_{30}$ and $u_{31}$, and the subset key $SK_{3,\,001}$ corresponding to the subset $S_{3,\,001}$. But, by obtaining and parsing the unauthorized apparatus, the newly applied subset keys can be known. By repeating the processing, finally an attacked information processing apparatus that becomes a target of the unauthorized key information obtaining processing can be specified.

If the single information processing apparatus is specified in such a way, the revoke processing targeting only the specified information processing apparatus can be performed. It is possible to exclude unauthorized acquisitions of distribution information (such as the content key Kc) by all of the unauthorized apparatus, namely the unauthorized apparatus having the copy information of the key information stored in the revoked information processing apparatus, only by revoking an information processing apparatus without influencing the other information processing apparatus, the key information of which does not leak out.

In case of performing such specifying processing of an information processing apparatus, for example, if the subset $S_{3, 101}$ corresponding to a plurality of branches 202 and 203 is selected to the node 3 (201) shown in FIG. 8, it is necessary to enable selective execution of the production of a cryptogram as follows. Namely, (a) a cryptogram is produced by using a subset key corresponding to the whole of a permissible subset (a subset corresponding to a plurality of branches), namely $E(SK_{3, 101}, Kc)$, or (b) a plurality of cryptograms is produced by using a plurality of subset keys corresponding to a plurality of subsets produced by dividing a permissible subset (a subset corresponding to a plurality of branches), namely $E(SK_{3, 100}, Kc)$ and $E(SK_{3, 001}, Kc)$.

Moreover, in case of the performance of the above-mentioned processing, it is difficult to judge which mode of the (a) and the (b) an included cryptogram has by means of the conventional key specifying code, namely the configuration including a one-bit leaf bit and three-bit key specifying bits, which has been described in the Background section.

In the following, as a configuration of the present embodiment, an embodiment having the following configuration is described. Namely, the configuration includes an information bit (partition bit) added to a key specifying code. The information bit is for identifying which of the following information (a) and (b) a cryptogram has if a subset corresponding to a plurality of branches is selected to a specific node. Namely, (a) a cryptogram using a subset key corresponding to the whole permissible subset (a subset corresponding to a plurality of branches) is included, and (b) a plurality of cryptograms using a plurality of subset keys corresponding to a plurality of subsets produced by the division of a permissible subset (a subset corresponding to a plurality of branches).

Figure 10:
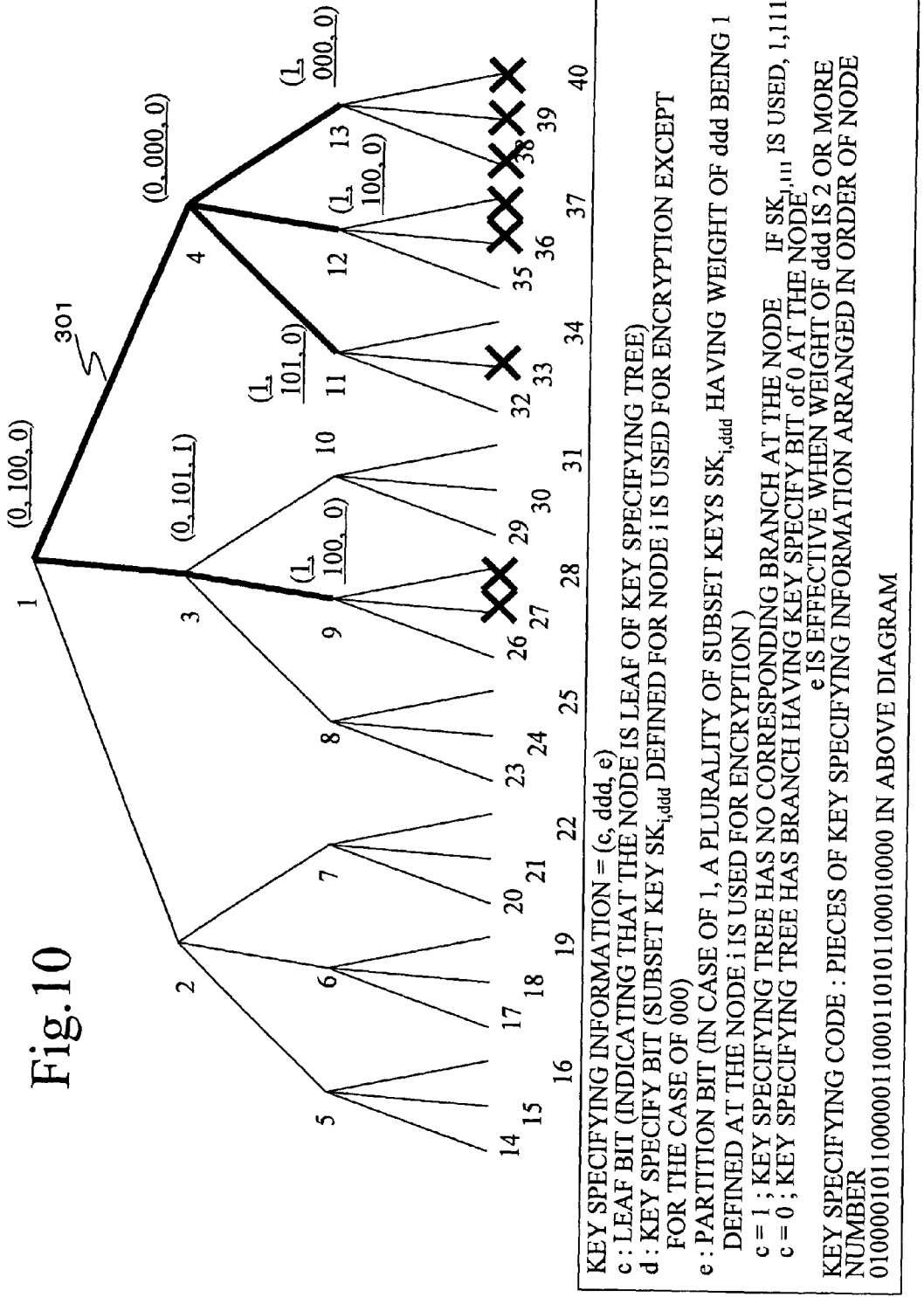
FIG. 10 is a view showing key specifying tree for illustrating the details of an example of the configuration and the processing of a key specifying code according to Embodiment 1.

FIG. 10 and successive drawings are referred to while the details of the examples of the configuration and the processing of a key specifying code according to the present embodiment are described.

FIG. 10 shows a key specifying tree 301, shown by wide lines, in a state of information processing apparatus $u_{27}$, $u_{28}$, $u_{33}$, $u_{36}$, $u_{37}$, $u_{38}$, $u_{39}$ and $u_{40}$ (indicated by x mark in FIG. 10) revoked among the information processing apparatus $u_{14}$-$u_{40}$.

As shown in FIG. 10, key specifying information is set to each node (1, 3, 4, 9, 11, 12 and 13) constituting the key specifying tree 301. The key specifying information is set as a piece of five-bit key specifying information including a bit configuration of (c, ddd, e) including a leaf bit c (one bit), key specifying bits d (three bits) and a partition bit e (one bit).

Incidentally, if the leaf bit c is "1", the leaf bit c indicates that the node is a leaf of a key specifying tree. If the leaf bit c is "0", the leaf bit c indicates that the node is one other than any leaves.

The key specifying bit, three bits ddd, indicates which subset key corresponding to a subset defined for a node is used for creating a cryptogram in the above-mentioned cryptogram block. Namely, if the key specifying bit information of a certain node k is "100", a cryptogram to which a subset key $SK_{k, 100}$ is applied is included. If the key specifying bit information of the node k is "110", a cryptogram to which a subset key $SK_{k, 110}$ is applied is included. Provided that the this situation applies in case of the partition bit e being 0. If the partition bit e is 1, two divided cryptograms of a cryptogram to which the subset key $SK_{k, 100}$ is applied and a cryptogram to which the subset key $SK_{k, 010}$ is applied are included. If the key specifying bit information of the node k is "000", the key specifying bit information indicate that no subset keys corresponding to the subsets defined for the node are used.

If the partition bit e is 0, the leaf bit c and the key specifying bit, three bits ddd, are similar to the conventional rules. If the partition bit e is set to be 1, the meaning of the leaf bit c does not change, but there is a case where the meaning of the key specifying bit, three bits ddd, changes.

The partition bit e is effective only if the weight of the key specifying bits ddd is two or more, that is to say only if the number of bits being 1 among the bits (ddd) two or more. The weight of the key specifying bit ddd indicates the number of 1's in the three bits of the bits ddd. The partition bit e is effective only if the weight of the key specifying bits ddd is two or more. To put it concretely, the partition bit e is effective only if the key specifying bits ddd=(011), (101), (110) and (111).

If the key specifying bits ddd takes the other values, the partition bit e may be 0 or 1. For simplification, the default is set to be 0. Namely, if the partition bit e is 0, the key specifying code is interpreted to be one including only a leaf bit and key specifying bit information similar to the conventional technique having no partition bits.

If the partition bit e is 1, the key specifying code indicates that there is cryptograms to which a plurality of subset keys corresponding to the subsets defined for the node k is individually applied.

The subsets defined for the node k are six subsets of $S_{k, 100}$, $S_{k, 010}$, $S_{k, 001}$, $S_{k, 110}$, $S_{k, 101}$, and $S_{k, 001}$. Provided that a subset $S_{1, 111}$ is included only to the root (node 1) The subset keys to the plurality of subsets are $SK_{k, 100}$, $SK_{k, 101}$, $SK_{k, 001}$, $SK_{k, 110}$, $SK_{k, 101}$, and $SK_{k, 001}$, and only the root (node 1) includes a subset key $SK_{1, 111}$.

For example, at the node k, if the key specifying bits ddd=(110), and if the partition bit e=1, the key specifying code indicates that two cryptograms using the subset keys $SK_{k, 100}$ and $SK_{k, 010}$ exist. If the partition bit e=0, the key specifying code indicates the existence of a cryptogram using the subset key $SK_{k, 110}$.

Moreover, at the node k, if the key specifying bits ddd=(111), and if the partition bit e=1, the key specifying code indicates the existence of three cryptograms using the subset keys $SK_{k, 100}$, $SK_{k, 101}$ and $SK_{k, 001}$. If the partition bit e=0, the key specifying code indicates the existence of a cryptogram using the subset key $SK_{1, 111}$.

If there are no receivers to be revoked and the subset key $SK_{1, 111}$ is used, the key specifying information of the root may be (c, ddd, e)=(1, 111, 0) by setting the partition bit e=0. The key specifying information is similar to the conventional key specifying information including the leaf bit c: 1 bit, and the key specifying bit d: 3 bits.

On the other hand, in case of using the three subset keys $SK_{k, 100}$, $SK_{k, 010}$ and $SK_{k, 001}$ individually without using the subset key $SK_{1, 111}$, the key specifying information at the root may be set to have the partition bit e=1 to be (c, ddd, e)=(1, 111, 1).

FIG. 10 shows an example in which the key specifying tree 301, shown by wide lines, in a state of information processing apparatus $u_{27}$, $u_{28}$, $u_{33}$, $u_{36}$, $u_{37}$, $u_{38}$, $u_{39}$ and $u_{40}$ (indicated by the x mark in FIG. 10) revoked among the information processing apparatus $u_{14}$-$u_{40}$. It is supposed that the information processing apparatus $u_{27}$, $u_{28}$, $u_{33}$, $U_{36}$, $u_{37}$, $u_{38}$, $u_{39}$ and $u_{40}$ (indicated by the x mark in FIG. 10) are revoked among the information processing apparatus $u_{14}$-$u_{40}$, and that information (for example, the content key Kc) is transmitted to the other information processing apparatus.

In this case, the key specifying tree is set to have the nodes (1, 3, 4, 9, 11, 12 and 13) as configuration nodes and the nodes (9, 11, 12 and 13) as leaf nodes. The leaf bit=c, the key specifying bit=ddd and the partition bit e are, as shown in the drawing, set to the key specifying tree configuring nodes having the above-mentioned configuration as follows.

node 1: (0, 100, 0)
node 3: (0, 101, 1)
node 4: (0,000, 0)
node 9: (1, 100, 0)
node 11: (1, 101, 0)
node 12: (1, 100, 0)
node 13: (1, 000, 0)

As a result, the key specifying code becomes a value including the values of each bit mentioned above in order, i.e. "01000010110000011000110101100010000".

In the setting mentioned above, the key specifying information at the node 3 is (c, ddd, e)=(0, 101, 1), and the partition bit e=1. Because the key specifying bit is ddd=(101), the key specifying information indicates the existence of two cryptogram of the subset keys $SK_{3,\,100}$ and $SK_{3,\,001}$ in the cryptogram block to be set correspondingly to the above-mentioned key specifying code. Namely, the key specifying information indicates that the cryptogram blocks are configured to be . . . $E(SK_{3,\,100}, Kc), E(SK_{3,\,001}, Kc) \ldots$.

If the key specifying information at the node 3 is (c, ddd, e)=(0, 101, 0), and the partition bit e=0, the key specifying information indicates the existence of a cryptogram using only the subset key $SK_{3,\,101}$. Namely, the key specifying information indicates that the cryptogram block is configured to be . . . $E(SK_{3,\,101}, Kc) \ldots$.

A correspondence table showing correspondences between values which a combination (ddd, e) of a key specifying bit (ddd) and a partition bit (e) can take, and cryptograms included in a cryptogram block at that time at an arbitrary node i is shown in FIG. 11.

Each information processing apparatus can judge the order of lining up of cryptograms in a cryptogram block from a key specifying code by using the correspondence table to know the cryptogram in the lining order of them that the information processing apparatus should decode. Incidentally, the order of the lining of the cryptograms in the cryptogram block is ruled as follows. First, a cryptogram having a smaller node number to which a subset is defined correspondingly to the subset key used for the encryption has the highest priority (that is to say, a cryptogram using a subset key $SK_{2,\,xxx}$ is always placed at a prior position to a cryptogram using a subset key $SK_{3,\,yyy}$ between them). Between the cryptograms having the same node number, the cryptograms are lined in descending order if the zzz of a subject key $SK_{k,\,zzz}$ is considered to be a number expressed by a binary number (that is to say, a cryptogram using a subset key $SK_{k,\,101}$ is always put at a prior position to a cryptogram using a subject key $SK_{k,\,010}$ between them). When the order of the lining of the cryptograms complies with the rule, the order of the cryptograms is uniquely determined, and an information processing apparatus accepting the cryptograms and the key specifying code can know which cryptogram the apparatus should decode.

Each information processing apparatus accepting a cryptogram block and a key specifying code stores the correspondence table shown in FIG. 11 in its storage unit, or stores a program for executing a parse algorithm of a key specifying code corresponding to the correspondence table in the storage unit. Then, the information processing apparatus refers to a correspondence table, or complies with the program for executing the parse algorithm of the key specifying code, to judge the lineup order of the cryptograms in a cryptogram block. Thereby, the information processing apparatus judges which cryptogram in the line the apparatus should decode.

Incidentally, a configuration for providing the correspondence table or the program for executing the parse algorithm of the key specifying code to each information processing apparatus at the time of providing the cryptogram block and the key specifying code to each information processing apparatus may be adopted.

As described above, in the present embodiment, a key specifying code includes key specifying information to each configuration node of a key specifying tree having a selected information processing apparatus as a leaf. The key specifying information is set as a code including a partition bit as subset division identifying information indicating whether or not a cryptogram block includes a cryptogram to which subset keys corresponding to divided subsets produced by diving a dividable subset defined as a set of a specific leaf at a configuration node of a key specifying tree into a plurality of subsets.

An information processing apparatus as a user device accepting a cryptogram block and a key specifying code executes the parsing of the key specifying code, and judges the inclusion in the cryptogram block of a cryptogram to which subset keys corresponding to divided subsets produced by dividing a dividable subset defined as a set of specific leaves at a configuration node of a key specifying tree into a plurality of subsets. Then, the information processing apparatus selects a decodable cryptogram by applying the subset key stored in the apparatus itself from the cryptogram block on the basis of the judgment.

Figure 12:
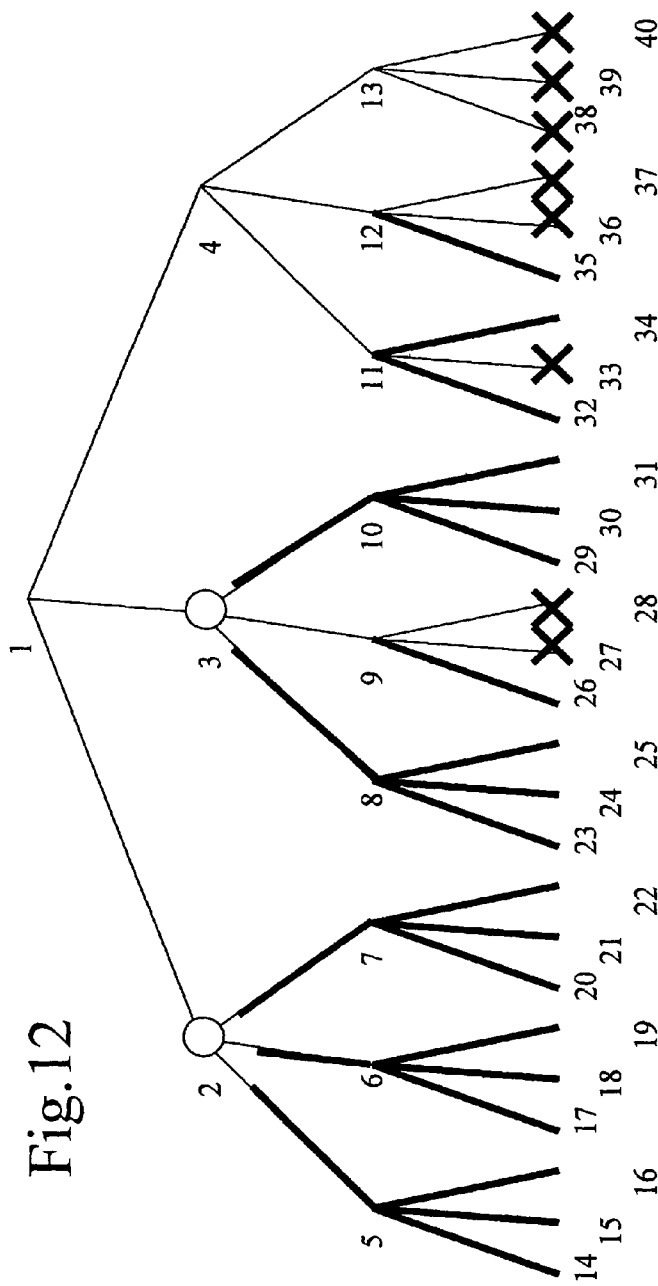
FIG. 12 is a view showing a configuration of partial trees produced by further dividing a subset key $SK_{1,\,100}$ into three subset keys $SK_{2,\,100}$, $SK_{2,\,010}$ and $SK_{2,\,001}$ in addition not the example shown in FIG. 8.

FIG. 12 shows the configuration of partial trees including three subset keys $SK_{2,\,100}$, $SK_{2,\,010}$ and $SK_{2,\,001}$ produced by dividing the subset key $SK_{1,\,100}$ in addition to the example shown in FIG. 8.

As described above, a node k other than the root node (node No. 1) does not include the subset $S_{k,\,111}$. Namely, the reason is that a subset specifying all child nodes of a certain node can be specified by an upper rank node of the node. Consequently, the subset specifying the information processing apparatus $u_{14}$-$u_{22}$ shown in FIG. 12 is not the subset $S_{2,\,111}$, the information processing apparatus $u_{14}$-$u_{22}$ are specify by the subset $S_{1,\,100}$.

In this case, the cryptogram indicated by the subset key $SK_{1,\,100}$ corresponding to the subset $S_{1,\,100}$ is $E(SK_{1,\,100}, Kc)$. The cryptogram $E(SK_{1,\,100}, Kc)$ is divided into three subsets of the subset $S_{2,\,100}$ including the information processing apparatus $\{u_{14}, u_{15}, u_{16}\}$, a subset $S_{2,\,010}$ including the information processing apparatus $\{u_{17}, u_{18}, u_{19}\}$, and a subset $S_{2,\,001}$ including the information processing apparatus $\{u_{20}, u_{21}, u_{22}\}$. Then, if the cryptograms obtainable at each subset are set, the subset key $SK_{1,\,100}$ is divided into the three subset keys $SK_{2,\,100}, SK_{2,\,010}$ and $SK_{2,\,001}$, and three cryptograms $E(SK_{2,\,100}, KC), E(SK_{2,\,010}, KC)$ and $E(SK_{2,\,001}, KC)$ are set.

This is the processing for dividing a partial tree to re-set the divided partial tree as a plurality of partial trees as shown in FIG. 13. A partial tree 311 shown in FIG. 13(1) is a partial tree defined by the subset $S_{1,\,100}$. If the partial tree is a cryptogram to which the corresponding subset key $SK_{1,\,100}$ is applied, that is to say, in the case where the cryptogram $E(SK_{1,\,100}\ Kc)$ is set, the cryptogram becomes one commonly decodable by applying the subset key $SK_{1,\,100}$, which is commonly owned by all of the information processing apparatus $u_{14}$-$u_{22}$ belonging to the subset $S_{1,\,100}$.

The partial tree is divided into partial trees 311A, 311B and 311C shown in FIG. 13(2). The partial tree 311A is a partial tree defined by the subset $S_{2,\,100}$; the partial tree 311B is a partial tree defined by the subset $S_{2,\,010}$; the partial tree 311C is a partial tree defined by the subset $S_{2,\,001}$.

The partial trees 311A-311C configure cryptograms to which corresponding subset keys $SK_{2,100}$, $S_{2,010}$ and $SK_{2,001}$ are applied, respectively. Namely, three cryptograms $E(SK_{2,100}, KC)$, $E(SK_{2,010}, KC)$ and $E(SK_{2,001}, KC)$ are set.

The information processing apparatus $u_{14}$, $u_{15}$ and $u_{16}$ belonging to the subset $S_{2,100}$ needs to select and to decode the cryptogram $E(SK_{2,100}, Kc)$ to obtain a content key. The information processing apparatus $u_{17}$, $u_{18}$ and $u_{19}$ belonging to the subset $S_{2,010}$ needs to select and to decode the cryptogram $E(SK_{2,010}, Kc)$ to obtain a content key. The information processing apparatus $u_{20}$, $u_{21}$ and $u_{22}$ belonging to the subset $S_{2,001}$ needs to select and to decode the cryptogram $E(SK_{2,001}, Kc)$ to obtain a content key.

The key specifying information (c, ddd, e) at each node of the key specifying tree set as described above is shown in FIG. 14.

Figure 14:
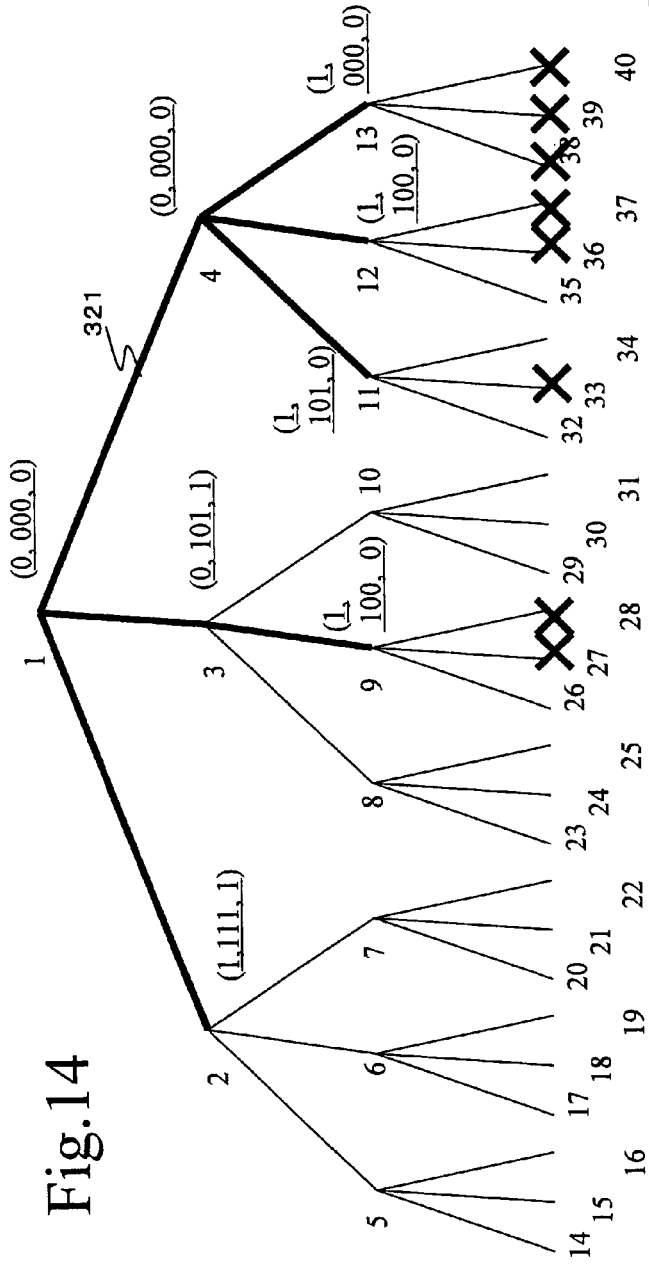
FIG. 14 is a view showing key specifying information (c, ddd, e) at each node of the key specifying tree in Embodiment 1.

FIG. 14 is a view showing a key specifying tree 321 with wide lines in the state of the information processing apparatus $u_{27}$, $u_{28}$, $u_{33}$, $u_{36}$, $u_{37}$, $u_{38}$, $u_{39}$ and $u_{40}$ (expressed by the mark x in FIG. 14) revoked among the information processing apparatus $u_{14}$-$u_{40}$. It is supposed that the information processing apparatus $u_{27}$, $u_{28}$, $u_{33}$, $U_{36}$, $u_{37}$, $u_{38}$, $u_{39}$ and $u_{40}$ (expressed by the mark x in FIG. 14) are revoked among the information processing apparatus $u_{14}$-$u_{40}$, and that information (for example, a content key Kc) is transmitted to the other information processing apparatus.

In this case, the key specifying tree is set to have nodes (1, 2, 3, 4, 9, 11, 12 and 13) as configuration nodes and nodes (2, 9, 11, 12 and 13) as leaf nodes. Leaf bits c, key specifying bits ddd and partition bits e are set to the key specifying tree configuring nodes having the configuration mentioned above as follows, for example:

node 1: (0,000, 0);
node 2: (1, 111, 1);
node 3: (0, 101, 1);
node 4: (0,000, 0);
node 9: (1, 100, 0);
node 11: (1, 101, 0);
node 12: (1, 100, 0);
node 13: (1, 000, 0).

As a result, the key specifying code in this case is a value formed by lining up the value of each of the above-mentioned bit: "00000111110101100000110001101011000010000".

In the above-mentioned setting, the key specifying information at the node 2 is (c, ddd, e)=(1, 111, 1), and the partition bit e=1. Because the key specifying bits ddd=(111), the key specifying bits ddd indicates that three cryptograms using the subset keys $SK_{2,100}$, $SK_{2,010}$ and $SK_{2,001}$, respectively, exist in the cryptogram block set correspondingly to the above-mentioned key specifying code. Namely, the key specifying bits ddd indicates that the cryptogram block is configured to be $E(SK_{2,100}, Kc)$, $E(SK_{2,010}, Kc)$, $E(SK_{3,001}, Kc)$ . . . .

As described above, the present embodiment is configured such that a set definable by a subset is divided into a plurality of divided subsets to be set at an arbitrary node, and that cryptograms to which subset keys corresponding to respective divided subsets are applied can be generated to be transmitted to information processing apparatus, and further that a key specifying code setting key specifying information setting a partition bit is generated to be provided.

Consequently, an information processing apparatus accepting the cryptograms and the key specifying code can select a cryptogram which is an decoding object of the apparatus on the basis of the key specifying code both of the case where the accepted cryptogram is one to which the divided subsets are set and the subset keys corresponding to the divided subset are applied, and of the case where no divided subsets are used.

Embodiment 2

In the above-mentioned embodiment, for example, the examples in which the subset key $SK_{3,101}$ is divided into the subset keys $SK_{3,100}$ and $SK_{3,001}$, and in which the subset key $SK_{1,100}$ is divided into the subset keys $SK_{2,100}$, $SK_{2,010}$, $SK_{2,001}$, have been described. Namely, if a certain subset key is divided, the subset key has been always divided by only one method such that the weight (the number of bits being 1) of a yyy portion if the subset key is expressed as $SK_{x,yyy}$ may be 1.

Figure 15:
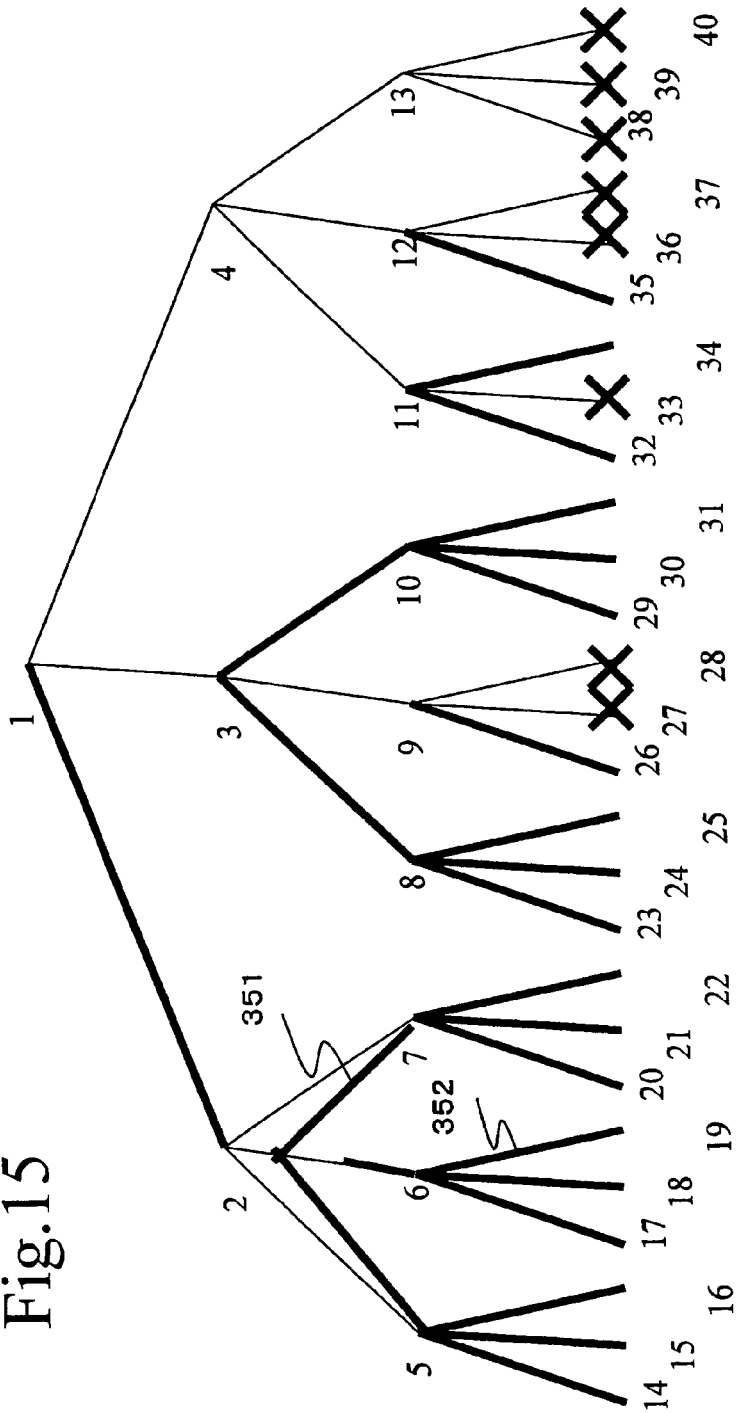
FIG. 15 is a view for illustrating a division mode in the case where the number of way trees is three or more.

However, if the number of sub trees is three or more, various modes of division modes can be adopted. For example, as shown in FIG. 15, there is a case where the subset $S_{1,100}$ set correspondingly to the node 1 are divided into two subsets $S_{2,101}$ and $S_{2,010}$ set correspondingly to the node 2, and where cryptograms to which the correspondent subset keys $SK_{2,101}$ and $SK_{2,010}$ of the two subsets $S_{2,101}$ and $S_{2,010}$ are applied is wanted to be transmitted.

If the weight of the key specifying bits ddd of the key specifying information set at each node is two bits (the number of 1 is two), only one dividing method exists. If the weight is three bits (in case of ddd=111), four dividing methods exist. Namely, the four dividing methods are:

(1) (100), (010), (001);
(2) (100), (011);
(3) (010), (101);
(4) (001), (110).

If there are such many kinds of division modes, the information for the judgment of by which mode the division is executed among these division modes is needed. The information is called as a partition specifying bit.

Two bits (ff) are newly added as the partition specifying bits as the configuration bits of the key specifying information of a key specifying tree. In case of the three-way tree configuration, the four division modes exist at the maximum. The two bits (ff) are newly added as the configuration bits of the key specifying information consequently.

FIG. 16 shows patterns of the key specifying bits ddd, the partition bits e and the partition specifying bits ff in the key specifying information set at a node i constituting the key specifying tree. The partition specifying bits ff are effective only if the key specifying bits ddd and the partition bit e are (ddd, e)=(111, 1). In the other cases, the partition specifying bits are set as ff=00, and the interpretation in accordance with the above-mentioned embodiment 1 is performed.

Only four entries show in FIG. 16 have the combination of the key specifying bits ddd and the partition bit e being (ddd, e)=(111, 1). In such cases, the interpretation of cryptograms is performed on the basis of the partition specifying bits ff.

(1) In case of (ddd, e, ff)=(111, 1, 00), the key specifying information indicates that three subset keys $SK_{i,100}$, $SK_{i,010}$ and $SK_{i,001}$ are applied to set three cryptograms $E(SK_{i,100}, Kc)$, $E(SK_{i,010}, Kc)$ and $E(SK_{i,001}, Kc)$ (2) In case of (ddd, e, ff)=(111, 1, 01), the key specifying information indicates that two subset keys $SK_{i,100}$ and $SK_{i,011}$ are applied to set two cryptograms $E(SK_{i,100}, Kc)$ and $E(SK_{i,011}, Kc)$.

(3) In case of (ddd, e, ff)=(111, 1, 10), the key specifying information indicates that two subset keys $SK_{i,101}$ and $SK_{i,010}$ are applied to set two cryptograms $E(SK_{i,101}, Kc)$ and $E(SK_{i,010}, Kc)$.

(4) In case of (ddd, e, ff)=(111, 1, 11), the key specifying information indicates that two subset keys $SK_{i,110}$ and $SK_{i,001}$ are applied to set two cryptograms $E(SK_{i,110}, Kc)$ and $E(SK_{i,001}, Kc)$.

Each information processing apparatus can judge the order of lining up of cryptograms in a cryptogram block from a key specifying code by using the correspondence table shown in FIG. 16 to know the cryptogram in the lining order of them that the information processing apparatus should decode.

Each information processing apparatus accepting a cryptogram block and a key specifying code stores the correspondence table shown in FIG. 16 in its storage unit, or stores a program for executing a parse algorithm of a key specifying code corresponding to the correspondence table in the storage unit. Then, the information processing apparatus refers to the correspondence table, or complies with the program for executing the parse algorithm of the key specifying code, to judge the lineup order of the cryptograms in a cryptogram block. Thereby, the information processing apparatus judges what number of the cryptograms in the lineup the apparatus should decode. Incidentally, a configuration for providing the correspondence table or the program for executing the parse algorithm of the key specifying code to each information processing apparatus at the time of providing the cryptogram block and the key specifying code to each information processing apparatus may be adopted.

The order of the lining of the cryptograms in the cryptogram block is ruled as follows. First, a cryptogram having a smaller node number to which a subset is defined correspondingly to the subset key used for the encryption has the highest priority (that is to say, a cryptogram using a subset key $SK_{2, xxx}$ is always placed at a prior position to a cryptogram using a subset key $SK_{3, yyy}$ between them). Between the cryptograms having the same node number, the cryptograms are lined in descending order if the zzz of a subject key $SK_{k, zzz}$ is considered to be a number expressed by a binary number (that is to say, a cryptogram using a subset key $SK_{k, 101}$ is always put at a prior position to a cryptogram using a subject key $SK_{k, 010}$ between them). If the order of the lining of the cryptograms complies with the rule, the order of the cryptograms is uniquely determined, and an information processing apparatus accepting the cryptograms and the key specifying code can know which cryptogram the apparatus should decode.

FIG. 17 shows an example of setting the key specifying information including the partition specifying bits ff to each configuration node of a key specifying tree. The key specifying information has seven-bit configuration of (c, ddd, e, ff), or the leaf bit c,
the key specifying bits ddd,
the partition bit e, and
the partition specifying bits ff.

FIG. 17 is a view showing a key specifying tree 401 shown by wide lines in the state of the information processing apparatus $u_{27}$, $u_{28}$, $u_{33}$, $u_{36}$, $u_{37}$, $u_{38}$, $u_{39}$ and $u_{40}$ (expressed by the mark x in FIG. 17) revoked among the information processing apparatus $u_{14}$-$u_{40}$. It is supposed that the information processing apparatus $u_{27}$, $u_{28}$, $u_{33}$, $U_{36}$, $u_{37}$, $u_{38}$, $u_{39}$ and $u_{40}$ (expressed by the mark x in FIG. 17) revoked among the information processing apparatus $u_{14}$-$u_{40}$, and that information (for example, the content key Kc) is transmitted to the other information processing apparatus.

In this case, the key specifying tree is set to have the nodes (1, 2, 3, 4, 9, 11, 12 and 13) as the configuration nodes and the nodes (2, 9, 11, 12 and 13) as the leaf nodes. The leaf bit=c, the key specifying bits=ddd, the partition bit e and the partition specifying bits ff are set to the key specifying tree configuring nodes having the above-mentioned configuration, for example, as follows.

node 1: (0, 100, 0, 00)
node 2: (1, 111, 1, 10)
node 3: (0, 101, 0, 00)
node 4: (0,000, 0, 00)
node 9: (1, 100, 0, 00)
node 11: (1, 101, 0, 00)
node 12: (1, 100, 0, 00)
node 13: (1, 000, 0, 00)

As a result, the key specifying code becomes a value including the values of each bit mentioned above in order, i.e.: "0000000111111001010000000000110000011010001100- 0001000000".

In the setting mentioned above, the key specifying information at the node 2 is (c, ddd, e, ff)=(1, 111, 1, 10), and the key specifying information and the partition bit (ddd, e)= (111, 1). Because the partition specifying bit (ff)=(10), the key specifying information indicates the existence of two cryptogram using the subset keys $SK_{2, 10}$, and $SK_{2, 010}$ in the cryptogram block to be set correspondingly to the above-mentioned key specifying code. Namely, the key specifying information indicates that the cryptogram blocks are configured to be . . . $E(SK_{2, 101}, Kc)$, $E(SK_{2, 010}, Kc)$ . . . .

If no receivers to be revoked and only one cryptogram enciphered by a subset key corresponding to the subset $S_{1, 111}$ having all of the receivers as its components is transmitted in the example of FIG. 17, the key specifying code may be configured by setting the key specifying information of the root as (c, ddd, e, ff)=(1, 111, 0, 00). The specifying information is interpreted similarly in the case of the information configuration only of the leaf bit c and the key specifying bits ddd.

As described above, according to the present embodiment, a set definable by a subset is divided into a plurality of divided subsets to be set at an arbitrary node, and cryptograms to which subset keys corresponding to respective divided subsets are applied can be generated to be transmitted to information processing apparatus. Furthermore, by setting the partition bet and by setting the partition specifying bets, the setting of the divided subset can be performed with various division mode being distinguished from each other, and the generation of the cryptograms, to which the subset keys corresponding to the divided subsets with the various division modes that is distinct-able from one another, can be generated.

An information processing apparatus accepting the cryptograms and the key specifying code can judge a division mode on the basis of the partition specifying bits if the accepted cryptograms set the divided subset and are ones to which the subset keys corresponding to the divided subsets are applied, and can select the cryptogram that is a target of decoding by the apparatus itself.

Embodiment 3

The patterns of the cryptograms included in a cryptogram block set correspondingly to the key specifying information (ddd, e, ff) described previously by referring to FIG. 16, namely the information including the five bits (ddd, e, ff) of the key specifying bits ddd, the partition bit e and the partition specifying bits ff, are totally 15 types including the "nonexistence of cryptograms".

In Embodiment 2, the 15-types of data are expressed by means of six bits of (ddd, e, ff). Because 15-types of data can be expressed by means of four bits, it is possible to decrease the number of bits necessary for the key specifying information by using four-bit values (gggg) or (hhhh), both obtained by encoding the six-bit values of (ddd, e, ff), as shown in FIG. 18.

The four-bit value (gggg) of FIG. 18 is configured such that the data entries from the top to the twelfth step in the table (1)-(12) are made to be (gggg)=(ddd, e), and that the entries at the last three steps (13)-(15) are made to be the combinations of (ddd, e) assigned by the residual bit configurations.

Consequently, it is easy to obtain the correspondence between encoded (gggg) and (ddd, e) before encoding.

FIG. 19 shows a configuration of a key specifying tree, key specifying information set to each node, and a key specifying code in the case where the key specifying information is made to be a five-bit configuration (c, gggg) of the leaf bit c and the encoded bits gggg using the four bits of the encoded bits (gggg) in place of (ddd, e, ff).

FIG. 19 is a view showing the key specifying tree 421 shown by wide lines in the state of the information processing apparatus $u_{27}$, $u_{28}$, $u_{33}$, $u_{36}$, $u_{37}$, $u_{38}$, $u_{39}$ and $u_{40}$ (expressed by the mark x in FIG. 19) revoked among the information processing apparatus $u_{14}$-$u_{40}$. It is supposed that the information processing apparatus $u_{27}$, $u_{28}$, $u_{33}$, $U_{36}$, $u_{37}$, $u_{38}$, $u_{39}$ and $u_{40}$ (expressed by the mark x in FIG. 19) are revoked among the information processing apparatus $u_{14}$-$u_{40}$, and that information (for example, the content key Kc) is transmitted to the other information processing apparatus.

In this case, the key specifying tree is set to have the nodes (1, 2, 3, 4, 9, 11, 12 and 13) as configuration nodes and the nodes (2, 9, 11, 12 and 13) as leaf nodes. The correspondence among the key specifying tree configuring node having the above-mentioned configuration, the sets of the leaf bit=c, the key specifying bits=ddd, the partition bit e and the partition specifying bits ff, and the five-bit sets (c, gggg) of the leaf bit=c and the encoded bits=gggg is shown in the following.

node 1: (0,000, 0, 00)→(0, 0000)
node 2: (1, 111, 1, 10)→(1, 0101)
node 3: (0, 101, 0, 00)→(0, 1010)
node 4: (0,000, 0, 00)→(0, 0000)
node 9: (1, 100, 0, 00)→(1, 1000)
node 11: (1, 101, 0, 00)→(1, 1010)
node 12: (1, 100, 0, 00)→(1, 1000)
node 13: (1, 000, 0, 00)→(1, 0000)

As a result, the key specifying code is a value lining the value of each bit mentioned above in order, i.e. "00000101010101000000110001101011000010000".

In the case where the seven-bit key specifying information of the set of the leaf bit=c, the key specifying bits=ddd, the partition bit e and the partition specifying bits ff is set to each node, the key specifying code has 8×7=56 bits if the configuration nodes of the key specifying tree are eight, as described above. However, in case of five-bit (c, gggg) of the leaf bit=c and the encoded bits=gggg, the key specifying code has 8×5=40 bits, and the amount of information is reduced to 5/7.

In the example of FIG. 19, if no receivers are revoked, and if only one cryptogram enciphered by means of the subset key corresponding to the subset $S_{1, 111}$ having all of the receivers as its components is transmitted, the key specifying information of the root may be set to be (c, gggg)=(1, 1110) to constitute the key specifying code. If the specific information is decoded to the seven-bit key specifying information of the leaf bit=c, the key specifying bits=ddd, the partition bit e and the partition specifying bits ff, the decoded key specifying information is (c, ddd, e, ff)=(1, 111, 0, 00), and the key specifying information is similarly interpreted to the case of the information configuration including only the leaf bit c and the key specifying bits ddd.

The four bits of the encoded bits (hhhh) shown in FIG. 18 are ones produced by the bit invert of the least significant bit of the (gggg) four bits having the weight of the upper three bits being 2 (i.e. 110, 101 or 011). A merit of the coding method is that it is easy to examine how many cryptograms there are to a node in a cryptogram block by examining the weight of the code hhhh.

Namely, as shown in FIG. 18(B), if the weight of the bits hhhh is 0, there are no cryptograms. If the weight is 1 or 3, there is only one cryptogram. If the weight is 2, there are two cryptograms. If the weight is 4, there are three cryptograms. A certain receiver is not required to know the details of the lineup of the cryptograms produced by the subset keys of the nodes other than the node to which the subsets corresponding to the subset keys used for the cryptogram which the receiver should decode. It is enough for the receiver to know how many cryptograms exist at each node and what number the cryptogram which the receiver should decode exists in the whole lineup for obtaining the cryptogram which the receiver should decode. Consequently, it reduces the load of the processing of the receiver to be able to know the number of the cryptograms included in a cryptogram block by examining the weight of the encoded bits (hhhh).

Figure 20:
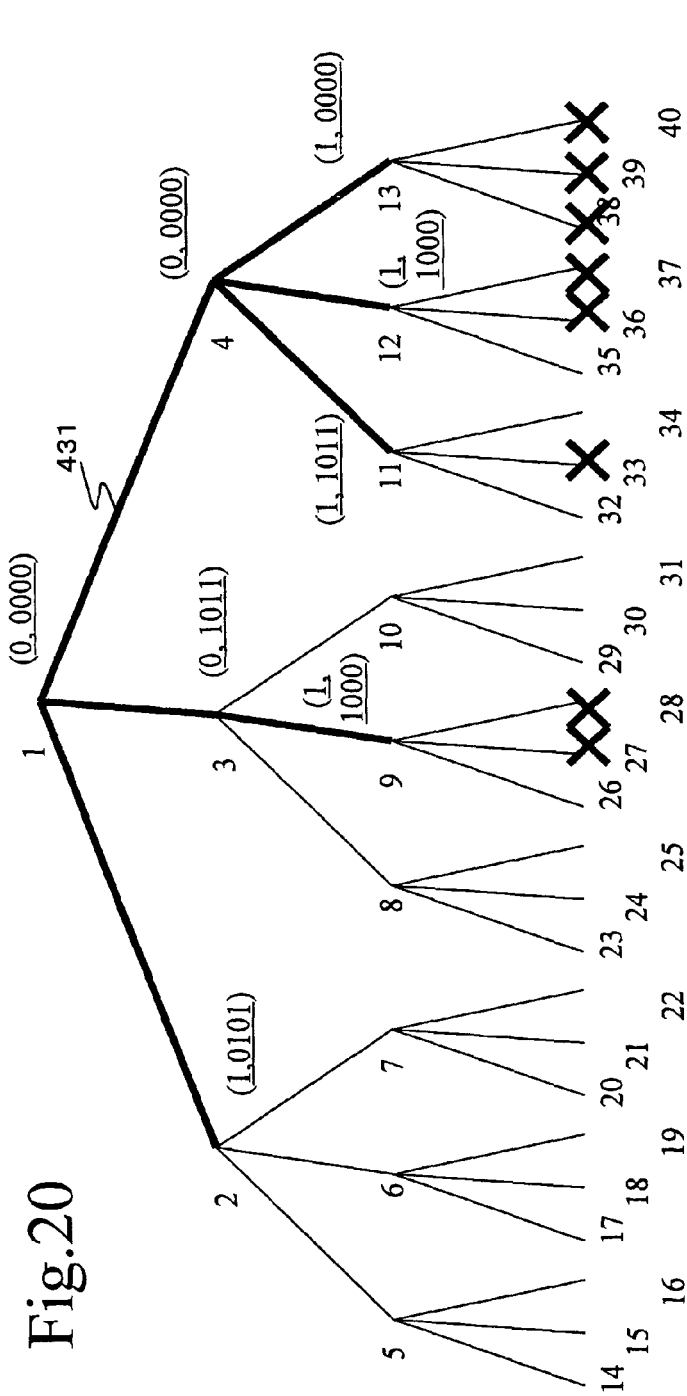
FIG. 20 is a view showing the configurations of key specifying information set at each node of a key specifying tree in case of adopting a five-bit configuration of (c, hhhh), and a key specifying code at that time.

FIG. 20 shows a configuration of a key specifying tree, key specifying information set to each node, and a key specifying code in the case where the key specifying information is made to be a five-bit configuration (c, hhhh) of the leaf bit c and the encoded bits hhhh using the four bits of the encoded bits (hhhh) in place of (ddd, e, ff).

FIG. 20 is a view showing the key specifying tree 431 shown by wide lines in the state of the information processing apparatus $u_{27}$, $u_{28}$, $u_{33}$, $u_{36}$, $u_{37}$, $u_{38}$, $u_{39}$ and $u_{40}$ (expressed by the mark x in FIG. 20) revoked among the information processing apparatus $u_{14}$-$u_{40}$. It is supposed that the information processing apparatus $U_{27}$, $U_{28}$, $U_{33}$, $U_{36}$, $u_{37}$, $u_{38}$, $U_{39}$ and $U_{40}$ (expressed by the mark x in FIG. 20) are revoked among the information processing apparatus $u_{14}$-$u_{40}$, and that information (for example, the content key Kc) is transmitted to the other information processing apparatus.

In this case, the key specifying tree is set to have the nodes (1, 2, 3, 4, 9, 11, 12 and 13) as configuration nodes and the nodes (2, 9, 11, 12 and 13) as leaf nodes. The correspondence among the key specifying tree configuring node having the above-mentioned configuration, the sets of the leaf bit=c, the key specifying bits=ddd, the partition bit e and the partition specifying bits ff, and the five-bit sets (c, hhhh) of the leaf bit=c and the encoded bits=hhhh is shown in the following.

node 1: (0,000, 0, 00)→(0, 0000)
node 2: (1, 111, 1, 10)→(1, 0101)
node 3: (0, 101, 0, 00)→(0, 1011)
node 4: (0,000, 0, 00)→(0, 0000)
node 9: (1, 100, 0, 00)→(1, 1000)
node 11: (1, 101, 0, 00)→(1, 1011)
node 12: (1, 100, 0, 00)→(1, 1000)
node 13: (1, 000, 0, 00)→(1, 0000)

As a result, the key specifying code is a value lining the value of each bit mentioned above in order, or "10000010101010110000011000110111100010000".

In the case where the seven-bit key specifying information of the set of the leaf bit=c, the key specifying bits=ddd, the partition bit e and the partition specifying bits ff is set to each node, the key specifying code has 8×7=56 bits if the configuration nodes of the key specifying tree are eight, as described above. However, in case of five-bit (c, hhhh) of the leaf bit=c and the encoded bits=hhhh, the key specifying code has 8×5=40 bits, and the amount of information is reduced to 5/7.

In the example of FIG. 20, if no receivers are revoked, and if only one cryptogram enciphered by means of the subset key corresponding to the subset $S_{1, 111}$ having all of the receivers as its components is transmitted, the key specifying information of the root may be set to be (c, hhhh)=(1, 1110) to constitute the key specifying code. If the specific information is decoded to the seven-bit key specifying information of the set of the leaf bit=c, the key specifying bits=ddd, the partition bit e and the partition specifying bits ff, the decoded key specifying information is (c, ddd, e, ff)=(1, 111, 0, 00), and the key specifying information is similarly interpreted to the case of the information configuration including only the leaf bit c and the key specifying bits ddd.

Each information processing apparatus can judge the lineup order of the cryptograms in a cryptogram block on the basis of a key specifying code by means of the correspondence table shown in FIG. 18, and can know what number of the cryptograms the information processing apparatus should decode.

Each information processing apparatus accepting a cryptogram block and a key specifying code stores the correspondence table shown in FIG. 18 in its storage unit, or stores a program for executing a parse algorithm of a key specifying code corresponding to the correspondence table in the storage unit. Then, the information processing apparatus refers to the correspondence table, or complies with the program for executing the parse algorithm of the key specifying code, to judge the lineup order of the cryptograms in a cryptogram block. Thereby, the information processing apparatus judges what number of the cryptograms in the lineup the apparatus should decode. Incidentally, a configuration for providing the correspondence table or the program for executing the parse algorithm of the key specifying code to each information processing apparatus at the time of providing the cryptogram block and the key specifying code to each information processing apparatus may be adopted.

As described above, according to the present embodiment, it is possible to generate and to provide a key specifying code the amount of information of which is greatly reduced. Now, in Embodiment 3 described with reference to FIGS. 19 and 20, a method of encoding the six bits of the key specifying information (c, ddd, e, ff) except the bit c to four bits of gggg or hhhh has been shown. However, a configuration of encoding the seven bits including the bit c to five-bit key specifying information. For example, it is also possible to generate new key specifying information including five bits produced by coupling the bit c and the bits gggg, or coupling the bit c and the bits hhhh.

Figure 21:
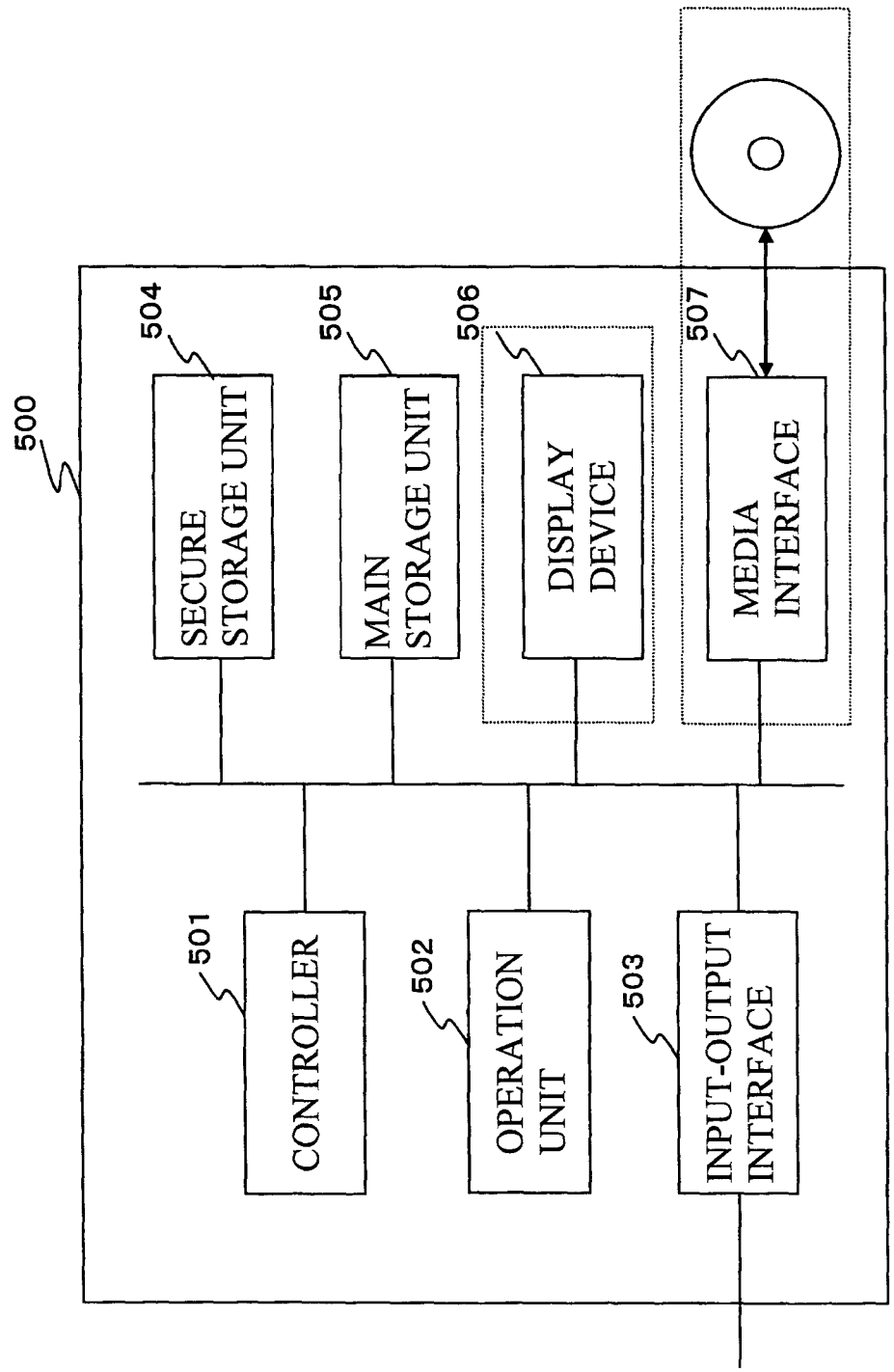
FIG. 21 is a view showing a configuration example of an information processing apparatus such as a transmitter for generating and providing cryptograms and a key specifying code, and a information processing apparatus such as a receiver for accepting the cryptograms and the key specifying code, and for selecting a cryptogram to decode it for obtaining the information such as a content key.

Next, while with reference to FIG. 21, there is described a configuration example of an information processing apparatus for executing each embodiment mentioned above, namely an information processing apparatus (an apparatus set to a leaf of a tree structure) such as a transmitter for generating cryptograms and key specifying codes to provide them, and a receiver for accepting cryptograms and key specifying codes and selecting a cryptogram and decoding the selected cipher test and obtaining information such as a content key. Incidentally, in case of storing cryptograms and key specifying codes in a recording medium such as a disk to provide the disk in the present system, the transmitter includes an information processing apparatus such as a disk writing apparatus or a disk producing apparatus, and the receiver includes an information processing apparatus such as a disk reproducing apparatus. Parts enclosed by dotted lines in FIG. 21 are options and are not always equipped. For example, if a communication path is not a recording medium, the media interface is not always needed.

The information processing apparatus, for example, includes a controller 501, an operation unit 502, an input-output interface 503, a secure storage unit 504, a main storage unit 505, a display device 506 and the media interface 507, as shown in FIG. 21.

The controller 501 includes, for example, a CPU having a function of a control unit for executing data processing in accordance with a computer program. The operation unit 502 provides exclusive operation functions such as the generation of an encryption key, the generating of random numbers, and cipher processing. The input-output interface 503 is an interface dealing with data input from input means such as a keyboard and a mouse, data output to an external output apparatus, and transmission-and-reception processing through a network.

The secure storage unit 504 is a storage unit for storing the data which should be held safely or secretly such as node keys as encryption keys, various kids of ID, and the above-mentioned correspondence tables. The main storage unit 505 is a memory area used for, for example, a data processing program executed by the controller 501, temporarily stored processing parameters, a working area for program execution, and the like. The secure storage unit 504 and the main storage unit 505 are memories including, for example, a RAM, a ROM or the like. The display device 506 is used for outputting decoded contents or the like. The media interface 507 provides a read/write function of media such as a CD, a DVD and an MD.

Figure 22:
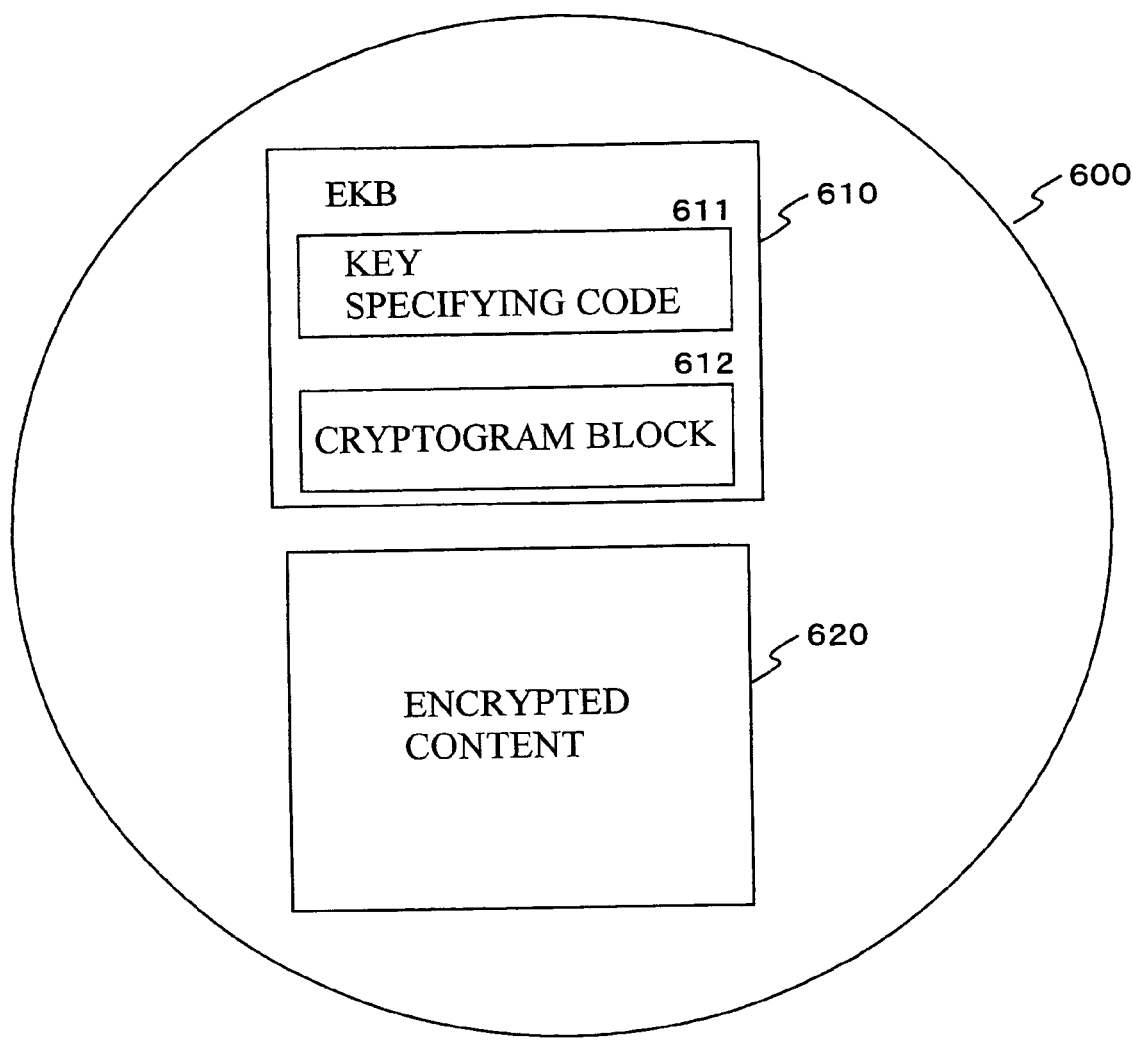
FIG. 22 is a view showing a configuration example of an information recording medium storing an encrypted content in a recording medium such as a DVD, and further storing a cryptogram block produced by enciphering the content key Kc being an encryption key of an encrypted content by means of a plurality of subset keys, and a key specifying code.

FIG. 22 shows a configuration example of an information recording medium such as a DVD by storing an encrypted content, and by storing a cryptogram block produced by encrypting a content key Kc as an encryption key of the encrypted content by using a plurality of subset keys, and a key specifying code.

In an information recording medium 600, in addition to an encrypted content 620 enciphered by means of the content key Kc, an enabling key block (EKB) 610 as an encryption key block information for a device (leaf setting information processing apparatus) having an authorized right of using the content to obtain the content key is recorded.

The enabling key block (EKB) 610 as the encryption key block information includes, as described above, a cryptogram block 612 including one or more cryptograms produced by enciphering content keys by means of various subset keys set at configuration nodes of a key specifying tree, and a key specifying code 611.

Moreover, the enabling key block (EKB) 610 as the encryption key block information may include as components, as examples, a version number indicating the newness of the EKB 610, and an authentication code such as a digital signature for certificating that the information included in the EKB has been created by an authorized entity and has not been altered.

Figure 23:
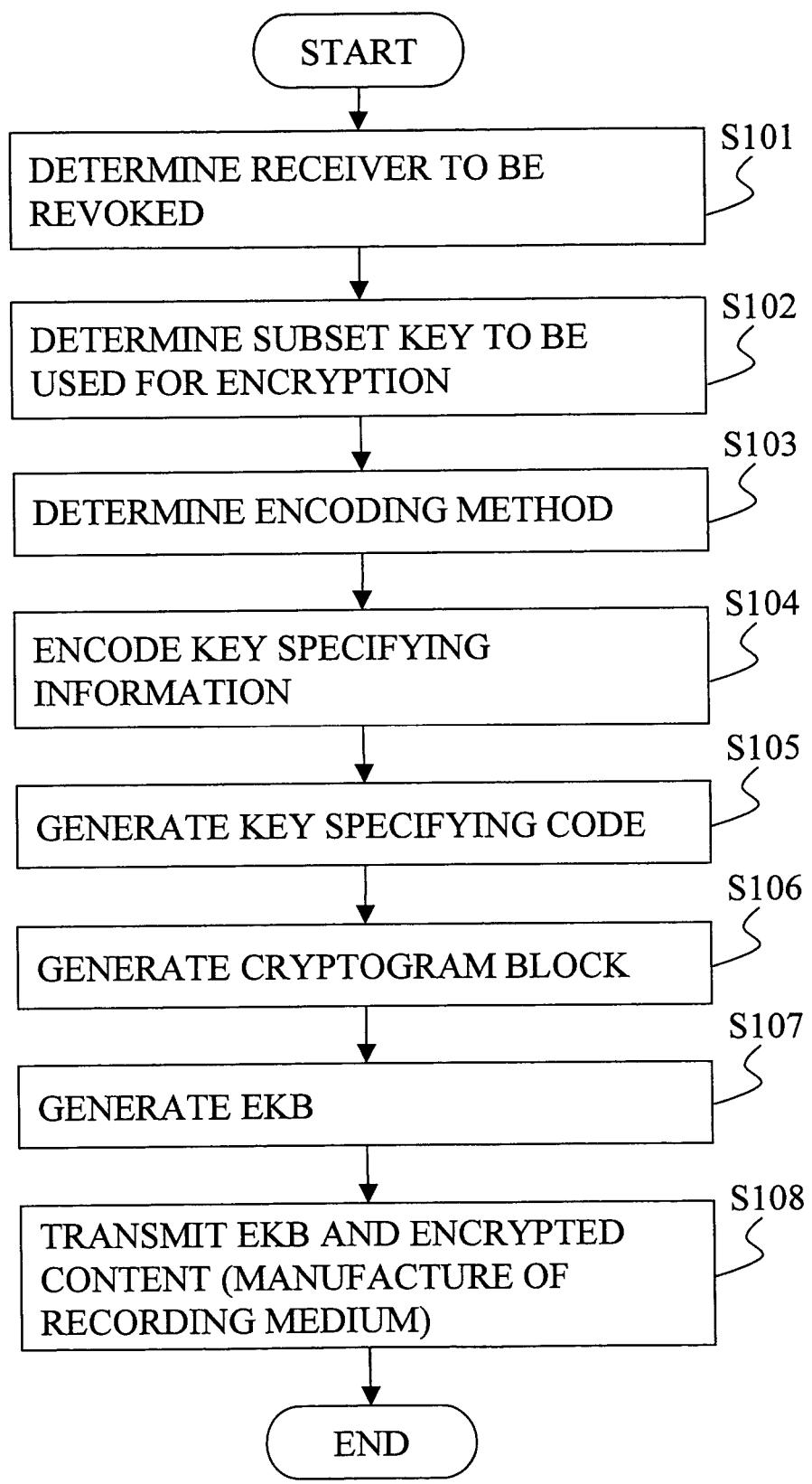
FIG. 23 is a view showing a processing flow of generating an EKB in an information processing apparatus for generating an EKB as encryption key block information including a cryptogram block to be provided to an information processing apparatus as a user device and a key specifying code.

FIG. 23 shows a processing flow for generating an EKB in an information processing apparatus generating a cryptogram block to be provided to the information processing apparatus as a user device, and an EKB as encryption key block information including a key specifying code.

An information processing apparatus executing cryptogram generating processing executes the processing of generating as providing information to an information processing apparatus a key specifying code that serves as encryption key information applied to a cryptogram block and the cryptograms constituting the cryptogram block, which cryptogram block includes the cryptograms obtainable by decoding processing based on the keys stored in only the selected information processing apparatus extracted as objects of providing a cryptogram from a plurality of information processing apparatus corresponding to the leaves as the lowest rank nodes of a multi-way tree configuration.

The key specifying code to be generated is, as described in the above-mentioned embodiments, data including key specifying information to each configuration node of a key specifying tree having the selected information processing apparatus as its leaves.

The key specifying information is set as the information including a leaf bit indicating whether or not a configuration node of the key specifying tree corresponds to a leaf, a key specifying bit indicating whether or not a cryptogram, to which a subset key corresponding to a subset defined for the node is applied, is included in the cryptogram block, a partition bit that serves as the subset division identifying information indicating whether or not the cryptograms, to which the subset keys corresponding to the divided subsets obtained by the division of the dividable subset defined at the node into the plurality of subsets, are included in the cryptogram block, a division method specifying information bit indicating a division mode of the divided subset, and the like.

In the processing flow of FIG. 23, it is supposed that a content enciphered by a content key has been already prepared. First, at a step S101, a revoke information processing apparatus set to a leaf such as a receiver, a reproducer and the like to be a revoke object is determined.

Based on the revoke apparatus determination result, at a step S102, a partial tree and a key specifying tree, which have been described in the preceding embodiments, are set, and a subset key to be used for encryption is determined in accordance with the key specifying tree.

At a step S103, it is judged which type of encoding processing of the key specifying information is executed. Namely, which method of the following encoding methods is applied is determined:

(1) a method adopting the key specifying code described as the conventional technique, namely the bit configuration (c, ddd) of the leaf bit c and the key specifying bits ddd;

(2) a method adopting the key specifying code described at Embodiment 1, namely the bit configuration (c,ddd,e) of the leaf bit c, the key specifying bits ddd and the partition bit e;

(3) a method adopting the key specifying code described at Embodiment 2, namely the bit configuration (c, ddd, e, ff) of the leaf bit c, the key specifying bits ddd, the partition bit e and the partition specifying bits ff;

(4) a method adopting the key specifying code described at Embodiment 3, namely the bit configuration (c, gggg) of the leaf bit c and the encoded bits gggg; and (5) a method adopting the key specifying code described at Embodiment 3, namely the bit configuration (c, hhhh) of the leaf bit c and the encoded bits hhhh.

After the determination of the encoding processing method, at a step S104, the encoding of the key specifying information of a configuration node of the key specifying tree is executed in accordance with the determined method. Incidentally, which encoding method is applied is judged on the basis of the configuration of the set key specifying tree. Alternatively, judgment such that each encode may be actually executed to compare bit lengths, and that encoding resulting a shorter bit length is performed or the like may be performed for determining the method.

Next, at a step S105, a key specifying code coupled with the key specifying information is generated.

Next, at a step S106, a cryptogram block is generated. The processing is processing for enciphering transmission information, e.g. a content key Kc, by applying the subset key determined at the step S102. Incidentally, the cryptogram block are lined up in the order of the node number of the subset keys, and are lined up in conformity with the above-mentioned rule in the case where a plurality of cryptograms exist to the same node, namely the descending order of the value of the bits ZZZ of the key specifying information $SK_{k,zzz}$ if the bits ZZZ are regarded at positive numbers expressed by binary numbers.

At a step S107, an encryption key block (EKB) is generated by packaging the key specifying code generated at the step S105 and the cryptogram block generated at the step S106.

At a step S108, the encryption key block (EKB) and an encrypted content enciphered by means of the content key Kc are transmitted through a network, or are stored in the information recording medium. Incidentally, a configuration for transmitting also identifying information concerning the encoding method determined at the step S103 collectively through the network, or for storing the identifying information in the information recording medium may be adopted. Concrete examples thereof will be described later.

Figure 24:
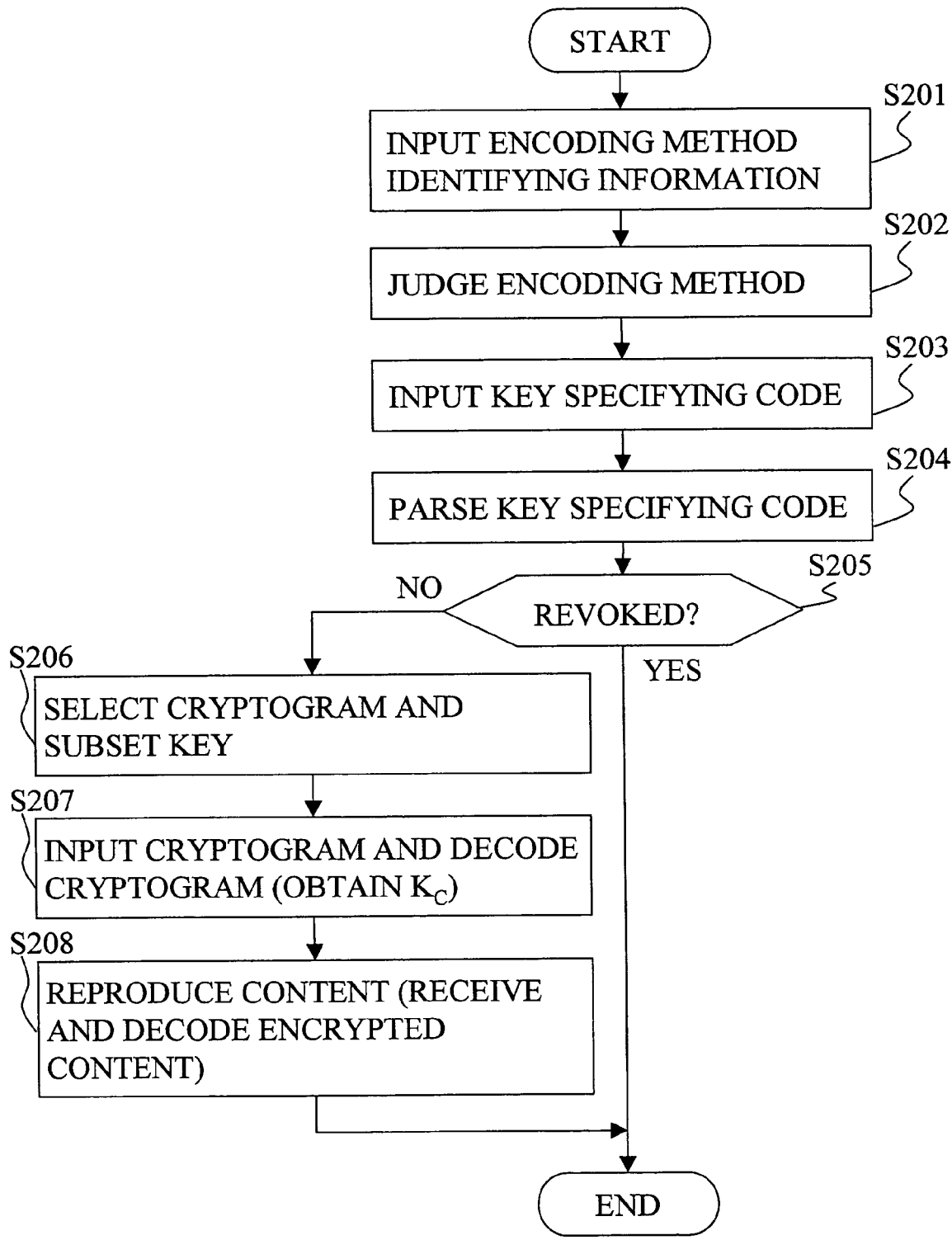
FIG. 24 is a view for illustrating a processing procedure in an information processing apparatus as a user device for accepting an EKB as encryption key block information including a cryptogram block and a key specifying code and an encrypted content, and for performing content reproducing processing.

Next, FIG. 24 is referred to while describing a processing procedure in an information processing apparatus as a user device performing content reproducing processing by accepting an EKB as encryption key block information including a cryptogram block and a key specifying code, and an encrypted content.

The information processing apparatus executing the cryptogram decoding processing inputs a cryptogram block including cryptograms obtainable by decoding processing based on the keys store in only the selected information processing apparatus extracted as the objects of providing the cryptograms from a plurality of information processing apparatus corresponding to the leaves as the lowest rank nodes of a multi-way tree configuration, and a key specifying code as the encryption key information applied to the cryptograms constituting the cryptogram block. Then, the information processing apparatus obtains the key specific information to each configuration node of the key specifying tree having the selected information processing apparatus as the leaves from the key specifying code. Moreover, the information processing apparatus obtains various kinds of information from the key specifying information, and executes the selecting processing of a cryptogram as a target of the decoding processing from the cryptograms included in the cryptogram block. Moreover, a configuration for inputting also the identifying information of the encoding method may be adopted.

As described in the above-mentioned embodiments, the key specifying information includes the leaf bit indicating whether or not a configuration node of the key specifying tree corresponds to a leaf, the key specifying bits indicating whether or not the cryptogram block includes a cryptogram to which a subset key corresponding to a subset defined for the node, the partition bit as the subset division identifying information indicating whether or not the cryptogram block includes the cryptograms to which the subset keys corresponding to the divided subsets obtained by dividing the dividable subset defined for the node into a plurality of subsets, a dividing method specifying information bit indicating the division modes of the divided subsets, and the like. On the basis of these pieces of key specifying information, the processing of selecting a cryptogram as a target of decoding processing from the cryptograms included in the cryptogram block is executed.

At a step S201, encoding method identifying information is input. In an EKB as an encryption key block, as shown in FIG. 25, the information indicating an encoding mode of the key specifying code is stored.

Figure 25:
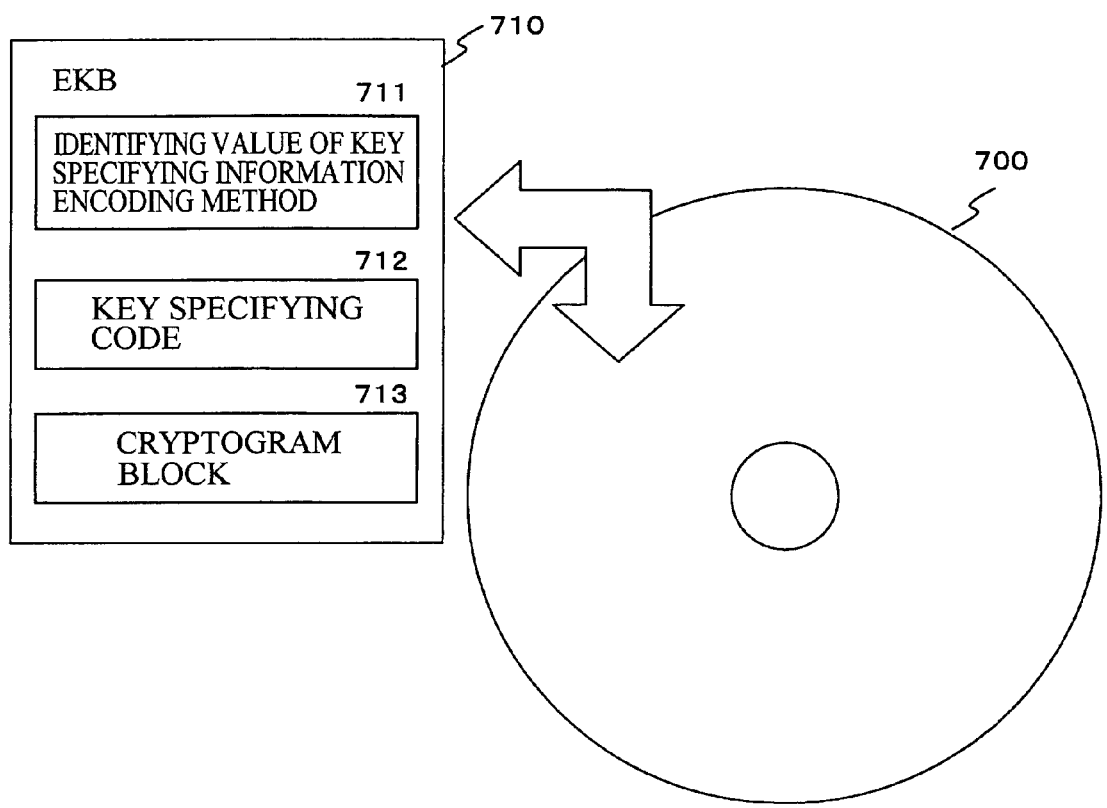
FIG. 25 is a view for illustrating the configuration of a key information block (EKB) storing the information indicating an encoding mode of a key specifying code.

The example shown in FIG. 25 is an example of storing an EKB 710 as an encryption key block into an information recording medium 700.

In an information recording medium 700, in addition to an encrypted content enciphered by means of the content key Kc, an enabling key block (EKB) 710 as an encryption key block information for a device (leaf setting information processing apparatus) having legal right of using the content to obtain the content key is recorded. The enabling key block (EKB) 710 includes, as described above, a cryptogram block 713 including one or more cryptograms produced by enciphering content keys by means of various subset keys set at the configuration nodes of the key specifying tree, and a key specifying code 712. Furthermore, the enabling key block (EKB) 710 stores an identifying value 711 of key specifying information encoding method as the information indicating the encoding mode of a key specifying code. The concrete values of the identifying value 711 of key specifying information encoding method will be described later.

Incidentally, also in case of transmitting an EKB by network distribution, similar information may be transmitted.

Returning to FIG. 24, the description with regard to the processing of the information processing apparatus as a user device is continued. At a step S202, the encoding method is judged on the basis of the encoding method identifying information input at the step S201.

At a step S203, a key specifying code is input. Incidentally, the encoding method identifying information and the key specifying code are received through a network, or read out from an information recording medium.

At a step S204, the interpretation of the key specifying code is executed on the basis of the encoding information.

Next, at a step S205, revoking is judged. The judgment is performed as follows. Namely, if a cryptogram which can be decoded by the self apparatus on the basis of the key specifying code can be selected, the fact indicates that the inexistence of revoking. If such a cryptogram cannot be selected, the fact indicates that the apparatus is revoked. By means of the key specifying code, the judgment can be performed by re-constructing the whole or a part of the key specifying tree.

If the apparatus is revoked, the apparatus cannot decode any cryptograms included in the cryptogram block by applying the subset key stored in the apparatus itself. Namely, the processing is terminated without executing the decoding and the reproducing of the content.

If the apparatus is not revoked, at a step S206, the apparatus selects a cryptogram which can be decoded by means of the subset key of the apparatus from the cryptogram block. The selection processing is selected on the basis of the key specifying code.

Because all of the cryptograms specified by means of the key specifying information are lined up in the cryptogram block in the order of node numbers and the above-mentioned order at the time if a plurality of cryptograms exists to one node. Consequently, also a cryptogram which should be decoded can be uniquely determined. For example, in the example of FIG. 17, the information processing apparatus $u_{17}$ can find the node 2 on the path from the leaf 17 to the root, and can know that the cryptogram using the subset key $SK_{2, 010}$ corresponding to the subset $S_{2, 010}$ having the information processing apparatus $u_{17}$ as a component defined for the node because the key specifying information (c, ddd, e, ff)=(1, 111, 1, 10).

Then, it can be also known that the cryptogram is placed at a second position of the cryptograms produced by means of the subset key of the subset defined at the node 2. Moreover, if the key specific information at the nodes other than the node 2, there is no nodes having a smaller number than that of the node 2 to which corresponding subset keys are used. Consequently, it is known that the cryptogram using the subset key $SK_{2, 010}$ is the second cryptogram of the whole cryptogram block. Hence, it is known that the cryptogram should be decoded by means of the above-mentioned subset key.

Here, the example of FIG. 17 is described. Similarly also in the other example, a receiver which is not revoked can uniquely specify a cryptogram which should be decoded and a subset key used for decoding.

At a step S207, the selected cryptogram is input, and the subset key held by the apparatus itself is applied to the cryptogram to execute decoding processing. Thereby the content key Kc is obtained.

At a step S208, the obtained content key Kc is applied to decode the encrypted content, and the content is obtained. Thereby reproducing processing is performed.

As described by referring to FIG. 25, in the encryption key block (EKB) storing the cryptograms and the key specifying codes, the identifying value 711 of key specifying information encoding method is stored as identifying information.

A concrete example of the identifying value 711 of key specifying information encoding method is described. As described with reference to the above-mentioned Embodiments 1-3, set modes of the key specifying code includes various modes, the key specifying code generating side can determine which code is applied.

For example, the following encoding methods can be selected:

(1) a method adopting the key specifying code described as the conventional technique, namely the bit configuration (c, ddd) of the leaf bit c and the key specifying bits ddd;

(2) a method adopting the key specifying code described at Embodiment 1, namely the bit configuration (c, ddd, e) of the leaf bit c, the key specifying bits ddd and the partition bit e;

(3) a method adopting the key specifying code described at Embodiment 2, namely the bit configuration (c, ddd, e, ff) of the leaf bit c, the key specifying bits ddd, the partition bit e and the partition specifying bits ff;

(4) a method adopting the key specifying code described at Embodiment 3, namely the bit configuration (c, gggg) of the leaf bit c and the encoded bits gggg; and (5) a method adopting the key specifying code described at Embodiment 3, namely the bit configuration (c, hhhh) of the leaf bit c and the encoded bits hhhh.

Which method of each encoding method has been applied is set in the identifying value 711 of key specifying information encoding method as the identifying information.

Information codes are set in advance as follows. For example, the method (1): 000,
the method (2): 001,
the method (3): 010,
the method (4): 011, and
the method (5): 100.

The information processing apparatus which performs content reproducing judges the kind of the key specifying code on the basis of the identifying information set in the identifying value 711 of key specifying information encoding method.

As described above, by providing the identifying value 711 of key specifying information encoding method, a method having a good efficiency among a plurality of techniques can be selected to be used. Even if there are more rules (encoding methods) of the key specifying information which can be used, such a case can be dealt with by performing specification by means of the similar value of "key specifying information encoding method".

Now, in the embodiment, an information processing apparatus performing the use of a content, for example, the information processing apparatus corresponding to the leaf $u_{14}$ shown in FIG. 17, has four subset keys corresponding to four subsets $S_{1, 100}$, $S_{1, 110}$, $S_{1, 101}$ and $S_{1, 111}$ among the subsets defined at the node 1. The other information processing apparatus similarly have four subset keys severally, though the combination is changed.

Now, if it is supposed that the weight (the number of bits having the value of 1) of the yyy portion of a subset key $S_{x, yyy}$ used in the system has a maximum value of, for example, 2, and that only the weights equal to 2 or less is used, the information processing apparatus becomes unnecessary to have the subset key $SK_{1, 111}$. If there are no apparatus to be revoked and the sub set key $SK_{1, 111}$ is wanted to be used ordinarily for encryption, the subset key $SK_{1, 111}$ is divided by any one of the above-mentioned methods, and for example, two cryptograms using two subset keys $SK_{1, 100}$ and $SK_{1, 011}$ are transmitted in an encryption block.

By such a setting, the size of a cryptogram block has the possibility of increasing, but there is a merit of reducing the number of keys held by an information processing apparatus on the side of content using.

According to the above, a larger advantage may be expected for a four-way tree or a multi-way tree having larger ways than for the above-mentioned example of the three-way tree.

In the embodiments mentioned above, the three-way tree has been described as the major example. However, the configuration of the present invention is a technique applicable to a four-way tree, or a multi-way tree having further ways.

In the above, specified embodiments have been used for describing the present invention in detail. However, it is obvious that a person skilled in the art can perform modification or substitution of the present invention without departing from the sprit and the scope of the invention. Namely, the present invention has been disclosed in the form of exemplification, and the present invention should not be limitedly interpreted. For judging the subject matter of the present invention, the column of claims stated at the top of the present specification should be considered.

A series of processing described in the specification can be executed by hardware, software or a mixed configuration of both of them. If the processing is executed by software, it is possible to execute the processing by installing a program recording a processing sequence in a memory of a computer incorporated into exclusive hardware, or by installing the program into a general purpose computer capable of executing various kinds of processing.

For example, the program can be previously recorded in a hard disk or a read only memory (ROM) as a recording medium. Alternatively, the program may be stored (recorded) temporarily or ever lastingly in a removable recording medium such as a flexible disk, a compact disc read only memory (CD-ROM), a magneto optical (MO) disk, a digital versatile disc (DVD), a magnetic disk and a semiconductor memory. Such a removable recording medium can be provided as the so-called package software.

In addition to the installing into the computer from a removable recording medium as described above, the program can be wirelessly transferred from a download cite to the computer, or can be transferred to the computer with wire through a network such as a local area network (LAN) and the Internet. The computer can receive the program transferred in such ways, and can install the received program into a built-in recording medium such as a hard disk.

Various kinds of processing stated in the specification is not only executed in a time series in accordance with the statement, but also may be executed in parallel or individually according to the processing ability of the apparatus executing the processing or as occasion demands. Moreover, a system in the present specification indicates a logically set configuration of a plurality of apparatus, and is not limited to ones in which each configuration apparatus is within the same housing.

As described above, according to the embodiments of the present invention, the following configuration is adopted. By the configuration, a cryptogram block including cryptograms obtainable by decoding processing based on a key stored only in a selected information processing apparatus extracted as a target of providing the cryptograms from a plurality of information processing apparatus corresponding leaves as lowest rank nodes of a multi-way tree configuration is generated as providing information to the information processing apparatus, and key specifying information at each key specifying tree node, the key specifying information being configuration data of a key specifying code, includes subset division identifying information (partition bit) indicating whether or not the cryptograms, to which subset keys corresponding to divided subsets obtained by division of a dividable subset into a plurality of subsets are applied and in which the dividable subset is defined as a set of specific leaves, are including in the cryptogram block. Consequently, it becomes possible to generate a cryptogram to which the subset key corresponding to a divided subset is applied to transmit the generated cryptogram to an information processing apparatus. On the side of an information processing apparatus accepting the cryptogram and the key specifying code, the apparatus can judge whether or not the accepted cryptogram is the one to which the subset key corresponding to the divided subset is applied, and can select the cryptogram that is a target of decoding by the apparatus itself on the basis of the key specifying code. The present invention can be used in a providing configuration of cryptogram to which a tree structure is applied. To put it concretely, the present invention can be applied to an information processing apparatus for executing cryptogram generation, provision and transmission, an information processing apparatus as a user device for executing cryptogram decoding and reproducing, and an information recording medium storing an encrypted content and the like.

According to the configuration of the above-described embodiments, because the cryptograms setting various divided subsets can be provided in a cryptogram transmitting configuration to which an information delivery system using a tree structure is applied, the information processing apparatus corresponding to a leaf as an revoke object can be efficiently specified when various attacks by an attacker are performed. Consequently, the present invention can be used in a configuration for providing cryptograms to which a tree structure is applied, which configuration needs to perform the specifying processing of a revoke object. To put it concretely, the present invention can be applied to an information processing apparatus for executing cryptogram generation, provision and transmission, an information processing apparatus as a user device for executing cryptogram decoding and reproducing, and an information recording medium storing an encrypted content and the like.

Moreover, according to the configuration of the above described embodiments, because the configuration is one setting a partition specifying bit indicating a division mode even in a subset having a plurality of division modes, the setting of an arbitrary division mode such as various combinations of two branches and one branch in a three-way tree configuration, and the setting of a divided subset at each of the three branches. An information processing apparatus for performing the selection of a cryptogram from a cryptogram block and decoding processing can select a cryptogram being a decoding object by parsing a partition specifying bit included in key specifying information included in a key specifying code. Moreover, according to a configuration of encoding bit information of a key specifying bit, a partition bit and a partition specifying bit in the configuration of the present invention, and then the amount of information of the key specifying code can be reduced. Consequently, the present invention can be used in a providing configuration of cryptogram to which a tree structure is applied. To put it concretely, the present invention can be applied to an information processing apparatus for executing cryptogram generation, provision and transmission, an information processing apparatus as a user device for executing cryptogram decoding and reproducing, and an information recording medium storing an encrypted content and the like.

What is claimed is:

1. An information processing apparatus for executing cryptogram generating processing, the information processing apparatus comprising:
    a processor configured to generate a cryptogram block and a key specifying code, the cryptogram block including cryptograms to be sent to user apparatuses, and that can be decoded by a key stored only in at least a selected one of the user apparatuses, wherein the user apparatuses correspond to leaves of lowest rank nodes of a multi-way tree configuration;
    the key specifying code includes key specifying information describing a key specifying tree as a partial tree of the multi-way tree configuration, the key specifying code identifying configuration nodes associated with subsets of the key specifying tree, the key specifying tree having the selected user apparatus as a leaf, and
    the key specifying information includes subset division identifying information describing the subsets of the key specifying tree,
    each cryptogram is associated with one of the subsets of the key specifying tree, and is encoded by a corresponding subset key,
    the subset identifying information indicating that the cryptograms included in the cryptogram block are encoded by the subset keys,
    the subsets being divided subsets of a dividable subset, the dividable subset being a set of specific leaves in the configuration nodes of the key specifying tree; and
    wherein the key specifying information is configured to be coded data identifying a combination of a key specifying bit (a), a partition bit (b), a division method specifying information bit (c), the division method specifying bit indicating a division mode of the divided subset, and a leaf bit (d);
    wherein the key specifying bit, the partition bit, the division method specifying information bit, and the leaf bit are separate bits.

2. The information processing apparatus according to claim 1, wherein:
    the leaf bit indicating whether or not a configuration node of the key specifying tree corresponds to a leaf,
    the key specifying bit indicating whether or not a cryptogram, to which a subset key corresponding to a subset defined for the node is applied, is included in the cryptogram block, and
    the partition bit as the subset division identifying information, the partition bit indicating whether or not the cryptograms, to which the subset keys corresponding to the divided subsets, are included in the cryptogram block.

3. The information processing apparatus according to claim 1, wherein
    the multi-way tree comprises a three-way tree configuration,
    the subset division identifying information is a one-bit information set corresponding to the configuration node of the key specifying tree, and
    the subset division identifying information is configured such that a value of 0 or 1 indicates whether the cryptograms, to which the subset keys corresponding to the divided subsets, are included in the cryptogram block, or whether a cryptogram to which a subset key corresponding to the dividable subset is applied, is included in the cryptogram block.

4. The information processing apparatus according to claim 1, wherein
    the multi-way tree has a three-way tree configuration,
    the division method specifying information is two-bit information correspondingly set to the configuration nodes of the key specifying tree, and
    the division method specifying information is set to be a piece of information, as a division mode of branches a, b and c set to the nodes, indicating which division mode of ab and c, ac and b, a and bc, or, a and b and c the division modes of branches a, b and c set at the node are, based on bit information 00-11 that serves as the division method specifying information.

5. The information processing apparatus according to claim 1, wherein
    the key specifying bit (a) indicates whether or not a cryptogram, to which a subset key corresponding to a subset defined at a configuration node of the key specifying tree is applied, is included in the cryptogram block,
    the partition bit (b) is subset division identifying information indicating whether or not a cryptogram, to which a subset key corresponding to a divided subset produced by dividing a dividable subset defined at the configuration node into a plurality of divided subsets is applied, is included in the cryptogram block.

6. The information processing apparatus according to claim 1, wherein
    the information processing apparatus is configured to:
        generate, the cryptogram block, the key specifying code and key specifying information for providing to the user apparatus; and
        identify an encoding method of the key specifying information included in the key specifying code.

7. An information processing apparatus for executing cryptogram decoding processing, the information processing apparatus configured to:
    receive, as an input, a cryptogram block and a key specifying code, the cryptogram block including cryptograms received by user apparatuses, and that can be decoded by a key stored in at least a selected one of the user apparatuses, wherein the user apparatuses correspond leaves as lowest rank nodes of a multi-way tree configuration;
    obtain key specifying information of the key specifying code describing a key specifying tree as a partial tree of the multi-way configuration, the key specifying code identifying configuration nodes associated with subsets of the key specifying tree, the key specifying tree having the selected user apparatus as a leaf;
    obtain, from the key specifying information, subset division identifying information describing a subset of the key specifying tree, a cryptogram of the cryptogram block being associated with the subset of the key specifying tree and being encoded by a corresponding subset key,
    wherein the subset identifying information indicates that the cryptogram included in the cryptogram block is encoded by the subset key, the subset being divided subset of a dividable subset, the dividable subset being a set of specific leaves in the configuration nodes of the key specifying tree; and selecting, by a processor, a cryptogram, from the cryptograms included in the cryptogram block, on the basis of the obtained information; and wherein the key specifying information is configured to be coded data indentifying a combination of a key specifying bit (a), a partition bit (b), a division method specifying information bit (c), the division method specifying bit indicating a division mode of the divided subset, and a leaf bit (d);

wherein the key specifying bit, the partition bit, the division method specifying information bit, and the leaf bit are separate bits.

8. The information processing apparatus according to claim 7, wherein the leaf bit indicating whether or not a configuration node of the key specifying tree corresponds to a leaf, the key specifying bit indicating whether or not a cryptogram, to which a subset key corresponding to a subset defined for the node is applied, is included in the cryptogram block, and the partition bit as the subset division identifying information, the partition bit indicating whether or not the cryptograms, to which the subset keys corresponding to the divided subsets, are included in the cryptogram block, wherein processing of selecting a cryptogram that is a target of decoding processing from the cryptograms included in the cryptogram block is executed on the basis of the leaf bit, the key specifying bit and the partition bit.

9. The information processing apparatus according to claim 7, wherein the multi-way tree comprises a three-way tree configuration, the subset division identifying information is a one-bit information set corresponding to the configuration node of the key specifying tree, and the information processing apparatus is configured to determine whether the cryptograms, to which the subset keys corresponding to the divided are included in the cryptogram block, or whether a cryptogram to which a subset key corresponding to the dividable subset is included, on the basis of a value 0 or 1 of the subset division identifying information.

10. The information processing apparatus according to claim 7, wherein the information processing apparatus is configured to include a table mapping information modes of the key specifying information to cryptogram modes corresponding to the respective modes, and to execute the processing of selecting a cryptogram as a target of decoding processing from the cryptograms included in the cryptogram block on the basis of the table and the obtained information.

11. The information processing apparatus according to claim 7, wherein the information processing apparatus is configured to determine the division mode of a divided subset on the basis of the division method specifying information, and to select the cryptogram from the cryptograms included in the cryptogram block on the basis of the determined information.

12. The information processing apparatus according to claim 11, wherein the multi-way tree has a three-way tree configuration, the division method specifying information is two-bit information set correspondingly to a configuration node of the key specifying tree configuration node, and the information processing apparatus is configured to execute processing for identifying which division mode of ab and c, ac and b, a and bc, or a, b and c, the division modes of branches a, b and c set at the node are, based on bit information 00-11 that serves as the division method specifying information.

13. The information processing apparatus according to claim 7, wherein the key specifying bit (a) indicates whether or not a cryptogram, to which a subset key corresponding to a subset defined at a configuration node of the key specifying tree is applied, is included in the cryptogram block, the partition bit (b) is subset division identifying information indicating whether or not a cryptogram, to which a subset key corresponding to a divided subset produced by dividing a dividable subset defined at the configuration node into a plurality of divided subsets is applied, is included in the cryptogram block, and the information processing apparatus executes processing of selecting a cryptogram that is a target of decoding processing from the cryptograms included in the cryptogram block on the basis of the coded data.

14. The information processing apparatus according to claim 7, wherein the information processing apparatus is configured to:

receive, as an input, the cryptogram block, the key specifying code and key specifying information encoding method identifying information made to be capable of identifying an encoding method of key specifying information included in the key specifying code;

identify the encoding method of the key specifying code on the basis of the key specifying information encoding method identifying information; and execute processing of selecting a cryptogram as a target of decoding processing from the cryptograms included in the cryptogram block by parsing the key specifying code on the basis of an identification result.

15. An non-transitory information recording medium, storing:

a cryptogram block including cryptograms that are received by user apparatuses, and that can be decoded by a key stored only in at least a selected one of the user apparatuses, wherein the user apparatuses correspond to leaves as lowest rank nodes of a multi-way tree configuration, and a key specifying code that includes key specifying information describing a key specifying tree as a partial tree of the multi-way configuration, the key specifying code identifying configuration nodes associated with subsets of the key specifying tree, the key specifying tree having the user apparatus as a leaf, and the key specifying information includes subset division identifying information describing the subsets of the key specifying tree, wherein each cryptogram is associated with one of the subsets of the key specifying tree, and is encoded by a corresponding subset key, the subset identifying information indicating that the cryptograms, included in the cryptogram block are encoded by the subset keys, the subsets being divided subsets of a dividable subset, the dividable subset being a set of specific leaves in the configuration nodes of the key specifying tree; and wherein the key specifying information is configured to be coded data indentifying a combination of a key specifying bit (a), a partition bit (b), a division method specifying information bit (c), the division method specifying bit indicating a division mode of the divided subset, and a leaf bit (d);

wherein the key specifying bit, the partition bit, the division method specifying information bit, and the leaf bit are separate bits.

16. The information recording medium according to claim 15, wherein the leaf bit indicating whether or not a configuration node of the key specifying tree corresponds to a leaf, the key specifying bit indicating whether or not a cryptogram, to which a subset key corresponding to a subset defined for the node is applied, is included in the cryptogram block, and the partition bit as the subset division identifying information, the partition bit indicating whether or not the cryptograms, to which the subset keys corresponding to the divided subsets, are included in the cryptogram block.

17. The information recording medium according to claim 15, wherein the multi-way tree comprises a three-way tree configuration, the subset division identifying information is a one-bit information set corresponding to the configuration node of the key specifying tree, and the information recording medium is configured to indicate by a value of 0 or 1 of the subset division identifying bit information, whether the cryptograms, to which the subset keys corresponding to the divided subsets, are included in the cryptogram block, or whether a cryptogram to which a subset key corresponding to the dividable subset is applied is included in the cryptogram block.

18. The information recording medium according to claim 15, wherein the multi-way tree has a three-way tree configuration, the division method specifying information is two-bit information correspondingly set to the configuration nodes of the key specifying tree, and the division method specifying information is set to be a piece of information indicating which division mode of ab and c, ac and b, a and bc, or a and b and c, the division modes of branches a, b and c set at the node are, based on bit information 00-11 that serves as the division method specifying information.

19. The information recording medium according to claim 15, wherein the key specifying bit (a) indicates whether or not a cryptogram, to which a subset key corresponding to a subset defined at a configuration node of the key specifying tree is applied, is included in the cryptogram block, the partition bit (b) is subset division identifying information indicating whether or not a cryptogram, to which a subset key corresponding to a divided subset produced by dividing a dividable subset defined at the configuration node into a plurality of divided subsets is applied, is included in the cryptogram block.

20. The information recording medium according to claim 15, wherein:

the information recording medium is configured to store the cryptogram block, the key specifying code, and key specifying information configured to identify an encoding method of the key specifying information included in the key specifying code.

21. An information processing method for executing cryptogram generating processing on an information processing apparatus, the information processing method comprising the steps of:

generating, by a processor of the information processing apparatus, a cryptogram block including cryptograms to be sent to user apparatuses, and that can be decoded by a key stored only in at least a selected one of the user apparatuses, wherein the user apparatuses correspond to leaves as lowest rank nodes of a multi-way tree configuration; and generating a key specifying code including key specifying information describing a key specifying tree as a partial tree of the multi-way configuration, setting subset division identifying information as the key specifying information, the subset division identifying information identifying configuration nodes associated with subsets of the key specifying tree, the key specifying tree having the selected user apparatus as a leaf, the subset division identifying information describing the subsets of the key specifying tree, wherein each cryptogram is associated with one of the subsets of the key specifying tree, and is encoded by a corresponding subset key, the subset division identifying information indicating that the cryptograms included in the cryptogram block are encoded by the subset keys, the subsets being divided subsets of a dividable subset, the dividable subset defined as a set of specific leaves in the configuration nodes of the key specifying tree; and the step of generating a key specifying code includes a process of generating as the key specifying information coded data identifying a combination of: a key specifying bit (a), a partition bit (b), a division method specifying information bit (c), the division method specifying bit indicating a division mode of the divided subset, and a leaf bit (d);

wherein the key specifying bit, the partition bit, the division method specifying information bit, and the leaf bit are separate bits.

22. The information processing method according to claim 21, wherein the leaf bit indicating whether or not a configuration node of the key specifying tree corresponds to a leaf, the key specifying bit indicating whether or not a cryptogram, to which a subset key corresponding to a subset defined for the node is applied, is included in the cryptogram block, and the partition bit as the subset division identifying information, the partition bit indicating whether or not the cryptograms, to which the subset keys corresponding to the divided subsets, are included in the cryptogram block.

23. The information processing method according to claim 21, wherein the multi-way tree comprises a three-way tree configuration, the method further comprising:

setting the subset division identifying information to the key specifying information as a one-bit information set corresponding to the configuration node of the key specifying tree, and setting, as an information bit indicating by a value of 0 or 1 of the subset division identifying bit information, whether the cryptograms, to which the subset keys corresponding to the divided, are included in the cryptogram block, or whether a cryptogram to which a subset key corresponding to the dividable subset is applied is included in the cryptogram block.

24. The information processing method according to claim 21, wherein
the multi-way tree has a three-way tree configuration, and
the step of generating a key specifying code sets as the division method specifying information set to the key specifying information two bit information correspondingly set to the configuration nodes of the key specifying tree, and sets as information indicating which division mode of ab and c, ac and b, a and bc, or, a and b and c, the division modes of branches a, b and c set at the node are, based on bit information 00-11 that serves as the division method specifying information.

25. The information processing method according to claim 21, wherein
the key specifying bit (a) indicates whether or not a cryptogram, to which a subset key corresponding to a subset defined at a configuration node of the key specifying tree is applied, is included in the cryptogram block,
the partition bit (b) is subset division identifying information indicating whether or not a cryptogram, to which a subset key corresponding to a divided subset produced by dividing a dividable subset defined at the configuration node into a plurality of divided subsets is applied, is included in the cryptogram block.

26. The information processing method according to claim 21, wherein
the information processing method includes a step of generating, as providing information to the information processing apparatus, key specifying information encoding method identifying information capable of identifying the cryptogram block, the key specifying code and an encoding method of the key specifying information included in the key specifying code.

27. An information processing method for executing cryptogram decoding processing on an information processing apparatus, the method comprising the steps of:
inputting a cryptogram block including cryptograms that are received by user apparatuses, and than can be decoded by a key stored in at least a selected one of the user apparatuses, wherein the user apparatuses correspond to leaves as lowest rank nodes of a multi-way tree configuration;
inputting a key specifying code
parsing the key specifying code by obtaining the key specifying information describing a key specifying tree as a partial tree of the multi-way configuration, the key specifying code identifying configuration nodes associated with subsets of the key specifying tree, the key specifying tree having the selected user apparatus as a leaf from the key specifying code;
obtaining, from the key specifying information, subset division identifying information describing a subset of the key specifying tree, wherein a cryptogram of the cryptogram block is associated with the subset of the key specifying tree, and is encoded by a corresponding subset key,
wherein the subset identifying information indicates that the cryptogram included in the cryptogram block is encoded by the subset key, the subset being a divided subset of a dividable subset; and
selecting, by a processor of the information processing apparatus, a cryptogram from the cryptograms included in the cryptogram block on the basis of the obtained information obtained at the step of parsing a key specifying code and obtaining subset division identifying information; and the key specifying information is information generated by configuring a combination of: a key specifying bit (a), a partition bit (b), a division method specifying information bit (c) as identifiable coded data, the division method specifying information bit indicates a division mode of the divided subset, and a leaf bit (d);
wherein the key specifying bit, the partition bit, the division method specifying information bit, and the leaf bit are separate bits.

28. The information processing method according to claim 27, wherein:
the leaf bit indicating whether or not a configuration node of the key specifying tree corresponds to a leaf,
the key specifying bit indicating whether or not a cryptogram, to which a subset key corresponding to a subset defined for the node is applied, is included in the cryptogram block, and
the partition bit as the subset division identifying information, the partition bit indicating whether or not the cryptograms, to which the subset keys corresponding to the divided subsets are included in the cryptogram block, and
the step of parsing a key specifying code includes obtaining information necessary for selecting a cryptogram from the cryptograms included in the cryptogram block, on the basis of the leaf bit, the key specifying bit and the partition bit.

29. The information processing method according to claim 27, wherein
the multi-way tree comprises a three-way tree configuration,
the subset division identifying information is a one-bit information set corresponding to the configuration node of the key specifying tree, and
the step of parsing a key specifying code includes a step of determining whether the cryptograms, to which the subset keys corresponding to the divided subsets, are included in the cryptogram block, or whether a cryptogram to which a subset key corresponding to the dividable subset is included on the basis of a value of 0 or 1 of the subset division identifying information.

30. The information processing method according to claim 27, wherein
the step of parsing a key specifying code includes a step of executing processing of obtaining information necessary for selecting a cryptogram from the cryptograms included in the cryptogram block on the basis of a table mapping information modes of the key specifying information to cryptogram modes corresponding to the respective modes.

31. The information processing method according to claim 27, wherein
the step of parsing a key specifying code includes a step of determining the division mode of a divided subset on the basis of the division method specifying information, and obtaining information necessary for selecting a cryptogram from the cryptograms included in the cryptogram block on the basis of the determined information.

32. The information processing method according to claim 31, wherein
the multi-way tree has a three-way tree configuration,
the division method specifying information is two-bit information set correspondingly to a configuration node of the key specifying tree configuration node, and
the step of parsing a key specifying code includes a step of executing processing of identifying which division mode of ab and c, ac and b, a and bc, or a, b and c, the division modes of branches a, b and c set at the node are, based on bit information 00-11 that serves as the division method specifying information.

33. The information processing method according to claim 27, wherein
the key specifying bit (a) indicates whether or not a cryptogram, to which a subset key corresponding to a subset defined at a configuration node of the key specifying tree is applied, is included in the cryptogram block,
the partition bit (b) is subset division identifying information indicating whether or not a cryptogram, to which a subset key corresponding to a divided subset produced by dividing a dividable subset defined at the configuration node into a plurality of divided subsets is applied, is included in the cryptogram block, and
the step of parsing a key specifying code includes a step of executing processing of obtaining information necessary for selecting a cryptogram that is a target of decoding processing from the cryptograms included in the cryptogram block on the basis of the coded data.

34. The information processing method according to claim 27, further comprising:
inputting key specifying information encoding method identifying information that is capable of identifying an encoding method of key specifying information included in the key specifying code; and
identifying the encoding method of the key specifying code on the basis of the key specifying information encoding method identifying information to execute parsing of the key specifying code on the basis of an identification result.

35. A non-transitory computer-readable medium comprising program instructions, which, when executed by a processor, cause the processor to perform a method of generating a cryptogram, the method comprising:
generating a cryptogram block including cryptograms to be sent to user apparatuses, and that can be decoded by a key stored only in at least a selected one of the user apparatuses, wherein the user apparatuses correspond to leaves as lowest rank nodes of a multi-way tree configuration; and
generating a key specifying code including key specifying information describing a key specifying tree as a partial tree of the multi-way configuration,
wherein generating the key specifying code includes setting subset division identifying information as the key specifying information identifying configuration nodes associated with subsets of the key specifying tree, the key specifying tree having the selected user apparatus as leaves, the subset division identifying information describing
the subsets of the key specifying tree, wherein each cryptogram is associated with one of the subsets of the key specifying tree, and is encoded by a corresponding subset key,
the subset identifying information indicating that the cryptograms included in the cryptogram block are encoded by the subset keys, the subsets being divided subsets of a dividable subset, the dividable subset defined as a set of specific leaves in the configuration nodes of the key specifying tree; and
the step of generating a key specifying code includes a process of generating as the key specifying information coded data identifying a combination of: a key specifying bit (a), a partition bit (b), a division method specifying information bit (c), the division method specifying bit indicating a division mode of the divided subset, and a leaf bit (d);
wherein the key specifying bit, the partition bit, the division method specifying information bit, and the leaf bit are separate bits.

36. A non-transitory computer-readable medium comprising program instructions, which, when executed by a processor, cause the processor to perform a method of decoding a cryptogram, the method comprising:
receiving, as an input, a cryptogram block including cryptograms that are received by user apparatuses, and that are decoded by a key stored in at least a selected one of the user apparatuses, wherein the user apparatuses correspond to leaves as lowest rank nodes of a multi-way tree configuration;
receiving a key specifying code including key specifying information describing a key specifying tree as a partial tree of the multi-way configuration
parsing the key specifying code by obtaining the key specifying information identifying configuration nodes associated with subsets of the key specifying tree, the key specifying tree having the selected user apparatus as a leaf, and by obtaining from the key specifying information, subset division identifying information describing a subset of the key specifying tree, wherein a cryptogram of the cryptogram block is associated with the subset of the key specifying tree, and is encoded by a corresponding subset key,
the subset identifying information indicating that the cryptogram, included in the cryptogram block is encoded by the subset key, the subset being a divided subset of a dividable subset; and
selecting the cryptogram from the cryptograms cryptogram block on the basis of the obtained information obtained at the step of parsing a key specifying code; and
the key specifying information is information generated by configuring a combination of: a key specifying bit (a), a partition bit (b), a division method specifying information bit (c) as identifiable coded data, the division method specifying information bit indicates a division mode of the divided subset, and a leaf bit (d);
wherein the key specifying bit, the partition bit, the division method specifying information bit, and the leaf bit are separate bits.

* * * * *